United States Patent
Shet et al.

(10) Patent No.: US 8,548,231 B2
(45) Date of Patent: Oct. 1, 2013

(54) PREDICATE LOGIC BASED IMAGE GRAMMARS FOR COMPLEX VISUAL PATTERN RECOGNITION

(75) Inventors: Vinay Damodar Shet, Princeton, NJ (US); Maneesh Kumar Singh, Lawrenceville, NJ (US); Claus Bahlmann, Princeton, NJ (US); Visvanathan Ramesh, Plainsboro, NJ (US); Stephen P. Masticola, Kingston, NJ (US); Jan Neumann, Arlington, VA (US); Toufiq Parag, Piscataway, NJ (US); Michael A. Gall, Belle Mead, NJ (US); Roberto Antonio Suarez, Jackson, NJ (US)

(73) Assignee: Siemens Corporation, Iselin, NJ (US)

( * ) Notice: Subject to any disclaimer, the term of this patent is extended or adjusted under 35 U.S.C. 154(b) by 742 days.

(21) Appl. No.: 12/724,954

(22) Filed: Mar. 16, 2010

(65) Prior Publication Data

US 2010/0278420 A1 Nov. 4, 2010

Related U.S. Application Data

(60) Provisional application No. 61/166,019, filed on Apr. 2, 2009, provisional application No. 61/257,093, filed on Nov. 2, 2009.

(51) Int. Cl.
*G06K 9/62* (2006.01)
*G06F 17/00* (2006.01)

(52) U.S. Cl.
USPC .......................................... 382/156; 706/56

(58) Field of Classification Search
None
See application file for complete search history.

(56) References Cited

PUBLICATIONS

Shet, "Bilattice Based Logical Reasoning for Automated Visual Surveillance and Other Applications", Computer Science Theses and Dissertations, UM Theses and Dissertations, Issue Date: Mar. 23, 2007, pp. 1-178.*
Towell et al., "Refinement of Approximate DOmain Theories by Knowledge-Based Neural Networks", Proceedings of the Eighth National Conference on Artificial Intelligence, 1990, pp. 861-866.*
Bose et al. "Performance Studies on KBANN," Dec. 8, 2004, Fourth International Conference on Hybrid Intelligent Systems, HIS '04, 6 pages.*
Automationanywhere, "GUI Automation", http://www.automationanywhere.com/solutions/gui-automation.htm?r=google&w=gui&kw=Gui%20Automation&gclid=COy43NXxi6ECFdV95Qod-XVsQq Apr. 7, 2010, 1 pp.
Balhmann, C et al., "Detection of Complex Objects in Aerial Images", *Siemens Corporate Research, Inc.* Dec. 2008, 1-5 pp.

(Continued)

*Primary Examiner* — David Zarka
*Assistant Examiner* — Ryan P Potts
(74) *Attorney, Agent, or Firm* — Donald B. Paschburg

(57) ABSTRACT

First order predicate logics are provided, extended with a bilattice based uncertainty handling formalism, as a means of formally encoding pattern grammars, to parse a set of image features, and detect the presence of different patterns of interest implemented on a processor. Information from different sources and uncertainties from detections, are integrated within the bilattice framework. Automated logical rule weight learning in the computer vision domain applies a rule weight optimization method which casts the instantiated inference tree as a knowledge-based neural network, to converge upon a set of rule weights that give optimal performance within the bilattice framework. Applications are in (a) detecting the presence of humans under partial occlusions and (b) detecting large complex man made structures in satellite imagery (c) detection of spatio-temporal human and vehicular activities in video and (c) parsing of Graphical User Interfaces.

8 Claims, 32 Drawing Sheets

(56) References Cited

PUBLICATIONS

Caviar, "Context Aware Vision using Image-based Active Recognition", http://homepages.inf.ed.ac.uk/rbf/CAVIAR/ Mar. 31, 2010, 1-2 pp.

Chen, Han et al., "Composite Templates for Cloth Modeling and Sketching", In CVPR 2006, 1-8 pp.

Csurka, Gabriella et al., "Visual Categorization with Bags of Keypoints", *Workshop on Statistical Learning in Computer Vision, ECCV* 2004, 1-22 pp.

Cussens, James, "Loglinear models for first-order probablistic reasoning", *Proceedings of the Fifteenth Conference on Uncertainty in Artificial Intelligence* 1999, 1-10 pp.

Dalal, Navneet et al., "Histograms of Oriented Gradients for Human Detection", *CVPR05*, 2005, 886-893 pp.

Felzenszwalb, Pedro F., "Learning Models for Object Recognition", *CVRP01*, 2001, 1056-1062 pp.

Fern, Alan, "A Penalty-Logic Simple-Transition Model for Structured Sequences", *International Joint Conference on Artificial Intelligence* 2005, 1-38 pp.

Fidler, Sanja et al., "Towards Scalable Representations of Object Categories: Learning a Hierarchy of Part", *Proc. IEEE Conf. Computer Vision Pattern Recognition (CVPR)* 2007, 1-8 pp.

Fitting, Melvin, "Bilattices in Logic Programming", *20th International Symposium on Multiple-Valued Logic*, Charlotte 1990, 238-247 pp.

Freund, Yoav et al., "A Decision-Theoretic Generalization of On-Line Learning and an Application to Boosting", *Journ. of Comp.and System Sciences 55* Dec. 19, 1996, 119-139 pp.

Friedman. Nir et al., "Learning Probabiistic Relational Models", *Proceedings of the Sixteenth International Joint Conference on Artificial Intelligence* Aug. 1999, 1-8 pp.

Froglogic, "Squish Manual", http://www.froglogic.com/download/book32/book/index.html Apr. 7, 2010, 1 pp.

Gavrila, D. M., "Pedestrian Detection from a Moving Vehicle", *ECCV00*, pp. II 2000, 37-49 pp.

Gavrila, D. M. et al., "Real-Time Object Detection for "Smart" Vehicles", *ICCV99* 1999, 87-93 pp.

Geman, Stuart et al., "Probability and Statistics in Computational Lenguistics, A Brief Review", *Mathematical foundations of speech and language processing* 2003, 1-26 pp.

Ginsberg, Matthew L. "Multivalued Logics: A Uniform Approach to Inference in Artificial Intelligence", *Comput. Intelligence* 1988, 1-96 pp.

Han. Chen et al., "Bottun-up/Top-down Image Parsing by Attribute Graph Grammar", *ICCV* 2005, 1-6 pp.

Hinton, Geoffrey E. et al., "A fast learning algorithm for deep belief nets", *Neural Computation* 2006, 1527-1554 pp.

IBM Corporation, "Rational Functional Texter", http://www.-01.ibm.com/software/awdtools/tester/functional/index.html Apr. 7, 2010, 1 pp.

Jin, Ya et al., "Context and Hierarchy in a Probabilistic Image model", *CVPR* 2006, 2145-2152 pp.

Lecun, Yann et al., "Efficient BackProp", *Neural Networks: Tricks of the Trade* 1998, 1-42 pp.

Lecun, Yann et al., "Gradient-Based Learning Applied to Document Recognition", *Proc. IEEE 86(11)* 1998, 2278-2325 pp.

Leibe, Bastian et al., "Pedestrian Detection in Crowded Scenes", *CVPR05* 2005, 878-885 pp.

Leung, Thomas et al., "Representing and Recognizing the Visual Appearance of Materials using three-dimensional Textons", *Intl. Journal of Computer Vision 43* 2001, 1-16 pp.

Lin. Liang et al., "An Empirical Study of Object Category Recognition: Sequential Testing with Generalized Samples", *ICCV07* 2007, 1-8 pp.

Lin, Zhe et al., "Hierarchical Part-Template Matching for Human Detection and Segmentation", *Institute for Advanced Computer Studies, University of Maryland* 2007, 1-8 pp.

Lowe, David G. et al., "Distinctive Image Features from Scale-Invariant Keypoints", *International Journal of Computer Vision*, 60(2) 2004, 91-110.

Lowell, Charles et al., "Successful Automation of GUI Driven Acceptance Testing", *LNCS* vol. 2675 May 2003, 1011-1012 pp.

Memon. Atif et al., "Automating Regression Testing for Evolving GUI Software", *J. Softw. Maint. Evol.: Res. Pract. 17* 2005, 27-64 pp.

Papageorgiou, Constantine et al., "Trainable Pedesrian Detection", *Intelligent Vehicles* 1998, 241-246 pp.

Poggio. T. et al., "Regularization Algorithms for Learning that are Equivalent to Multilayer Networks", *Science* Feb. 23, 1990, 978-982 pp.

Renninger, Laura W. et al., "When is scene identification just texture recognition?", *Vision Research* 44 2004, 2301-2311 pp.

Rumelhart, D. E. et al., "Learning Internal; Representations by Error Propagation", *Mit Press Computational Models of Cognition and Perception Series archive Parallel distributed processing: explorations in the microstructure of cognition*, vol. 1: foundations 1986, 318-362 pp.

Sajda, Paul et al., "In a blink of an eye and a switch of a transitor: Cortically-coupled computer vision", *Latex Case Files 6(1)* Mar. 2010, 1-14 pp.

Sato, Taisuke et al., "PRISM: A Language for Symbolic-Statistical Modeling", *Proceedings of the Fifteenth International Joint Conference on Artificial Intelligence* 1997, 1330-1335 pp.

Schapire, Robert E. et al., "Improved Boosting Algorithms Using Confidence-rated Predictions", *Machine Learning 37(3)* 1999, 297-336 pp.

Shet, Vinay D. et al., "Bilattice-based Logical Reasoning for Human Detection", *Proc. IEEE Conf. Computer Vision Pattern Recognition (CVPR)* 2007, 1-8 pp.

Shet, Vinay D. et al., "Multivalued Default Logic for Identity Maintenance in Visual Surveillance", *ECCV*,pp. IV 2006, 119-132 pp.

Shet, Vinay D. et al., "Predicate Logic based Image Grammars for Complex Pattern Recognition", *First International Workshop on Stochastic Image Grammars* 2009, 1 pp.

Shet, Vinay D. et al., "VidMAP: Video Monitoring of Activity with Prolog", *IEEE AVSS* 2005, 224-229 pp.

Sochman, Jan et al., "WaldBoost-Learning for Time Constrained Sequential Detection", *CVPR05*, pp. ll 2005, 150-156 pp.

Taskar, Ben et al., "Discriminative Probabilistic Models for Relational Data", *Proceedings of the Eighteenth Conference on Uncertainty in Artificial Intelligence* 2002, 1-8 pp.

Todorovic. Sinisa et al., "Learning Subcategory Relevance for Category Recognition", *CVPR08* 2008, 1-8 pp.

Towell, Geoffrey G. et al., "Refinement of Approximate Domain Theories by Knwledge-Based Neural Networks", *Proceedings of the Eighth National Conference on Artificial Intelligence* 1990, 861-866 pp.

Tu, Zhuowen et al., "Image Parsing: Unifying Segmentation, detection, and Recognition", *IEEE Computer Society 63(2)* 2005, 113-140 pp.

Tu, Zhuowen et al., "Image Segmentation by data-Driven Markov Chain Monte Carlo", *IEEE Transactions on Pattern Analysis and Machine Intelligence 24* 2002, 657-673 pp.

Varma, Manik et al., "A Statistical Approach to Texture Classification from Single Images", *International Journal of Computer Vision: Special Issue on Texture Analysis and Synthesis* 2004, 1-34 pp.

Viola, Paul et al., "Rapid Object Detection using a Boosted Cascade of Simple Features", *IEEE Conference on Computer Vision and Pattern Recognition (CVPR'01)* 2001, 1-9 pp.

Viola, Paul et al., "Robust Real-time Object Detection", *Tech. Rep. CRL2001/01, Cambridge Research Laboratory* 2001, 1-24 pp.

Wang, Wiley et al., "Heirarchical Stochastic Image Grammars for Classification and Segmentation.", *IEEE Trans. Image Processing 15* 2006, 3033-3052 pp.

Wu, B. et al., "Detection and Tracking of Multiple, Partially Occluded Humans by Bayesian Combination of Edgelet Based Part Detectors", *International Journal of Computer Vision 75(2)* 2007, 247-266 pp.

Wu. Bo et al., "Detection of Multiple, Partially Occluded Humans in a Single Image by Bayesian Combination of Edgelet Part Detectors", *ICCV* 2005, 1-8 pp.

Zhu, Song-Chun et al., "A Stochastic Grammar of Images", *Found. Trends. Comput. Graph. Vis.* 2(4) 2006, 259-362 pp.

Zhu, Qiang et al., "Fast Human Detection Using a Cascade of Histograms of Oriented Gradients", *CVPR06*, pp. II 2006, 1491-1498 pp.

Zhu, Long et al., "Unsupervised Structure Learning: Hierarchical Recursive Composition, Suspicious Coincidence and Competitive Exclusion", *Computer Vision—ECCV* 2008, 1-14 pp.

* cited by examiner $\phi(human(X,Y,S) \leftarrow head(X,Y,S),$
$\qquad sceneconsistent(X,Y,S))) = (\alpha_1, \beta_1)$
$\phi(human(X,Y,S) \leftarrow not(torso(X,Y,S),$
$\qquad torso\_occluded(X,Y,S,X_0,Y_0,S_0),$
$\qquad human(X_0,Y_0,S_0),$
$\qquad Y_0 > Y) = (\alpha_2, \beta_2).$
$\phi(\neg human(X,Y,S) \leftarrow not(ongroundplane(X,Y,S))) = (\alpha_3, \beta_3)$
$\phi(\neg human(X,Y,S) \leftarrow not(head(X,Y,S))) = (\alpha_4, \beta_4)$ (a)          (b)

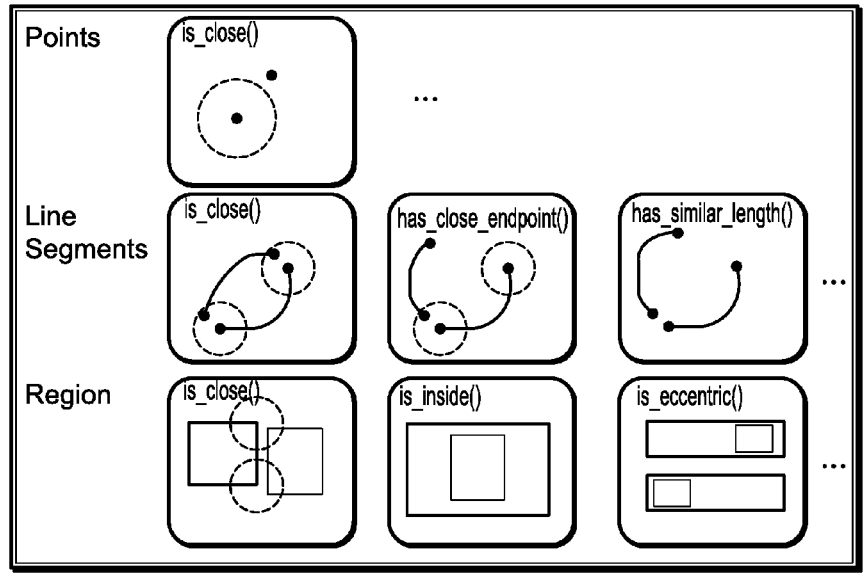

FIG. 19 i. PushbuttonStart(a,b) ◁ Pushbutton(a,b).
ii. Pushbutton(a,b) ◁ RectangularTextual(a,b) ∨ CircularTextual(a,b)
  ; [1, 0].
ii. RectanglularTextual(a,b)◁ Rectangle(a,b) ∧ TextCluster(e,f)
  : is_inside(c,d,e,f)
    ∧ is_close( compute_center(a,b), compute_center(e,f))
  : ; [0.9, 0].
iv. Rectangle (a,b) ◁ CompleteRectangle(a,b).
v. CompleteRectangle(a,b) ◁ OrthPair(p1,r1) ∧ OrthPair(p2,r2)
  : is_close( compute_far_endpoints(p1,r1),
      compute_far_endpoints(p2,r2))
  : compute_intersection)r1,r2,a,b) ; [Ef, Ea].
vi. TextCluster(a,b) ◁ TextClusterSimple(a,b).
vii. TextClusterSimple(a,b) ◁ ....

FIG. 20 i. S → compStart (τ) ◁ entity (τ). ♮ δ entity (τ)
ii. δ entity(τ) → entity(τ) ◁ γ
　　　　　　| *neg* entity(τ) ◁ γ
　　　　　　| feature (τ); [Ef, Ea].♮
　　　　　　| *neg* feature (τ) ;[Ef, Ea].♮
iii. γ → config(τ) ∨ γ ♮ δconfig(τ)
　　　　| *neg* config(τ)∨ γ ♮ δconfig(τ)
　　　　| config(τ) ;[Ef, Ea].♮ δconfig(τ)
　　　　| *neg* config(τ);[Ef, Ea].♮ δconfig(τ)
iv. δconfig(τ) → config(τ)◁ ν
　　　　　　| *neg* entity(τ)◁ ν
v. ν → entity(τ) ∧ ν ♮ δentity (τ)
　　　| *neg* entity (τ)∧ ν ♮ δentity (τ)
　　　| entity (τ) : π : ρ ;[Ef, Ea].♮ δentity (τ)
　　　| *neg* entity (τ): π : ρ ;[Ef, Ea].♮ δentity (τ)
vi. π → constraint (τ) ∧ π | constraint (τ)| ε
vii. ρ → $f(\iota) \wedge \rho | f(\iota)|\epsilon$
viii. τ → $\iota | \tau, f(\iota), \tau | f(\iota), \tau | \tau, f(\iota)| f(\iota)$
ix. $\iota$ → p, $\iota$ | p | ε
x. *neg* → ¬ | Not$_{NBD}$ | Not $_{NAL}$
xi. ♮ → WhiteSpace Newline Whitespace
xii. compStart → StadiumStart | PushButtonStart | ...
xiii. entity → Stadium | Gallery | Field | ... | PushButton | rectangle | ...
xiv. config → EllipticalField | U_Gallery | ... | CircularIcon | RectangularText | ...
xv. feature → Line | GreenPatch | Circle | Text | ...
xvi. constraint → is_close | is_inside | is_perpendicular | ...
xvii. *f* → compute_center | compute_corners | compute_perimeter | ...
xviii. p → LineParam | XY-coord | ...

FIG. 21

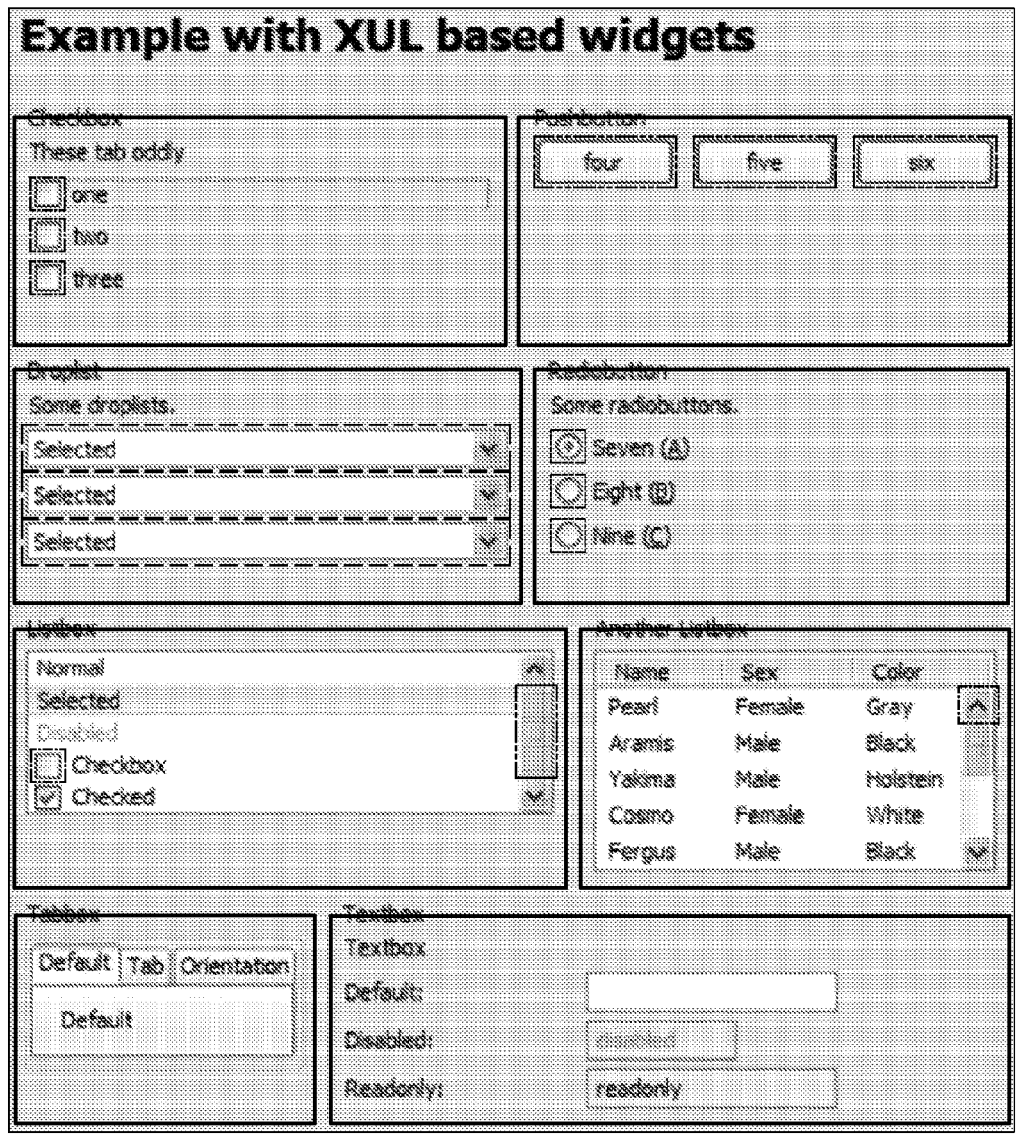
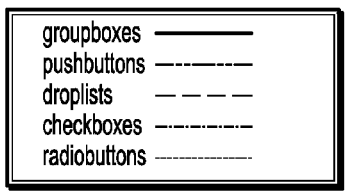
FIG. 23

```
GUI([0,0],[500,561])
    groupbox([3, 56], [248, 169])
        checkbox([14, 88], [26, 100])
        checkbox([14, 109], [26, 121])
        checkbox([14, 130], [26, 142])

groupbox([255, 56], [498, 169])
        pushbutton([264, 68], [330, 89])
        pushbutton([343, 68], [410, 89])
        pushbutton([423, 68], [489, 89])

groupbox([3, 181], [255, 297])
        droplist([10, 212], [246, 230])
        droplist([10, 235], [246, 253])
        droplist([10, 258], [246, 276])

groupbox([262, 181], [498, 297])
        radiobutton([273, 214], [285, 226])
        radiobutton([273, 236], [285, 248])
        radiobutton([273, 258], [285, 270])
```

FIG. 24

| Feature type | Geometric | | | Contextual |
|---|---|---|---|---|
| Primitive | straight line | polygon | circle | scene context |
| Example classes | airfield, straight road, ... | ship, port, ... | SAM site, helipad, ... | ship, port, city, forest, road, ... |
| Example images |  |  |  | 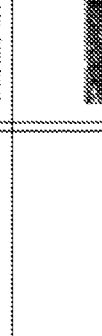 |
FIG. 29

(F1) scene_context( 'road-dirt' ) ⟶$^{0.3}$
(F2) circle( 283, 162 ) ⟶$^{0.8}$
(F3) circle( 438, 304 ) ⟶$^{0.5}$
:
(R1) sam_site( P ) ⟶$^{0.3}$ scene_context( 'road-dirt' )
(R2) ¬sam_site( P ) ⟶$^{0.2}$ scene_context( 'urban-industrial' )
:
(R3) sam_site( P ) ⟶$^{0.4}$ arrangement_of_circles( P, PList )
(R4) arrangement_of_circles( P, PList ) ⟶$^{1.0}$
(
    find_six_circles( P1, P2, P3, P4, P5, P6 ),
    compute_centroid( P1, P2, P3, P4, P5, P6, P ),
    Tolerance is 2.0,
    geometry_constraint_hexagon( P1, P2, P3, P4, P5, P6, P, Tolerance ),
    PList = [P1, P2, P3, P4, P5, P6]
)
:

FIG. 30

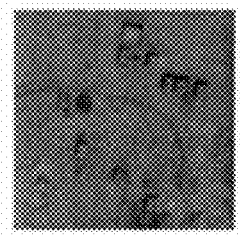 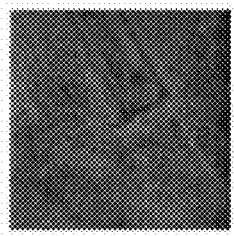 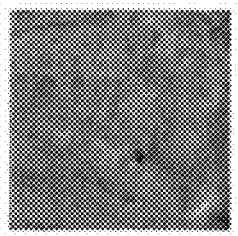
pos_c0.509810_y119...    pos_c0.508494_y114...    pos_c0.502309_y788...
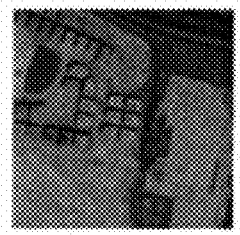 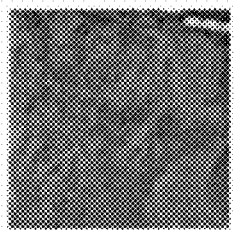 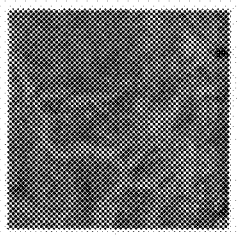
pos_c0.485103_y328...    pos_c0.483534_y598...    pos_c0.482216_y977...
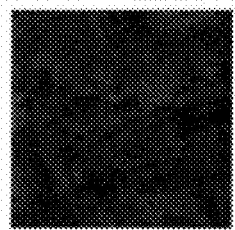 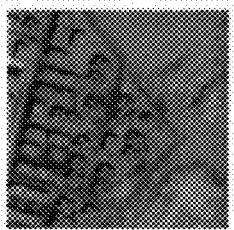 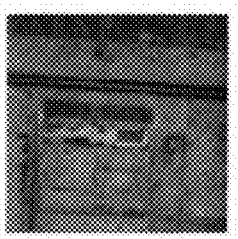
pos_c0.476043_y137...    pos_c0.475923_y132...    pos_c0.474360_y551...
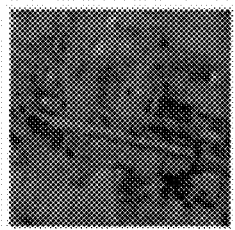 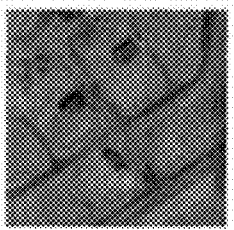 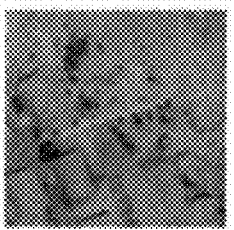
pos_c0.471680_y591...    pos_c0.471457_y253...    pos_c0.471254_y121...
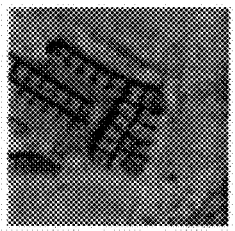 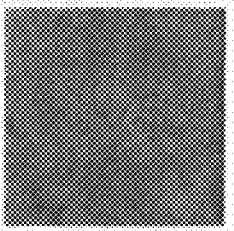 
pos_c0.467573_y250...    pos_c0.467218_y155...    pos_c0.466314_y783...
FIG. 31c    3104

PREDICATE LOGIC BASED IMAGE GRAMMARS FOR COMPLEX VISUAL PATTERN RECOGNITION

CROSS-REFERENCE TO RELATED APPLICATIONS

This application claims the benefit of U.S. Provisional Application No. 61/166,019, filed Apr. 2, 2009, which is incorporated herein by reference. This application also claims the benefit of U.S. Provisional Application No. 61/257,093, filed Nov. 2, 2009, which is incorporated herein by reference.

GOVERNMENT CONTRACT

This invention was made with Government support under Government contract No. NBCHC080029, awarded by DARPA. The Government has certain rights in the invention.

BACKGROUND OF THE INVENTION

The present invention relates to methods and apparatus for computer vision. In particular, it relates to methods and systems for computer reasoning to detect an object in an image.

Reliably detecting patterns in visual data has been the primary goal of computer vision research for several years. Such patterns could be strictly spatial in nature, like static images of pedestrians, bicycles, airplanes etc., or they could be spatio-temporal in nature, like patterns of human or vehicular activity over time. Complex patterns tend to be compositional and hierarchical—a human can be thought to be composed of head, torso and limbs—a head to be composed of hair and face—a face to be composed of eyes, nose, mouth. Such patterns also tend to be challenging to detect, robustly as a whole, due to high degree of variability in shape, appearance, partial occlusions, articulation, and image noise among other factors. While the computer vision community has made significant headway in designing fairly robust low level, local feature detectors, such feature detectors only serve to detect parts of the larger pattern to be detected. Combining the detections of parts into a context sensitive, constraint satisfying set of pattern hypotheses is a non-trivial task. The key questions we will answer are how to represent knowledge of what the pattern looks like in a hierarchical, compositional manner and how this knowledge can be exploited to effectively search for the presence of the patterns of interest.

Predicate logic based reasoning approaches provide a means of formally specifying domain knowledge and manipulating symbolic information to explicitly reason about the presence of different patterns of interest. Such logic programs help easily model hierarchical, compositional patterns to combine contextual information with the detection of low level parts via conjunctions, disjunctions and different kinds of negations. First order predicate logic separates out the name, property or type of a logical construct from its associated parameters and further, via the use of existential and universal quantifiers, allows for enumeration over its parameters.

This provides for a powerful language that can be used to specify pattern grammars to parse a set of image features to detect the presence of the pattern of interest. Such pattern grammars encode constraints about the presence/absence of predefined parts in the image, geometric relations over their parameters, interactions between these parts and scene context, and search for solutions best satisfying those constraints. Additionally, it is straightforward to generate proofs or justifications, in the form of parse trees, for the final solution thus permitting direct analysis of the final solution in a linguistic form.

While formal reasoning approaches have long been used in automated theorem proving, constraint satisfaction and computational artificial intelligence, historically, their use in the field of computer vision has remained limited. In addition to the ability to specify constraints and search for patterns satisfying those constraints, it is important to evaluate the quality of the solution as a function of the observation and model uncertainty. One of the primary inhibiting factors to a successful integration of computer vision and first order predicate logic has been the design of an appropriate interface between the binary-valued logic and probabilistic vision output. Bilattices, algebraic structures introduced by "Ginsberg, M. L.: Multivalued logics: Uniform approach to inference in artificial intelligence. Comput. Intelligence (1988)", provide a means to design exactly such an interface to model uncertainties for logical reasoning.

Unlike traditional logics, predicate logics extended using the bilattice-based uncertainty handling formalism, associate uncertainties with both logical rules (denoting degree of confidence in domain knowledge) and observed logical facts (denoting degree of confidence in observation). These uncertainties are taken from, and semantically interpreted within, a set structured as a bilattice. Modeling uncertainties in the bilattice facilitates independent representation of both positive and negative constraints about a proposition and furthermore provides tolerance for contradictory data inherent in many real-world applications. Performing inference in such a framework is also, typically, computationally efficient.

The predicate logic based approach extended using the bilattice formalism can therefore be used to encode pattern grammars to detect whether or not a specific pattern exists in an image, where in the image the pattern exists (via instantiated parameters of the predicates), why the system thinks the pattern exists (via proofs) and finally how strongly it thinks the pattern exists (final inferred uncertainty). Due to these characteristics, bilattice based logical reasoning frameworks appear to be promising candidates for use in time-sensitive, resource-bound, computer vision applications. In "Shet, V., Harwood, D., Davis, L.: Multivalued default logic for identity maintenance in visual surveillance. In: ECCV, pp. IV: 119-132 (2006)" and in "Shet, V., Neumann, J., Ramesh, V., Davis, L.: Bilattice-based logical reasoning for human detection. In: CVPR (2007)" it has been shown the applicability of such a formalism in computer vision problems such as activity recognition, identity maintenance and human detection. Arieli et al. in "Arieli, O., Cornelis, C., Deschrijver, G.: Preference modeling by rectangular bilattices. Proc. 3rd International Conference on Modeling Decisions for Artificial Intelligence (MDAI'06) (3885), 22-33 (2006)" have applied such frameworks in machine learning for preference modeling applications. Theoretical aspects of these frameworks have been studied by "Arieli, O., Cornelis, C., Deschrijver, G., Kerre, E.: Bilattice-based squares and triangles. Symbolic and Quantitative Approaches to Reasoning with Uncertainty pp. 563-575 (2005)", "Fitting, M. C.: Bilattices in logic programming. In: 20th International Symposium on Multiple-Valued Logic, Charlotte, pp. 238-247. IEEE CS Press, Los Alamitos (1990)" and "Ginsberg, M. L.: Multivalued logics: Uniform approach to inference in artificial intelligence. Comput. Intelligence (1988)."

Accordingly, novel and improved apparatus and methods are required to represent knowledge of what an image pattern looks like in a hierarchical, compositional manner and to apply such represented knowledge to effectively search for the presence of the patterns of interest in an image.

SUMMARY OF THE INVENTION

In accordance with an aspect of the present invention methods and systems are provided for implementing a predicate logic based image grammar on a processor.

Predicate logic based reasoning approaches provide a means of formally specifying domain knowledge and manipulating symbolic information to explicitly reason about different concepts of interest. Extension of traditional binary predicate logics with the bilattice formalism permits the handling of uncertainty in reasoning, thereby facilitating their application to computer vision problems. Herein, a grammar is provided in accordance with an aspect of the present invention using first order predicate logics, extended with a bilattice based uncertainty handling formalism, as a means of formally encoding pattern grammars, to parse a set of image features, and detect the presence of different patterns of interest. Detections from low level feature detectors are treated as logical facts and, in conjunction with logical rules, used to drive the reasoning. Positive and negative information from different sources, as well as uncertainties from detections, are integrated within the bilattice framework. It is shown that this approach can also generate proofs or justifications, in the form of parse trees, for each hypothesis it proposes thus permitting direct analysis of the final solution in linguistic form. Automated logical rule weight learning is an important aspect of the application of such systems in the computer vision domain. A rule weight optimization method is provided which casts the instantiated inference tree as a knowledge-based neural network, interprets rule uncertainties as link weights in the network, and applies a constrained, back-propagation algorithm to converge upon a set of rule weights that give optimal performance within the bilattice framework.

The herein provided predicate logic based pattern grammar formulation in one embodiment is employed to encode knowledge describing, and to detect, a wide variety of visual patterns, including, but not limited to, purely spatial patterns in images (such as static images of humans, cars, animals, man made objects etc.) as well as spatio-temporal patterns in videos, (such as activities of humans over space and time, like a person stealing a bag, or using a vending machine, or a car passing another car, etc.). The herein provided predicate logic based pattern grammar formulation is implemented on a processor based system (which is described herein later in more detail) and evaluated on a representative class of applications for both spatial as well as spatio-temporal visual patterns to the problems of (a) detecting the presence of humans under partial occlusions and (b) detecting large complex man made structures as viewed in images as generated by for instance satellite imagery (c) searching for human and vehicular activity patterns in surveillance videos and (d) graphical user interfaces (GUIs). An optimization approach for implementation on a processor based system is also provided and is evaluated on real as well as simulated data and show favorable results.

Modeling objects using formal grammars has recently regained much attention in computer vision. For instance, AND-OR graphs for modeling compositional concepts has found application in the context of recent Bayesian modeling approaches. On the other hand, logic programming, such as bilattice based logical reasoning (BLR), is also very well suited for such compositional modeling. However, in the past, the latter has been used in an unconstrained way, while compositional object descriptions are preferred to be hierarchical for several reasons, including modularity, robustness and computational efficiency. To better align logic programs and compositional object hierarchies, in accordance with an aspect of the present invention a formal grammar is provided, which can guide domain experts to describe objects. This is achieved by introducing a context-sensitive specification grammar. The specification grammar is a meta-grammar, the language of which is the set of all possible object grammars. Such object grammars are compositional representations of an object class, and are abstract enough to be implemented in a variety of possible extended logic programs. The practicality of the approach is demonstrated by an automatic compiler that translates example object grammars into a BLR logic program. The BLR logic program is applied to a vision related problem in software testing, i.e., the parsing of a graphical user interface (GUI). Experiments demonstrate the effectiveness of the method.

Automating GUI testing is technologically practicable, but not usually economically practical. The reason is that most GUIs are subject to frequent changes that often require a major rewrite of test scripts. In accordance with a further aspect of the present invention a method is presented to provide GUI test automation robust to these changes. This is done by mapping the low-level artifacts of the GUI, such as images or HTML, to a higher-level, more-slowly-changing business object model of the system under test. The effort to create and maintain this mapping must be considerably less than the effort of creating the test scripts.

In accordance with another aspect of the present invention a grammar formulation and inference engine is provided to allow for a quick and efficient system setup for structure or object detection when given a new detection challenge with unseen (complex) object classes. It provides a general and extensible formalism, the main task of which is to provide a modeling on a mid and high level. In particular, the formalism addresses: Knowledge representation: The formalism provides a means in that informal descriptions of domain and object properties can be cast into a formal grammar representation. Uncertainties: The knowledge representation allows for association with uncertainties. Inference: The formalism provides a reasoning agent that can probabilistically infer about user queries, e.g., about the presence of an object, given a knowledge representation and a set of observations which can be a set of low-level feature observations.

DESCRIPTION OF THE DRAWINGS

FIG. 19 illustrates a dictionary of relations;

FIG. 20 illustrates an object grammar;

FIG. 21 illustrates a specification grammar;

FIG. 23 illustrates detection results on a sample image;

FIG. 24 illustrates a parse tree of a GUI image;

FIG. 29 illustrates examples of low-level features used in a computer vision module;

FIG. 30 illustrates a subset of facts and a rule base for detecting SAM sites;

FIGS. 31a, 31b and 31c illustrate computer vision results for SAM site detection in accordance with an aspect of the present invention;

DESCRIPTION OF A PREFERRED EMBODIMENT

Detecting specific object patterns in static images is a difficult problem. This difficulty arises due to wide variability in appearance of the pattern, possible articulation, deformation, view point changes, illumination conditions, shadows and reflections, among other factors. While detectors can be trained to handle some of these variations and detect object patterns individually, as a whole, their performance degrades significantly when the pattern visually deviates from this predefined template. While such deviations can potentially be caused by all the variations listed above, the two most significant causes of such deviations are (a) partial occlusions of the pattern, by other patterns either of the same or different class, and (b) pattern deformations, either due to object articulation, or in case of man made objects due to different functional requirements.

Part based detectors are typically better suited to handle such deviations in such patterns because they can, in principle, be used to detect local object components, which can then be assembled together to detect the whole object. However, the process of going from a set of component detections to a set of scene consistent, context sensitive, pattern hypotheses is far from trivial. Since part based detectors only learn part of the information from the whole pattern, they are typically less reliable and tend to generate large numbers of false positives. Occlusions and local image noise characteristics also lead to missed detections. It is therefore important to not only exploit contextual, scene geometry and specific object constraints to weed out false positives, but also be able to explain as many valid missing object parts as possible to correctly detect all patterns.

At least four object classes will be explored: (a) pedestrians, viewed in a surveillance setting, potentially under partial occlusions and (b) large, complex, deformable, man made structures as viewed in aerial satellite images (c) Activities of humans and vehicles in a surveillance video and (d) Images of Graphical User Interfaces (GUI).

Figure 1:
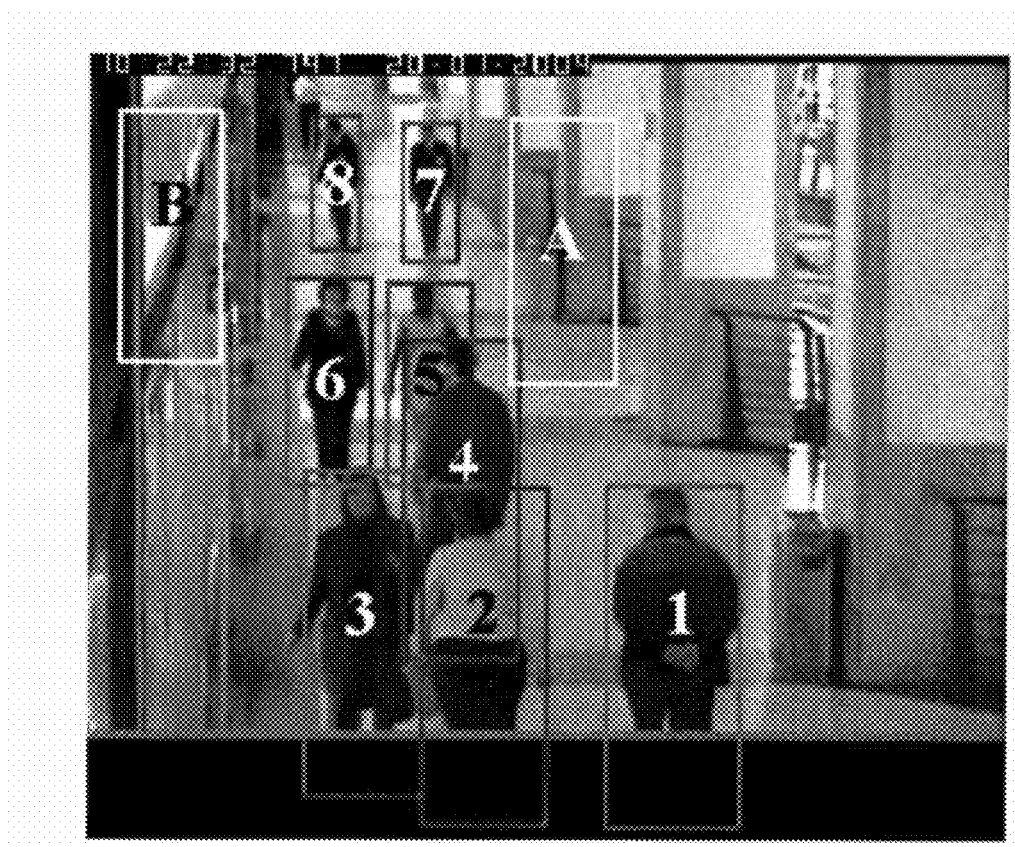
FIG. 1 is an image illustrating valid human detections and false positives.

Now referring to FIG. 1, this figure shows a number of humans that are occluded by the scene boundary as well as by each other. It also shows two false positives in boxes marked as A and B. Ideally, a human detection system should be able to reason about whether a hypothesis is a human or not by aggregating information provided by different sources, both visual and non-visual. For example, in FIG. 1, the system should reason that it is likely that an individual marked inside a box in FIG. 1 as 1 is human because two independent sources, the head detector and the torso detector report that it is a human. The absence of legs in 1 indicates it is possibly not a human, However this absence can be justified due to their occlusion by the image boundary. Furthermore, hypothesis 1 is consistent with the scene geometry and lies on the ground plane. Since the evidence for it being human exceeds evidence against, the system should decide that it is indeed a human. Similar reasoning applies to individual inside box in FIG. 1 marked as 4, only its legs are occluded by human inside box marked 2. Evidence against A and B (inconsistent with scene geometry and not on the ground plane respectively) exceeds evidence in favor of them being human and therefore A and B should be rejected as being valid hypotheses.

Figure 2:
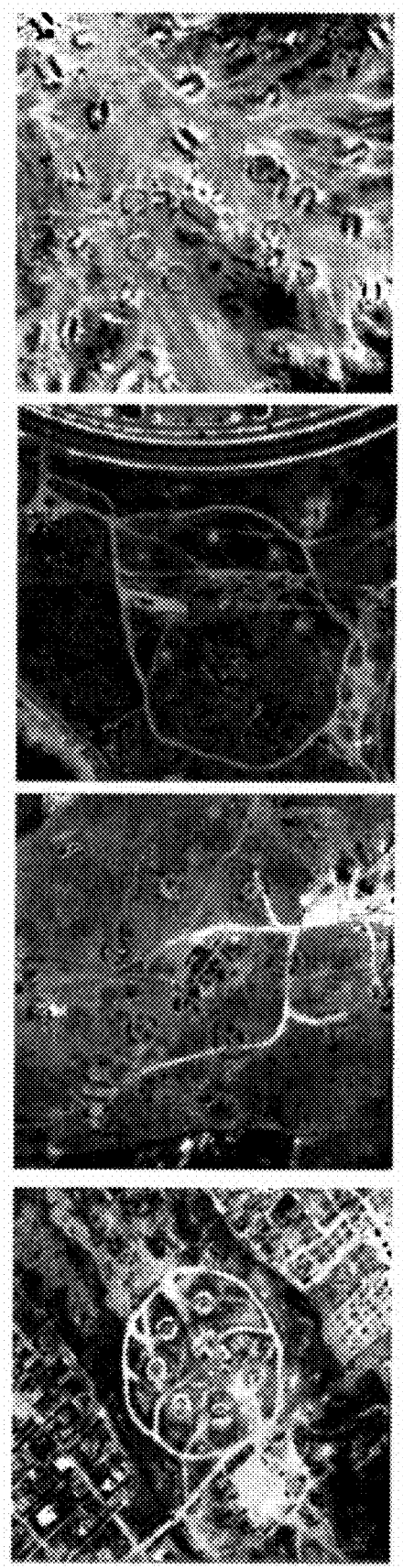
FIG. 2 provides aerial images of SAM sites.

FIG. 2 shows examples of a large man made object as viewed from a satellite. These objects, surface to air missile (SAM) sites, are highly variable in shape and generally very hard to discern from background clutter. However, the key signatures of these objects include the functional arrangement of its constituent missile launchers, contextual information such as the geographical and topological structure of its neighboring regions and the general arrangement of physical access structures around it. It is needed to be able to capture this information and encode it as constraints that support or refute the given hypothesis.

Figure 33:
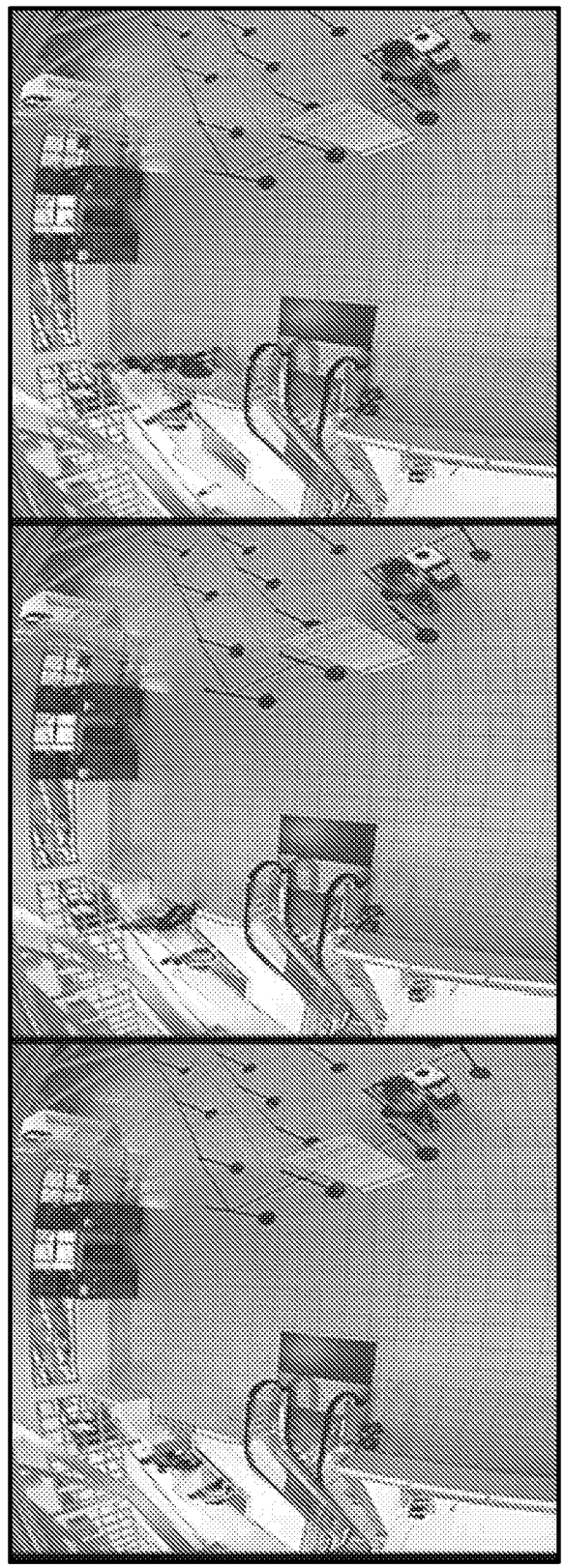
FIG. 33 illustrates multiple frames taken from surveillance video within a typical airport showing a scene with stairs and an escalator side by side, and people using the stairs to get to the top level.

FIG. 33 shows a sequence of image frames that depict humans climbing up stairs in an airport environment. In this situation, we want to ascertain from videos alone, and by observing the behaviors of the humans interacting with the scene, whether or not the escalator is functioning. One way to detect this is to check to see if one observes humans use the stairs over a long period of time, such that in that period of time, no human was observed using the escalator. This information needs to be encoded as spatio-temporal constraints that support or refute the hypothesis of whether or not the escalator is functioning.

Herein a predicate logic based approach is provided that reasons and detects spatial and spatio-temporal patterns in the manner outlined above. In this framework, knowledge about contextual cues, scene geometry, temporal constraints, and object pattern constraints is encoded in the form of rules in a logic programming language that is processed by a processor and applied to the output of low level component, parts based detectors. Positive and negative information from different rules, as well as uncertainties from detections are integrated within an uncertainty handling formalism known as the bilattice framework. This approach can also generate proofs or justifications for each hypothesis it proposes. These justifications (or lack thereof) are further employed by a system that comprises at least a processor and memory to explain and validate, or reject potential hypotheses. This allows the system to explicitly reason about complex interactions between object patterns and handle occlusions, deformations and other variabilities. Proofs generated by this approach are also available to an end user as an explanation of why the system thinks a particular hypothesis is actually a pattern of interest.

Past work is described on pattern grammar formalisms and statistical relational learning. The use of predicate logic based pattern grammars to the problem of detecting complex object patterns in static images is also described. The use of the bilattice framework to handle uncertainties inherent in such pattern detection problems will be described and motivated. At least three applications of this framework: (a) detection of partially occluded humans in static images (b) detection of man made objects in aerial imagery, and (c) detection of human and vehicular activities in surveillance videos will be provided. Testing of a Graphical User Interface (GUI) will also be provided. The human detection system is tested on the 'USC pedestrian set B' as provided in "Wu, B., Nevatia, R.: Detection of multiple, partially occluded humans in a single image by bayesian combination of edgelet part detectors. ICCV (2005). Beijing", USC's subset of the CAVIAR dataset as provided in "CAVIAR: Context Aware Vision using Image-based Active Recognition, Internet Homepages at the WWW." (This dataset will henceforth be referred to in this paper as the USC-CAVIAR dataset). It is also evaluated herein on a dataset that was collected separately. Herein, this separately collected dataset is referred to as Dataset-A. The aerial object detection system is evaluated on a specific type of man made object—surface to air missile site. Automatically optimizing parameters associated with the specified knowledge base is an important aspect of such a system. An approach that interprets the instantiated proof tree as a knowledge based artificial neural network and performs back propagation based rule weight optimization is also provided herein. Results of the learning methodology on the problem of human detection on real and simulated data will also be reported herein.

The bilattice based logical reasoning framework along with its application to the problem of human detection has been previously published in "Shet, V., Neumann, J., Ramesh, V., Davis, L.: Bilattice-based logical reasoning for human detection. In: CVPR (2007)." The work reported in "Shet, V., Neumann, J., Ramesh, V., Davis, L.: Bilattice-based logical reasoning for human detection. In: CVPR (2007)" is at least extended herein by introducing a rule weight optimization approach and further by applying the reasoning framework to complex spatial objects. Part of the paper "Shet, V., Neumann, J., Ramesh, V., Davis, L.: Bilattice-based logical reasoning for human detection. In: CVPR (2007)," including some of the results reported, are being reproduced herein for a more self contained presentation.

Computer vision approaches can broadly be characterized by the amount of model knowledge they exploit. Model free approaches assume no prior knowledge about the structure of the world and attempt to characterize patterns directly from data. These approaches typically utilize statistical (often discriminative) classifiers whose parameters are optimized via different learning methods. Support vector machines as described in "47. Vapnik, V.: The Nature of Statistical Learning Theory. Springer Verlag, New York (1995)", boosting as described in "Schapire, R. E., Singer, Y.: Improved boosting algorithms using confidence-rated predictions. Machine Learning 37(3), 297-336 (1999)", artificial neural networks as described in "Rumelhart, D. E., Hinton, G. E., Williams, R. J.: Learning internal representations by error propagation pp. 318-362 (1986)", "LeCun, Y., Bottou, L., Bengio, Y., Haffner, P.: Gradient-based learning applied to document recognition. Proc. IEEE 86(11), 2278-2325 (1998)" and "Hinton G. E., O. S., Teh, Y.: A fast learning algorithm for deep belief nets. Neural Computation pp. 1527-1554 (2006)", or regularization networks as described in "Poggio, T., Girosi, F.: Regularization algorithms that are equivalent to multilayer networks. Science pp. 978-982 (1990)", are examples of such approaches. In computer vision, some of these approaches operate by performing classification directly on image pixels as described in "LeCun, Y., Bottou, L., Bengio, Y., Haffner, P.: Gradient-based learning applied to document recognition. Proc. IEEE 86(11), 2278-2325 (1998)", while others perform classification on extracted feature vectors as described in "Viola, P., Jones, M. J.: Robust real-time object detection. Tech. Rep. CRL 2001/01, Cambridge Research Laboratory (2001)" and "Csurka, G., Dance, C. R., Fan, L., Willamowski, J., Bray, C.: Visual categorization with bags of keypoints. In: Workshop on Statistical Learning in Computer Vision, ECCV, pp. 1-22 (2004)." Such approaches typically require large volumes of training data to adequately capture all pattern variations.

Model based approaches on the other hand exploit some form of knowledge of the world to compactly describe the pattern of interest. Since the model already captures what the pattern and, to some extent, its variations should look like, the amount of data required for optimization is typically less than that for model free approaches. Models are often formalized in a generative Bayesian paradigm, based on/motivated from physical or geometric principles and are represented by associated probability distributions.

Herein at least one focus is on model based approaches. In general, there exist three aspects of model based approaches one needs to consider: (1) Knowledge representation (2) Learning and (3) Inference. In the knowledge representation step, different variables that influence the final decision are identified and dependencies between these variables are made explicit. The learning step next, numerically captures the nature of the dependencies between different variables and how they influence each other. Finally, in the inference step, real world observations and their likelihoods are combined with the knowledge structure as well as the learnt relationships between variables to arrive at a likelihood of the final decision. Variations in the type of knowledge representation, methodology/approximations of inference, and the type of learning approach give rise to different flavors of such approaches as described in "Binford, T. O., Levitt, T. S.: Evidential reasoning for object recognition. IEEE Trans. Pattern Anal. and Mach. Intell. 25(7) (2003)", "Mann, W. B.: Three dimensional object interpretation of monocular grayscale images. Ph.D. thesis, Department of Electrical Engineering, Stanford University (1995)", "Ponce, J., Chelberg, D., Mann, W.: Invariant properties of straight homogeneous generalized cylinders and their contours. IEEE Trans. Pattern Anal. and Mach. Intell. 11(9), 951-966 (1989)", "Ramesh, V.: Performance characterization of image understanding algorithms. Ph.D. thesis, University of Washington, Seattle (1995)" and "Zhu, S. C., Mumford, D.: A stochastic grammar of images. Found. Trends. Comput. Graph. Vis. 2(4), 259-362 (2006)."

Stochastic image grammars will be reviewed herein, a class of model based approaches that attempt to encode a grammar for visual patterns. Statistical relational learning based approaches that combine first order logic with probabilistic reasoning will also be reviewed. And the provided predicate logic based pattern grammar formulation will be contrasted with these two classes of approaches.

Stochastic Image Grammars

Stochastic image grammar based approaches formally model visual patterns as compositions of their constituent parts. Based on this model, these approaches then attempt to parse an image (or its extracted features) to detect the presence of that pattern of interest. Due to the nature of compositionality in images, such models typically tend to be hierarchical (i.e., trees, or DAGs in case of shared parts), with each level capturing a representation of the pattern at a particular granularity. Typical challenges associated with such approaches are (1) the formulation of the pattern grammar syntax (2) learning of these pattern grammars from data (both structure and parameters), and (3) inference.

Various grammar approaches have been proposed in recent literature that attempt to tackle different aspects of the challenges described above. Zhu and Mumford in "Zhu, S. C., Mumford, D.: A stochastic grammar of images. Found. Trends. Comput. Graph. Vis. 2(4), 259-362 (2006)", for instance, use an AND-OR graph representation that models objects as a hierarchy of conjunctions and disjunctions of parts along with spatial and functional relations between nodes. In order to account for computational cost, they employ data driven probabilistic sampling methods to perform inference.

Fidler and Leonardis in "Fidler, S., Leonardis, A.: Towards scalable representations of object categories: Learning a hierarchy of parts. Proc. IEEE Conf. Computer Vision Pattern Recognition (CVPR) (2007)" propose a framework for learning hierarchical, compositional representation of multiple class objects. They demonstrate that due to the deep hierarchical nature, several intermediate nodes in the tree get shared across multiple object classes. The growth in size of the hierarchy, and hence computational complexity, is highly sub-linear as the number of modeled classes is increased. This is one of the primary advantages of hierarchical approaches.

Todorovic et al. in "Todorovic, S., Ahuja, N.: Learning subcategory relevances for category recognition. In: CVPR08, pp. 1-8 (2008)" also address the issue of designing models that share intermediate nodes across multiple object classes. In the context of categories that share certain parts, they aim at learning the underlying part taxonomy, relevances, likelihoods, and priors of those parts. They propose an inference approach where recognition is achieved by maximizing the match of the query sample with the taxonomy.

Jin and Geman in "Jin, Y., Geman, S.: Context and hierarchy in a probabilistic image model. In: CVPR, pp. 2145-2152 (2006)" propose a composition machine approach, which performs depth-first search on a restricted representation and corrects its results using re-ranking Zhu et al. in "Zhu, L., Lin, C., Huang, H., Chen, Y., Yuille, A.: Unsupervised structure learning: Hierarchical recursive composition, suspicious coincidence and competitive exclusion. Computer Vision—ECCV (2008)" propose a recursive compositional model to represent shape and visual appearance of objects at different scales. Coarse-to-fine modeling is exploited by Kokkinos and Yuille in "Kokkinos, I., Yuille, A.: HOP: Hierarchical object parsing. Proc. IEEE Conf. Computer Vision Pattern Recognition (CVPR) (2009)." Here, the authors exploit the hierarchical object representation to efficiently compute a coarse solution which is then used to guide search at a finer level.

Wang et al. in "Wang, W., Pollak, I., Wong, T., Bouman, C., Harper, M. P., Member, S., Member, S., Siskind, J. M.: Hierarchical stochastic image grammars for classification and segmentation. IEEE Trans. Image Processing 15, 3033-3052 (2006)" propose the concept of spatial random trees (SRT) as an instance of an image grammar. SRTs provide polynomial-complexity exact inference algorithms, and come with maximum-a-posteriori estimation of both the tree structure and the tree states given an image. The concept of hierarchical compositionality for image grammars has been exploited by several other researchers, as well for instance in "Geman, S., Johnson, M.: Probability and statistics in computational linguistics, a brief review. In: Mathematical foundations of speech and language processing, pp. 1-26. Springer-Verlag (2003)", "Lin, L., Peng, S., Porway, J., Zhu, S., Wang, Y.: An empirical study of object category recognition: Sequential testing with generalized samples. In: ICCV07, pp. 1-8 (2007)" and in "Tu, Z., Zhu, S.: Image segmentation by data-driven markov chain monte carlo. IEEE Transactions on Pattern Analysis and Machine Intelligence 24, 657-673 (2002)."

While the knowledge representations explored within the stochastic image grammar community have been primarily geared toward capturing hierarchical, compositional, knowledge about visual patterns, the machine learning community has focused on designing knowledge representation frameworks for general AI tasks. One such class of approaches of relevance to this paper is statistical relational learning.

Statistical Relational Learning

Statistical relational learning (SRL) as for instance described in "Kersting, K., De Raedt, L.: Towards combining inductive logic programming with Bayesian networks. Proceedings of the Eleventh International Conference on Inductive Logic Programming (2001)", "Cussens, J.: Loglinear models for first-order probabilistic reasoning. Proceedings of the Fifteenth Conference on Uncertainty in Artificial Intelligence (1999)", "Friedman, N., Getoor, L., Koller, D., Pfefier, A.: Learning probabilistic relational models. Proceedings of the Sixteenth International Joint Conference on Artificial Intelligence (1999)", "Sato, T., Kameya, Y.: Prism: A symbolic statistical modeling language. Proceedings of the Fifteenth International Joint Conference on Artificial Intelligence (1997)" and "Taskar, B., Abbeel, P., Koller, D.: Discriminative probabilistic models for relational data. Proceedings of the Eighteenth Conference on Uncertainty in Artificial Intelligence (2002)" approaches model world knowledge using a first order logic. This allows SRL approaches to specify statistics over a set of relations as opposed to between a set of ground entities. Knowledge based model construction as described in "Kersting, K., De Raedt, L.: Towards combining inductive logic programming with Bayesian networks. Proceedings of the Eleventh International Conference on Inductive Logic Programming (2001)" for instance is a combination of logic programming and Bayesian networks. The logic program specifies a template for the pattern, which when instantiated with ground observations generates a Bayesian network. Stochastic logic programs as described in "Cussens, J.: Loglinear models for first-order probabilistic reasoning. Proceedings of the Fifteenth Conference on Uncertainty in Artificial Intelligence (1999)" are a combination of logic programming and log-linear models and are a special case of knowledge based model construction. Probabilistic relational models as described in "Friedman, N., Getoor, L., Koller, D., Pfefier, A.: Learning probabilistic relational models. Proceedings of the Sixteenth International Joint Conference on Artificial Intelligence (1999)" combine frame based systems and Bayesian networks. One of the applications of SRL based approaches in the computer vision domain is documented by Fern in "Fern, A.: A simple-transition model for structured sequences. International Joint Conference on Artificial Intelligence (2005)" where logical constraints are used to infer hidden states of relational processes. This is applied to classifying specific events in video sequences.

It is typical in SRL based approaches to employ a constrained subset of full first order predicate logic, called Horn clauses. Horn clauses are clauses with at most one positive literal. The reason this constrained language is sufficient for these approaches is because first order logical rules only serve as a template to instantiate the structure of the propositional graphical model (Markov network, Bayesian network). The distributions over the variables of these graphical models are typically estimated and maintained external to the graphical model. It is in these conditional distributions that the specific nature of influence between different variables of the graphical model is captured.

Contrast to Provided Approach

Similar to the image grammar approaches reviewed above, the proposed predicate logic based approach attempts to parse object patterns by modeling and specifying pattern grammars. This grammar specification is encoded as rules in a first order logic programming language and parsing of object pattern corresponds to searching through the feature space for solutions that best satisfy these logical constraints. In contrast to the statistical relational learning based approaches, the specific nature of influence between different variables is not captured externally in conditional probability tables, but rather, directly (and weakly) encoded in the rule specification itself. Finally, the use of the bilattice formalism permits exploitation of the full expressive power of first order predicate logical language via the use of existential and universal quantifiers, conjunctions, disjunctions, definite negations, negations by default etc.

Bayesian systems assume completeness of the world model. The proposed framework relaxes such assumptions. This incompleteness of information requires explicit handing of inconsistency (along the degree of information axis). The practical benefit that arises out of this is the ease of model specification and training to learn the model (Lesser complexity implies lesser training data) and similarly less complex (and faster) inference.

Reasoning Framework

Logic programming systems employ two kinds of formulae, facts and rules, to perform logical inference. Rules are of the form "$A \leftarrow A_0, A_1, \ldots, A_m$" where each $A_i$ is called an atom and ',' represents logical conjunction. Each atom is of the form $p(t_1, t_2, \ldots, t_n)$, where $t_i$ is a term, and p is a predicate symbol of arity n. Terms could either be variables (denoted by upper case alphabets) or constant symbols (denoted by lower case alphabets). The left hand side of the rule is referred to as the head and the right hand side is the body. Rules are interpreted as "if body then head". Facts are logical rules of the form "$A \leftarrow$" (henceforth denoted by just "A") and correspond to the input to the inference process. Finally, '$\neg$' represents negation such that $A = \neg\neg A$.

Logic Based Reasoning

To perform the kind of reasoning outlined earlier, one has to specify rules that allow the system to take input from the low level detectors and explicitly infer whether or not there exists a specific pattern at a particular location. For instance, for the human detection problem, if one was to employ a head, torso and legs detector, then a possible rule would be:

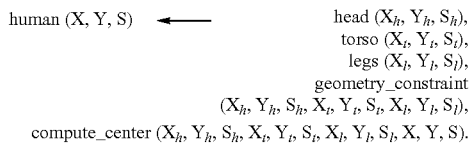

This rule captures the information that if the head, torso and legs detectors were to independently report a detection at some location and scale (by asserting facts head($X_h,Y_h,S_h$), torso($X_t,Y_t,S_t$), legs($X_l,Y_l,S_l$) respectively), and these coordinates respected certain geometric constraints, then one could conclude that there exists a human at that location and scale. A logic programming system would search the input facts to find all combinations that satisfy the rule and report the presence of humans at those locations. Note that this rule will only detect humans that are visible in their entirety. Similar rules can be specified for situations when one or more of the detections are missing due to occlusions or other reasons. There are, however, some problems with a system built on such rule specifications:

1. Traditional logics treat such rules as binary and definite, meaning that every time the body of the rule is true, the head of the rule will have to be true. For a real world system, we need to be able to assign some uncertainty values to the rules that capture its reliability.

2. Traditional logics treat facts as binary. One would like to take as input, along with the detection, the uncertainty of the detection and integrate it into the reasoning framework.

3. Traditional logic programming has no support for explicit negation in the head. There is no easy way of specifying a rule like:

$\neg$ human(X,Y,S)$\leftarrow \neg$ scene consistent(X,Y,S)

and integrating it with positive evidence. Such a rule says a hypothesis is not human if it is inconsistent with scene geometry.

4. Such a system will not be scalable. One would have to specify one rule for every situation we foresee. If one would like to include in our reasoning the output from another detector, say a hair detector to detect the presence of hair and consequently a head, one would have to re-engineer all our rules to account for new situations. A framework is preferred that allows to directly include new information without much re-engineering.

5. Finally, traditional logic programming does not have support for integration of evidence from multiple sources, nor is it able to handle data that is contradictory in nature.

Bilattice Theory

Figure 3:
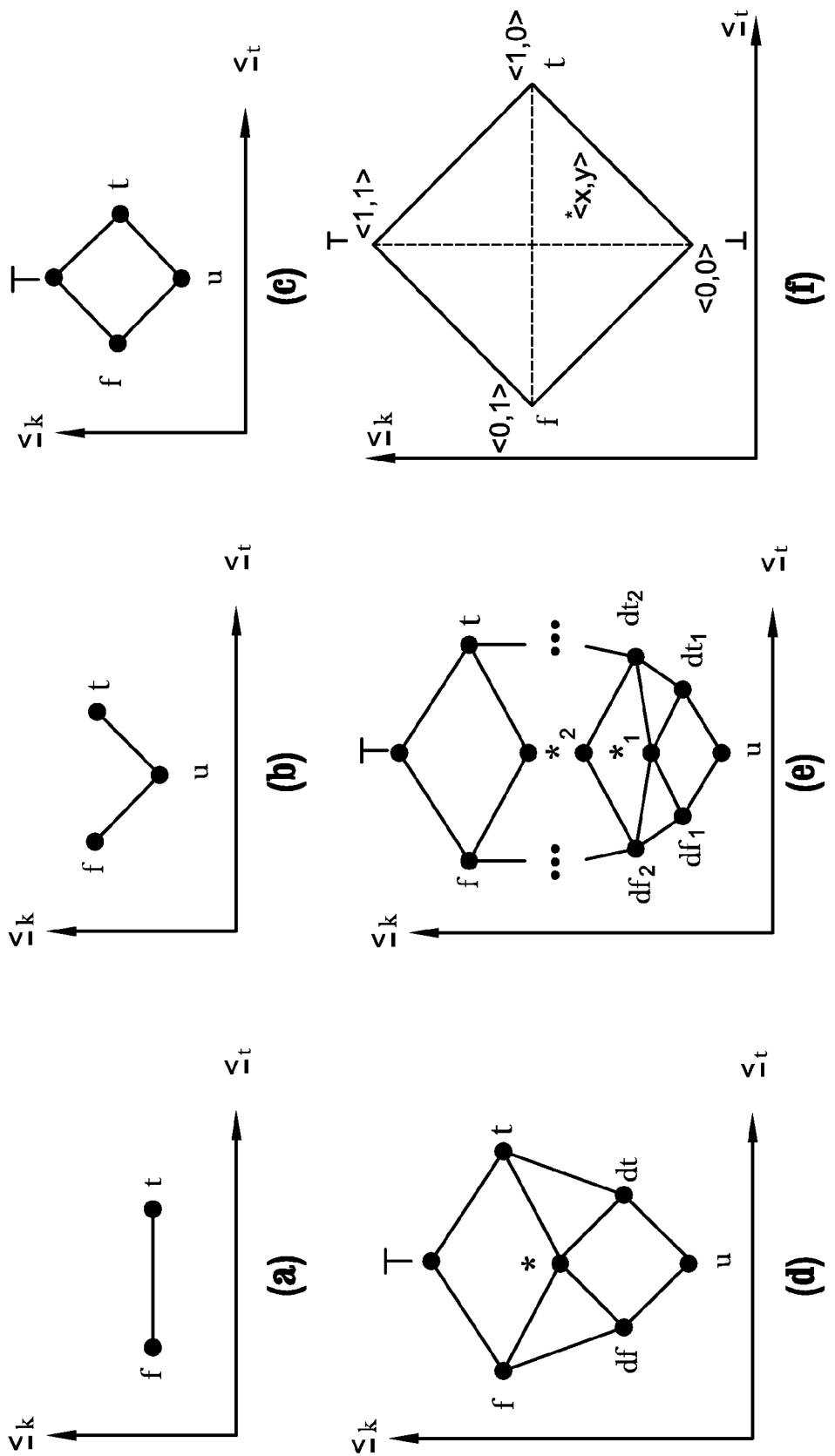
FIG. 3 illustrates different logic lattices.

Over the last several decades, in the symbolic AI community, several different approaches have been introduced that handle different aspects of the limitations discussed above. Bilattices are algebraic structures introduced by "Ginsberg, M. L.: Multivalued logics: Uniform approach to inference in artificial intelligence. Comput. Intelligence (1988)" as a uniform framework within which a number of these approaches can be modeled. Ginsberg used the bilattice formalism to model first order logic, assumption based truth maintenance systems, and formal systems such as default logics and circumscription. FIG. 3 which contains FIGS. 3a, 3b, 3c, 3d, 3e and 3f, shows examples of different bilattices and the types of logic they can be used to model. FIG. 3(a) for instance models classical two valued logic, FIG. 3(b) models three valued logics, FIG. 3(c) models Belnap's four valued logics, FIGS. 3(d) and (e) model traditional and prioritized default logics, and FIG. 3(f) models continuous valued logics.

Further to FIG. 3, the choice of different lattices that compose the bilattice give rise to different logics as shown in the figures FIG. 3(a) bilattice for two valued logics (trivial bilattice) with only true and false nodes, FIG. 3(b) bilattice for three valued logic with additional node for unknown FIG. 3(c) bilattice for four valued logics with additional node for contradiction FIG. 3(d) bilattice for default logics as described in "Ginsberg, M. L.: Multivalued logics: Uniform approach to inference in artificial intelligence. Comput. Intelligence (1988)" and "Shet, V., Harwood, D., Davis, L.: Multivalued default logic for identity maintenance in visual surveillance. In: ECCV, pp. IV: 119-132 (2006)" where dt, df and * represent true by default, false by default and contradiction between dt-df respectively FIG. 3(e) bilattice for prioritized default logics as described in "Ginsberg, M. L.: Multivalued logics: Uniform approach to inference in artificial intelligence. Comput. Intelligence (1988)" and "Shet, V., Harwood, D., Davis, L.: Multivalued default logic for identity maintenance in visual surveillance. In: ECCV, pp. IV: 119-132 (2006)" with different levels of defaults and FIG. 3(e) bilattice for continuous valued logic as described in "Arieli, O., Cornelis, C., Deschrijver, G., Kerre, E.: Bilattice-based squares and triangles. Symbolic and Quantitative Approaches to Reasoning with Uncertainty pp. 563-575 (2005)" and "Shet, V., Neumann, J., Ramesh, V., Davis, L.: Bilattice-based logical reasoning for human detection. In: CVPR (2007)" as described in this paper.

In the present case, the reasoning system is looked upon as a passive rational agent capable of reasoning under uncertainty. Uncertainties assigned to the rules that guide reasoning, as well as detection uncertainties reported by the low level detectors, are taken from a set structured as a bilattice. These uncertainty measures are ordered along two axes, one along the source's degree of information and the other along the agent's degree of belief. A single rule applied to its set of corresponding facts is referred to as a source here. There can be multiple rules deriving the same proposition (both positive and negative forms of it) and therefore we have multiple sources of information. As will be shown, this structure allows to address all of the issues raised in the previous section and provides a uniform framework which not only permits us to encode multiple rules for the same proposition, but also allows inference in the presence of contradictory information from different sources.

All of the bilattices shown in FIG. 3 are generated via differing choices of their constituent lattices. While bilattices depicted in FIGS. 3(a), (d) and (e) have been employed to address certain problems in computer vision as described in "Shet, V., Harwood, D., Davis, L.: Vidmap: video monitoring of activity with prolog. In: IEEE AVSS, pp. 224-229 (2005)" and "Shet, V., Harwood, D., Davis, L.: Multivalued default logic for identity maintenance in visual surveillance. In: ECCV, pp. IV: 119-132 (2006)", herein at least one focus is on the continuous valued logic as modeled by the bilattice shown in FIG. 3(f).

Definition 1 (Lattice) A lattice is a set L equipped with a partial ordering ≤ over its elements, a greatest lower bound (glb) and a lowest upper bound (lub) and is denoted as $\Lambda=(L,\leq)$ where glb and lub are operations from $L\times L\rightarrow L$ that are idempotent, commutative and associative. Such a lattice is said to be complete, iff for every nonempty subset M of L, there exists a unique lub and glb.

Definition 2 (Bilattice [Ginsberg, M. L.: Multivalued logics: Uniform approach to inference in artificial intelligence. Comput. Intelligence (1988)]) A bilattice is a triple $B=(B,\leq_t,\leq_k)$, where B is a nonempty set containing at least two elements and $(B,\leq_t)$, $(B,\leq_k)$ are complete lattices.

Informally a bilattice is a set, B, of uncertainty measures composed of two complete lattices $(B,\leq_t)$ and $(B,\leq_k)$ each of which is associated with a partial order $\leq_t$ and $\leq_k$ respectively. The $\leq_t$ partial order (agent's degree of belief) indicates how true or false a particular value is, with f being the minimal and t being the maximal while the $\leq_k$ partial order indicates how much is known about a particular proposition. The minimal element here is ⊥ (completely unknown) while the maximal element is □ (representing a contradictory state of knowledge where a proposition is both true and false). The glb and the lub operators on the $\leq_t$ partial order are ∧ and ∨ and correspond to the usual logical notions of conjunction and disjunction, respectively. The glb and the lub operators on the $\leq_k$ partial order are ⊗ and ⊕, respectively, where ⊕ corresponds to the combination of evidence from different sources or lines of reasoning while ⊗ corresponds to the consensus operator. A bilattice is also equipped with a negation operator ¬ that inverts the sense of the $\leq_t$ partial order while leaving the $\leq_k$ partial order intact and a conflation operator—which inverts the sense of the $\leq_k$ partial order while leaving the $\leq_t$ partial order intact.

The intuition is that every piece of knowledge, be it a rule or an observation from the real world, provides different degrees of information. An agent that has to reason about the state of the world based on this input, will have to translate the source's degree of information, to its own degree of belief. Ideally, the more information a source provides, the more strongly an agent is likely to believe it (i.e closer to the extremities of the t-axis). The only exception to this rule being the case of contradictory information. When two sources contradict each other, it will cause the agent's degree of belief to decrease despite the increase in information content. It is this decoupling of the sources and the ability of the agent to reason independently along the truth axis that helps us address the issues raised in the previous section. It is noted that the line joining ⊥ and □ represents the line of indifference. If the final uncertainty value associated with a hypothesis lies along this line, it means that the "degree of belief for" and "degree of belief against" it cancel each other out and the agent cannot say whether the hypothesis is true or false. Ideally the final uncertainty values should be either f or t, but noise in observation as well as less than completely reliable rules ensure that this is almost never the case. The horizontal line joining t and f is the line of consistency. For any point along this line, the "degree of belief for" will be exactly equal to "(1-degree of belief against)" and thus the final answer will be exactly consistent.

Definition 3 (Rectangular Bilattice [see: Fitting, M. C.: Bilattices in logic programming. In: 20th International Symposium on Multiple-Valued Logic, Charlotte, pp. 238-247. IEEE CS Press, Los Alamitos (1990) and Arieli, O., Cornelis, C., Deschrijver, G.: Preference modeling by rectangular bilattices. Proc. 3rd International Conference on Modeling Decisions for Artificial Intelligence (MDAI'06) (3885), 22-33 (2006)]) Let $\Lambda=(L,\leq_L)$ and $P=(R,\leq_R)$ be two complete lattices. A rectangular bilattice is a structure $\Lambda\odot P=(L\times R,\leq_t,\leq_k)$, where for every $x_1, x_2 \in \Lambda$ and $y_1, y_2 \in P$, 1. $\langle x_1, y_1\rangle \leq_t \langle x_2, y_2\rangle \Leftrightarrow x_1 \leq_L x_2$ and $y_1 \geq_R y_2$, 2. $\langle x_1, y_1\rangle \leq_k \langle x_2, y_2\rangle \Leftrightarrow x_1 \leq_L x_2$ and $y_1 \geq_R y_2$.

An element $(x_1, y_1)$ of the rectangular bilattice $\Lambda\odot P$ may be interpreted such that $x_1$ represents the amount of belief for some assertion while $y_1$ represents the amount of belief against it. If one denotes the glb and lub operations of complete lattices $\Lambda=(L,\leq_L)$ and $P=(R,\leq_R)$ by $\wedge_L$ and $\vee_L$ respectively, one can define the glb and lub operations along each axis of the bilattice $\Lambda \odot P$ as follows (see for instance "Arieli, O., Cornelis, C., Deschrijver, G.: Preference modeling by rectangular bilattices. Proc. 3rd International Conference on Modeling Decisions for Artificial Intelligence (MDAI'06) (3885), 22-33 (2006)" and "Fitting, M. C.: Bilattices in logic programming. In: 20th International Symposium on Multiple-Valued Logic, Charlotte, pp. 238-247. IEEE CS Press, Los Alamitos (1990)"):

$$\langle x_1, y_1\rangle \wedge \langle x_2, y_2\rangle \Leftrightarrow \langle x_1 \wedge_L x_2, y_1 \vee_R y_2\rangle, \quad (1)$$
$$\langle x_1, y_1\rangle \vee \langle x_2, y_2\rangle \Leftrightarrow \langle x_1 \vee_L x_2, y_1 \wedge_R y_2\rangle,$$
$$\langle x_1, y_1\rangle \otimes \langle x_2, y_2\rangle \Leftrightarrow \langle x_1 \wedge_L x_2, y_1 \wedge_R y_2\rangle,$$
$$\langle x_1, y_1\rangle \oplus \langle x_2, y_2\rangle \Leftrightarrow \langle x_1 \vee_L x_2, y_1 \vee_R y_2\rangle.$$

Figure 4:
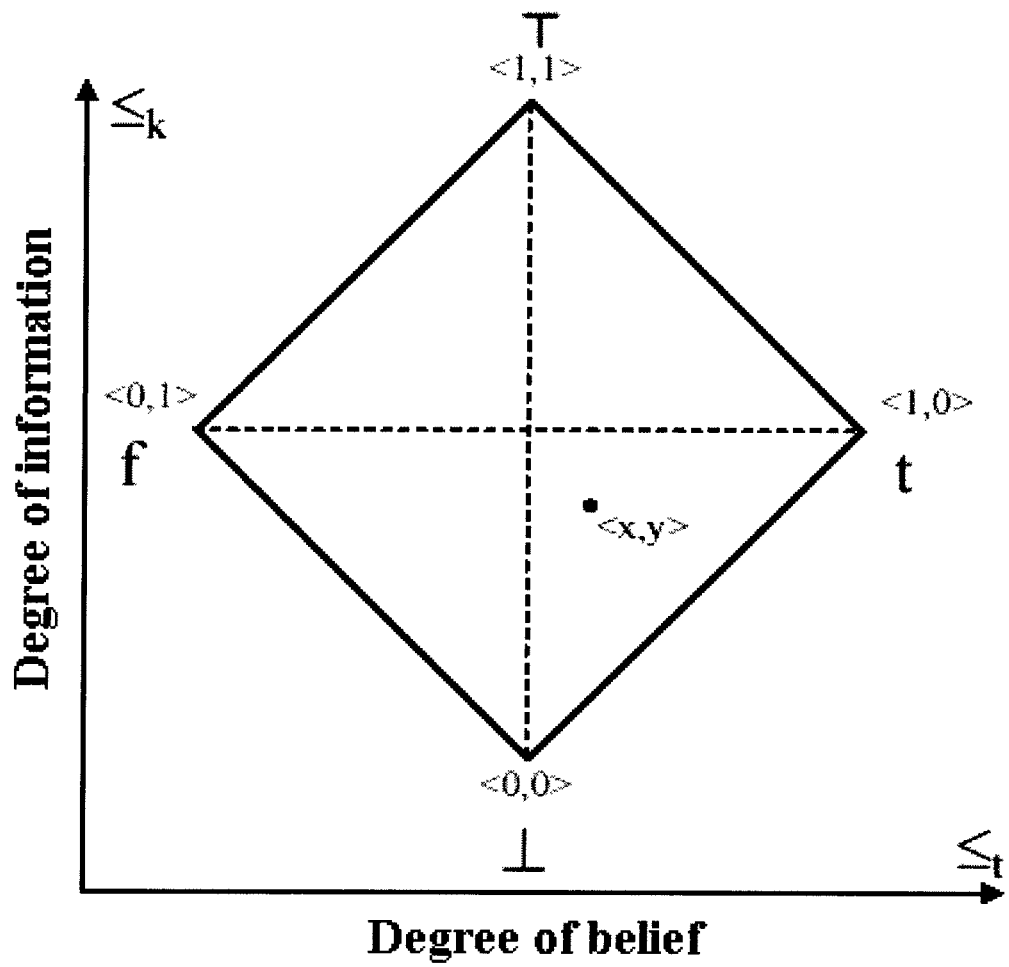
FIG. 4 illustrates a bilattice square.

Of interest in the instant case is a particular class of rectangular bilattices where A and P coincide. These structures are called squares (see "Arieli, O., Cornelis, C., Deschrijver, G., Kerre, E.: Bilattice-based squares and triangles. Symbolic and Quantitative Approaches to Reasoning with Uncertainty pp. 563-575 (2005)") and $\Lambda \odot \Lambda$ is abbreviated as $\Lambda^2$. Since detection likelihoods reported by the low level detectors are typically normalized to lie in the [0,1] interval, the underlying lattice that one is interested in is $\Lambda=([0,1],\leq)$. The bilattice that is formed by $\Lambda^2$ is depicted in FIG. 4 with the bilattice square $B=([0,1]^2,\leq_t,\leq_k)$. Every element of this bilattice is of the form $\langle$ evidence_f or, evidence_against$\rangle$. Note that with this choice of the lattice, $\leq$ becomes a complete ordering, meaning all members of the lattice are comparable. Definition 3 therefore needs to be modified such that $\langle x_1,y_1\rangle \leq_t \langle x_2,y_2\rangle \Leftrightarrow x_1-y_1 \leq x_2-y_2$ and $\langle x_1,y_1\rangle \leq_k \langle x_2,y_2\rangle \Leftrightarrow x_1+y_1 \leq x_2+y_2$. Each element in this bilattice is a tuple with the first element encoding evidence for a proposition and the second encoding evidence against. In this bilattice, the element f (false) is denoted by the element $\langle 0,1\rangle$ indicating, no evidence for but full evidence against, similarly element t is denoted by $\langle 0,1\rangle$ element $\bot$ by $\langle 0,0\rangle$ indicating no information at all and $\square$ is denoted by $\langle 1,1\rangle$. To fully define glb and lub operators along both the axes of the bilattice as listed in (1), one needs to define the glb and lub operators for the underlying lattice ([0,1],$\leq$). A popular choice for such operators are triangular-norms and triangular-conorms. Triangular norms and conorms were introduced by Schweizer and Sklar in "Schweizer, B., Sklar, A.: Associative functions and abstract semigroups. Publ. Math. Debrecen (1963)" to model the distances in probabilistic metric spaces. Triangular norms are used to model the glb operator and the triangular conorm to model the lub operator within each lattice.

Definition 4 (triangular norm) A mapping $$J: [0,1] \times [0,1] \rightarrow [0,1]$$

is a triangular norm (t-norm) iff J satisfies the following properties:
Symmetry: $J(a,b)=J(b,a), \forall a,b \in [0,1]$
Associativity: $J(a, J(b,c))=J(J(a,b),c), \forall a,b,c \in [0,1]$.
Monotonicity: $J(a,b) \leq J(a',b')$ if $a \leq a'$ and $b \leq b'$
One identity: $J(a,1)=a, \forall a \in [0,1]$.

Definition 5 (triangular conorm) A mapping $$S: [0,1] \times [0,1] \rightarrow [0,1]$$

is a triangular conorm (t-conorm) iff S satisfies the following properties:
Symmetry: $S(a,b)=S(b,a), \forall a,b \in [0,1]$
Associativity: $S(a,S(b,c))=S(S(a,b),c), \forall a,b,c \in [0,1]$.
Monotonicity: $S(a,b) \leq S(a',b')$ if $a \leq a'$ and $b \leq b'$
Zero identity: $S(a,0)=a, \forall a \in [0,1]$.

If J is a t-norm, then the equality $S(a,b)=1-J(1-a,1-b)$ defines a t-conorm and one says that S is derived from J. There are number of possible t-norms and t-conorms one can choose. In the instant case, for the underlying lattice, $L=([0,1],\leq)$, one chooses the t-norm such that $J(a,b) \equiv a \wedge_L b=ab$ and consequently chooses the t-conorm as $S(a,b) \equiv a \vee_L b=a+b-ab$. Based on this, the glb and lub operators for each axis of the bilattice B can then be defined as per (1).

Inference

Inference in bilattice based reasoning frameworks is performed by computing the closure over the truth assignment.

Definition 6 (Truth Assignment) Given a declarative language L, a truth assignment is a function $\phi: L \rightarrow B$ where B is a bilattice on truth values or uncertainty measures.

Definition 7 (Closure) Let K be the knowledge base and $\phi$ be a truth assignment, labeling every formula $k \in K$, then the closure over $k \in K$, denoted cl($\phi$) is the truth assignment that labels information entailed by K.

For example, if $\phi$ labels sentences $\{p, q \leftarrow p\} \in K$ as $\langle 1,0\rangle$ (true); i.e. $\phi(p)=\langle 1,0\rangle$ and $\phi(q \leftarrow p)=\langle 1,0\rangle$, then cl($\phi$) should also label q as $\langle 1,0\rangle$ as it is information entailed by K. Entailment is denoted by the symbol '$\square$' (K$\square$q).

Let $S_q^+ \subset L$ be the collection of minimal subsets of sentences in K entailing q. For each minimal subset $U \in S_q^+$, the uncertainty measure to be assigned to the conjunction of elements of U is $$\bigwedge_{p \in U} cl(\phi)(p) \quad (2)$$

This term represents the conjunction of the closure of the elements of U. Recall that $\wedge$ and $\vee$ are glb and lub operators along the $\leq_t$ ordering and $\otimes$ and $\oplus$ along $\leq_k$ axis. The symbols $\bigwedge, \bigvee, \bigotimes, \bigoplus$ are their infinitary counterparts such that $\bigoplus_{p \in S} p = p_1 \oplus p_2 \oplus \ldots$, and so on. It is important to note that this term is merely a contribution to the final uncertainty measure of q and not the final uncertainty measure itself. The reason it is merely a contribution is because there could be other sets of sentences in $S_q$ that entail q representing different lines of reasoning (or, in the instant case, different rules and supporting facts). The contributions of these sets of sentences need to be combined using the $\oplus$ operator along the information ($\leq_k$) axis. Also, if the expression in (2) evaluates to false, then its contribution to the value of q should be $\langle 0,0\rangle$ (unknown) and not $\langle 0,1\rangle$ (false). These arguments suggest that the closure over $\phi$ of q is $$cl(\phi)(q) = \bigoplus_{U \in S_q^+} \bot \vee \left[ \bigwedge_{p \in U} cl(\phi)(p) \right] \quad (3)$$

where $\bot$ is $\langle 0,0\rangle$. This is however, only part of the information. One also needs to take into account the sets of sentences entailing $\neg q$. Let $S_q^-$ be collections of minimal subsets in K entailing $\neg q$. Aggregating information from $S_q^-$ yields the following expression $$cl(\phi)(q) = \bigoplus_{U \in S_q^+} \perp \vee \left[ \bigwedge_{p \in U} cl(\phi)(p) \right] \oplus \neg \bigoplus_{U \in S_q^-} \perp \vee \left[ \bigwedge_{p \in U} cl(\phi)(p) \right] \quad (4)$$

For more details see "Ginsberg, M. L.: Multivalued logics: Uniform approach to inference in artificial intelligence. Comput. Intelligence (1988)"

Table 1 shows an example, using a simplified logic program, illustrating the process of computing the closure as defined above by combining evidence from three sources. In this example, the final uncertainty value computed is $\langle 0.4944, 0.72 \rangle$. This indicates that evidence against the hypothesis at (25, 95) at scale 0.9 exceeds evidence in favor of and, depending on the final threshold for detection, this hypothesis is likely to be rejected.

TABLE 1

Assume the following set of rules and facts:

| Rules | Facts |
|---|---|
| $\phi(\text{human}(X,Y,S) \leftarrow \text{head}(X,Y,S)) = \langle 0.40, 0.60 \rangle$ | $\phi(\text{head}(25,95,0.9)) = \langle 0.90, 0.10 \rangle$ |
| $\phi(\text{human}(X,Y,S) \leftarrow \text{torso}(X,Y,S)) = \langle 0.30, 0.70 \rangle$ | $\phi(\text{torso}(25,95,0.9)) = \langle 0.70, 0.30 \rangle$ |
| $\phi(\neg\text{human}(X,Y,S) \leftarrow \neg\text{scene\_consistent}(X,Y,S)) = \langle 0.90, 0.10 \rangle$ | $\phi(\neg\text{scene\_consistent}(25,95,0.9)) = \langle 0.80, 0.20 \rangle$ |

Inference is performed as follow:

$el(\phi)(\text{human}(25,95,0.9)) = \langle 0.0 \vee [\langle 0.4,0.6 \rangle \wedge \langle 0.9,0.1 \rangle] \oplus \langle 0.0 \vee [\langle 0.3,0.7 \rangle \wedge \langle 0.7,0.3 \rangle] \oplus \neg \langle 0.0 \vee [\langle 0.9,0.1 \rangle \wedge \langle 0.8,0.2 \rangle]) = \langle 0.36, 0 \rangle \oplus \langle 0.21, 0 \rangle \oplus \neg \langle 0.72, 0 \rangle = \langle 0.4944, 0 \rangle \oplus \langle 0, 0.72 \rangle = \langle 0.4944, 0.72 \rangle$ Table 1 illustrates an example showing inference using closure within a $([0,1]^2, \leq_t, \leq_k)$ bilattice.

Negation

Systems such as this typically employ different kinds of negation. One kind of negation that has already been mentioned earlier is $\neg$. This negation flips the bilattice along the $\leq_t$ axis while leaving the ordering along the $\leq_k$ axis unchanged. Another important kind of negation is negation by failure to prove, denoted by not. not(A) succeeds if A fails. This operator flips the bilattice along both the $\leq_t$ axis as well as the $\leq_k$ axis. Recall that, earlier, '−' was defined as the conflation operator that flips the bilattice along the $\leq_k$ axis. Therefore, $\phi(\text{not}(A)) = \neg -\phi(A)$. In other words, if A evaluates to $\langle 0,0 \rangle$, then not(A) will evaluate to $\langle 1,1 \rangle$. This operator is important when one wants to detect an absence of a particular body part for a hypothesis.

Generating Proofs

As mentioned earlier, in addition to using the explanatory ability of logical rules, one can also provide these explanations to the user as justification of why the system believes that a given hypothesis is a human. The system provides a straightforward technique to generate proofs from its inference tree. Since all of the bilattice based reasoning is encoded as meta-logical rules in a logic programming language, it is easy to add predicates that succeed when the rule fires and propagate character strings through the inference tree up to the root where they are aggregated and displayed. Such proofs can either be dumps of the logic program itself or be English text. In one implementation, the output of the logic program is provided as the proof tree.

Pattern Grammars

This framework can now be used to define a knowledge base to detect different patterns of interest. One may start by defining a number of predicates and their associated parameters pertinent to the problem at hand. For instance, for the human detection problem, atoms such as human(X,Y,S) (meaning there exists a human at location (X,Y) and scale S in the image), head(X,Y,S), torso(X,Y,S) etc. can be defined. Also defined are relational and geometric predicates such as above($X_1,Y_1,S_1,X_2,Y_2,S_2$), smaller($X_1,Y_1,S_1,X_2,Y_2,S_2$), sceneconsistent(X,Y,S) (meaning the hypothesis at (X,Y) and scale S is consistent with the scene geometry and conforms, within bounds, to the expected size of an object at the location.)

Figures 5, 6:
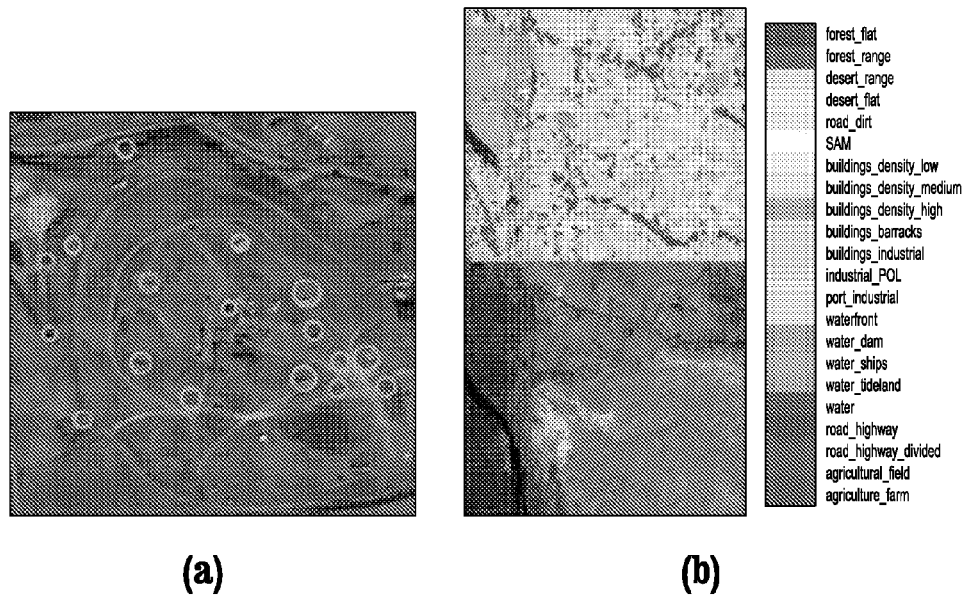
FIG. 5 illustrates a sample subset of rules for human detection.
FIG. 6 illustrates sample features detected in an aerial image.

The next step involves specification of the pattern grammar, as logical rules, over these defined atoms. Such rules would capture different aspects of the pattern to be recognized such as those shown in FIG. 5 which illustrates a sample subset of rules for human detection. Rules in such systems can be learnt automatically; however, such approaches are typically computationally very expensive. In one embodiment the rules are manually encoded while automatically learning the uncertainties associated with them as described later herein.

A desirable property of any reasoning framework is scalability. One may expect scalability in vision systems as different objects or pattern classes are hierarchically composed of constituent patterns that share features like textures, edges etc. and as objects inhabit the same optical world and are imaged by similar optical sensors. Scalability is seen herein as an aspect of the present invention as a design principle wherein the model description is modular, hierarchical and compositional, reflecting the above understanding of the world. The provided framework results in scalable systems if models are appropriately described as such.

With this goal in mind, the following design principle is provided as an aspect of the present invention for object pattern grammar specification. The rule specification is partitioned into three broad categories: object composition model based, object embodiment model based and object context model based.

Composition model Rules encoding these models capture a hierarchical representation of the object pattern as a composition of its constituent part detections. These parts might by themselves be composed of sub-parts. Rules in this category try to support or refute the presence of a pattern based on the presence or absence of its constituent parts.

Embodiment model These rules model knowledge about the object pattern's geometric layout and their embodiment in 3D projective spaces.

Context model These rules attempt to model the surrounding context within which the pattern of interest is embedded. These rules would for example model interactions between a given object and other objects or other scene structures.

As mentioned above, such an object oriented organization of the knowledge representation derives from an implicit understanding of the physical world as composed of objects. Specification and conceptual layering of rules in this manner induces a natural hierarchy in such a pattern specification. By enforcing that the specified rules are well structured, categorized into the above categories and follow general principles of composability, the scalability of the system is ensured.

It is important to note that there would typically exist multiple rules that derive the same proposition. These multiple rules are interpreted in logic programming as disjunctions (i.e. rule 1 is true or rule 2 is true etc). Writing rules in this manner makes each rule independently 'vote' for the proposition to be inferred. This disjunctive specification results in a scalable solution where the absence of a single observation does not completely preempt the final output, but merely reduces its final confidence value. As can be seen from the subset of rules in FIG. 5, the inference tree formed would be comprised of conjunctions, disjunctions and different kinds of negations.

Human Detection

Human detection in images is a hard problem. There are a number of approaches in computer vision literature that detect humans both as whole as well as a collection of parts. Leibe et al. in "Leibe, B., Seemann, E., Schiele, B.: Pedestrian detection in crowded scenes. In: CVPR05, pp. I: 878-885 (2005)" employs an iterative method combining local and global cues via a probabilistic segmentation, Gavrilla in "Gavrila, D.: Pedestrian detection from a moving vehicle. In: ECCV00, pp. II: 37-49 (2000)" and "Gavrila, D., Philomin, V.: Real-time object detection for smart vehicles. In: ICCV99, pp. 87-93 (1999)" uses edge templates to recognize full body patterns, Papageorgiou et al. in "Papageorgiou, C., Evgeniou, T., Poggio, T.: A trainable pedestrian detection system. Intelligent Vehicles pp. 241-246 (1998)" uses SVM detectors, and Felzenszwalb in "Felzenszwalb, P.: Learning models for object recognition. In: CVPR01, pp. I: 1056-1062 (2001)" uses shape models. A popular detector used in such systems is a cascade of detectors trained using AdaBoost as proposed by Viola and Jones in "Viola, P., Jones, M.: Rapid object detection using a boosted cascade of simple features. IEEE Conference on Computer Vision and Pattern Recognition (CVPR'01) (2001)." Dalal and Triggs in "Dalal, N., Triggs, B.: Histograms of oriented gradients for human detection. In: CVPR05, pp. I: 886-893 (2005)" use an SVM based classifier based on the histogram of oriented gradients. This was further extended by Zhu et al. in "Zhu, Q., Yeh, M., Cheng, K., Avidan, S.: Fast human detection using a cascade of histograms of oriented gradients. In: CVPR06, pp. II: 1491-1498 (2006)" to detect whole humans using a cascade of histograms of oriented gradients. Part based representations have also been used to detect humans. Wu and Nevatia in "Wu, B., Nevatia, R.: Detection of multiple, partially occluded humans in a single image by bayesian combination of edgelet part detectors. ICCV (2005). Beijing" use edgelet features and learn nested cascade detectors for each of several body parts and detect the whole human using an iterative probabilistic formulation. The human body part detectors provided herein as an aspect of the present invention are inspired by "Zhu, Q., Yeh, M., Cheng, K., Avidan, S.: Fast human detection using a cascade of histograms of oriented gradients. In: CVPR06, pp. II: 1491-1498 (2006)". Similar to their approach herein as an aspect of the present invention train a cascade of SVM-classifiers are trained on histograms of gradient orientations. However, instead of the hard threshold function suggested in their paper, herein as an aspect of the present invention a sigmoid function is applied to the output of each SVM. These softly thresholded functions are combined using a boosting algorithm as described in "Freund, Y., Schapire, R. E.: A decision-theoretic generalization of on-line learning and an application to boosting. Journ. of Comp. and System Sciences 55, 119-139 (1997)." After each boosting round, the probability of the partial classifier is calibrated based on an evaluation set, and set cascade decision thresholds based on the sequential likelihood ratio test similar to "Sochman, J., Matas, J.: Waldboost: Learning for time constrained sequential detection. In: CVPR05, pp. II: 150-156 (2005)". To train the parts based detector, the location of the windows used during the feature computation is restricted to the areas corresponding to the different body parts (head/shoulder, torso, legs).

The pattern grammar for the human detection problem is formulated as per the broad categories listed in the previous section. Component based rules hypothesize that a human is present at a particular location if one or more of the body part detectors described above detects a body part there. In other words, if a head is detected at some location, one may say that there exists a human there. There are positive rules, one each for the head, torso, legs and full-body based detectors as well as negative rules that fire in the absence of these detections.

Geometry based rules validate or reject human hypotheses based on geometric and scene information. This information is entered a priori in the system at setup time. Information is employed about expected height of people and regions of expected foot location. The expected image height rule is based on ground plane information and anthropometry. Fixing a Gaussian at an adult human's expected physical height allows to generating scene consistency likelihoods for a particular hypothesis given its location and size. The expected foot location region is a region demarcated in the image outside of which no valid feet can occur and therefore serves to eliminate false positives.

Context based rules are the most important rules for a system that has to handle occlusions. The idea here is that if the system does not detect a particular body part, then it must be able to explain its absence for the hypothesis to be considered valid. If it fails to explain a missing body part, then it is construed as evidence against the hypothesis being a human. Absence of body parts is detected using logic programming's 'negation as failure' operator (not). not(A) succeeds when A evaluates to ⟨0,0⟩ as described earlier. A valid explanation for missing body part could either be due to occlusions by static objects or due to occlusions by other humans.

Explaining missed detections due to occlusions by static objects is straightforward. At setup, all static occlusions are marked. Image boundaries are also treated as occlusions and marked as shown in FIG. 1 (black area at the bottom of the figure). For a given hypothesis, the fraction of overlap of the missing body part with the static occlusion is computed and reported as the uncertainty of occlusion. The process is similar for occlusions by other human hypotheses, with the only difference being that, in addition to the degree of occlusion, we also take into account the degree of confidence of the hypothesis that is responsible for the occlusion, as illustrated in the second rule in FIG. 5.

This rule will check to see if human(X,Y,S)'s torso is occluded by human(Xo,Yo,So) under condition that Yo>Y, meaning the occluded human is behind the 'occluder'. It is important to note that this would induce a scene geometry constrained, hierarchy in the parse graph, since whether or not a given hypothesis is a human depends on whether or not a hypothesis in front of it was inferred as being a valid pattern of interest. There exist similar rules for other components and also rules deriving ¬ human in the absence of explanations for missing parts.

Aerial Object Detection

Typical objects of interest in aerial images are buildings, roads, factories, rivers, harbors, airfields, golf courses, etc. One focus herein is on the detection of surface-to-air missile (SAM) sites. The two primary classes of features employed herein are geometric and contextual. Geometric features extracted are straight lines, circles, corners etc. In case of SAM sites, the primary discriminating feature is typically the arrangement of individual missile launchers that compose the SAM site. Circle feature detectors can be used to detect individual launchers as shown in FIG. 6(a) while, line features can help detect neighboring structures such as a road network. For contextual features, the system attempts to discriminate terrain textures in aerial scenes, such as, "Forest", "Desert", "Road", "Urban", "Maritime", and "Agricultural" on a coarse level. Terrain textures, such as oceans, forest, urban, agricultural areas, contain repetitions of fundamental microstructures such as waves, trees, houses and streets, agricultural produce, respectively. Such configurations have been studied in literature as texture (with a texton being the microstructure) and identified as a significant feature for perception and identification, both in psychophysics such as described in "Julesz, B.: Textons, the elements of texture perception and their interactions. Nature 290, 91-97 (1981)" and for computer vision such as described in "Leung, T., Malik, J.: Representing and recognizing the visual appearance of materials using three-dimensional textons. Intl. Journal of Computer Vision 43 (2001)". Walker and Malik in "Walker, L. L., Malik, J.: When is scene recognition just texture recognition. Vision Research 44, 2301-2311 (2004)" report that texture provides a strong cue for the identification of natural scenes in the human visual system. The context features in the instant case are inspired by well developed texture classification techniques; see "Leung, T., Malik, J.: Representing and recognizing the visual appearance of materials using three-dimensional textons. Intl. Journal of Computer Vision 43 (2001)" and "Varma, M., Zisserman, A.: A statistical approach to texture classification from single images. International Journal of Computer Vision: Special Issue on Texture Analysis and Synthesis (2005)". FIG. 6(b) shows different regions of the image color labeled with the corresponding detected textures. The spatial, geometric and contextual constraints that need to be satisfied for an object to be classified as a SAM site are encoded as logical rules, again broadly falling in the categories listed above.

Human and Vehicular Activity Recognition in Video

Spatio-temporal patterns in video typically involve activities performed by humans and vehicles captured in, for example, surveillance video. Examples of human activity patterns could be a person stealing a package, a person illegally entering a secure building by piggy-backing behind another person who enters the building legally, or a person stealing a purse from another person and running away. Examples of vehicular activity patterns could be three or more vehicles travelling in a convoy, a vehicle passing another vehicle, an emergency vehicle being followed by another emergency vehicle etc. Detecting such patterns requires that we first extract atomic pattern elements in the video. These atomic pattern elements could be purely spatial, purely temporal, or spatio-temporal in nature, such as detection of vehicles and humans, detection of humans running, vehicle door closing (possibly using the pattern grammars as described in the previous sections) and then encoding complex combinations of these atomic pattern elements using the pattern grammars as described herein. The rules encoded in the pattern grammar formulation to detect spatio-temporal events are similar to the rules for purely spatial events with the additional inclusion of (1) Time component among the terms of the predicate and (2) relational time specific calculus to reason about the temporal distribution of atomic pattern elements.

Implementation Details

A predicate logic based reasoning framework can be efficiently implemented in a logic programming language like Prolog. Distributions of Prolog like SWI-Prolog, allow for the straightforward integration of C++ with an embedded Prolog reasoning engine. Predefined rules can be inserted into the Prolog engine's knowledge base at set up time by the C++ module, along with information about scene geometry and other constraints. At runtime, the C++ module can apply the detectors on the given image, preprocess the feature detector output if needed, syntactically structure this output as logical facts, and finally insert it into the Prolog knowledge base. These detections then serve as initial hypotheses upon which the query can be performed. Since rules contain unbounded variables and observed facts contain constants as parameters, querying for a proposition in Prolog implies finding a suitable binding of the rule variables to the constants of the supporting facts. If no such binding is found, the corresponding rule does not fire.

It is important to note that complexity of general inference in predicate logics can be combinatorial. In practice, however, variable interdependencies between different atoms of a rule restrict the search space significantly. Specifically, in the pattern grammar formulation described herein, there exists significant reuse of the variables between atoms both within and across different rules. Additionally, Prolog can be set up to index facts based on specific variables further reducing complexity of variable binding.

Evaluation

Some qualitative results will be provided on the human detection problem using the USC-CAVIAR dataset and show how our system reasons and resolves difficult scenarios. Quantitative results are presented on the USC-CAVIAR dataset as well as on problem of detecting SAM sites from aerial imagery. For both the problems, rule-weights have been obtained using the positive predictive value (PPV) approach as will be described later herein.

Human Detection

Below the performance will be evaluated of the bilattice based logical reasoning approach on the problem of human detection on static images.

Qualitative Results

Table 2 below lists the proof for Human 4 from FIG. 1.

TABLE 2

| Total | Human(154,177,1.25) | (0.359727,0.103261) |
|---|---|---|
| +ve evidence: | Head(154, 177, 1.25) | (0.94481,0.05519) |
| | torso(156.25, 178.75, 1.25) | (0.97871,0.02129) |
| | on_ground_plane(154, 177, 1.25) | (1,0) |
| | scene_consistent(154, 177, 1.25) | (0.999339,0.000661) |
| | not((legs(_G7093,_G7094,_G7095), | (1,1) |
| | legs_body_consistent(154, 177, 1.25_G7093, _G7094, _G7095))) | (0.260579,0.739421) |
| | is_part_occluded(134.0, 177.0, 174.0, 237.0) | |
| −ve evidence: | ¬scene_consistent(154, 177, 1.25) | (0.000661,0.999339) |
| | not((legs(_G7260, _G7261, G7262), | (1,1) |
| | legs_body_consistent(154, 177, 1.25,_G7260, _G7261, _G7262))) | |

Figure 7:
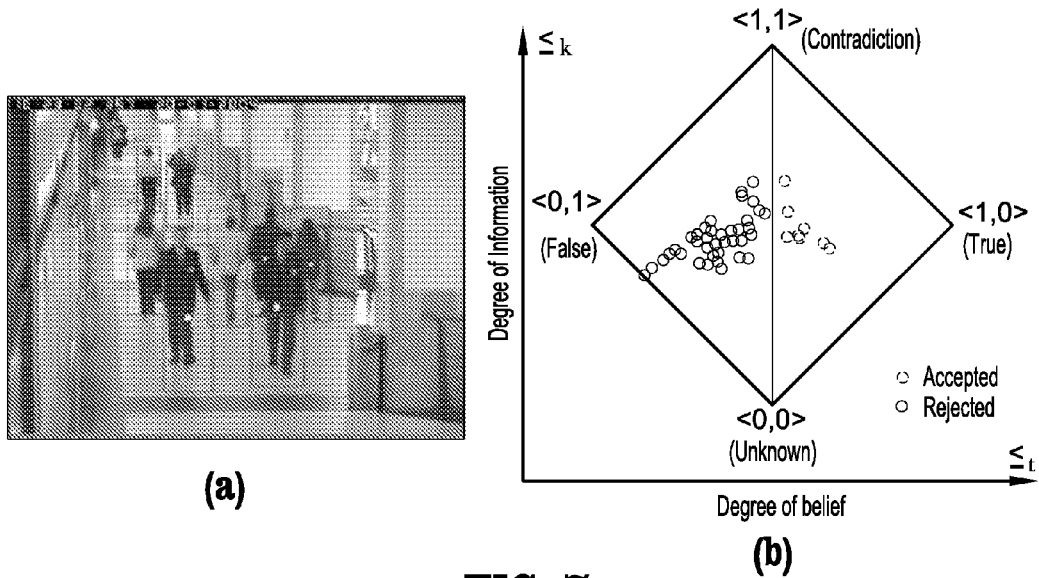
FIG. 7 illustrates human detection and computed uncertainty in a related bilattice.

For Human 4, the head and torso are visible while the legs are missing due to occlusion by Human 2. In Table 2, variables starting with _G . . . are non-unified variables in Prolog, meaning that legs cannot be found and therefore the variables of the predicate legs cannot be instantiated. It can be seen that evidence in favor of the hypothesis exceeds that against. In FIG. 7 the FIG. 7(a) shows a sample image from the USC CAVIAR dataset with detection results overlaid and FIG. 7(b) provides a diagram showing a computed uncertainty value (for all human hypotheses in left image) plotted in the bilattice space. FIG. 7(a), shows a sample image from the USC CAVIAR dataset and shows the detection results overlaid. FIG. 7(b) plots the uncertainty value for each hypothesis point in the bilattice space. The circles on the right reflect the accepted detections and correspond to the bounding boxes in 7(a), while the circles in the left half of the bilattice are hypotheses rejected by the reasoning framework (not displayed in (a)).

Quantitative Results

The framework and system provided as an aspect of the present invention were applied to the set of static images taken from USC-CAVIAR [53] dataset. This dataset, a subset of the original CAVIAR data, contains 54 frames with 271 humans of which 75 humans are partially occluded by other humans and 18 humans are occluded by the scene boundary. This data is not part of the training set. The parts based detector provided as an aspect of the present invention has been trained on the MIT pedestrian dataset as described in "Papageorgiou, C., Evgeniou, T., Poggio, T.: A trainable pedestrian detection system. Intelligent Vehicles pp. 241-246 (1998)." For training purposes, the size of the human was 32×96 centered and embedded within an image of size 64×128. 924 positive images and 6384 negative images were used for training The number of layers used in full-body, head, torso and leg detectors were 12, 20, 20, and 7 respectively.

Figure 8:
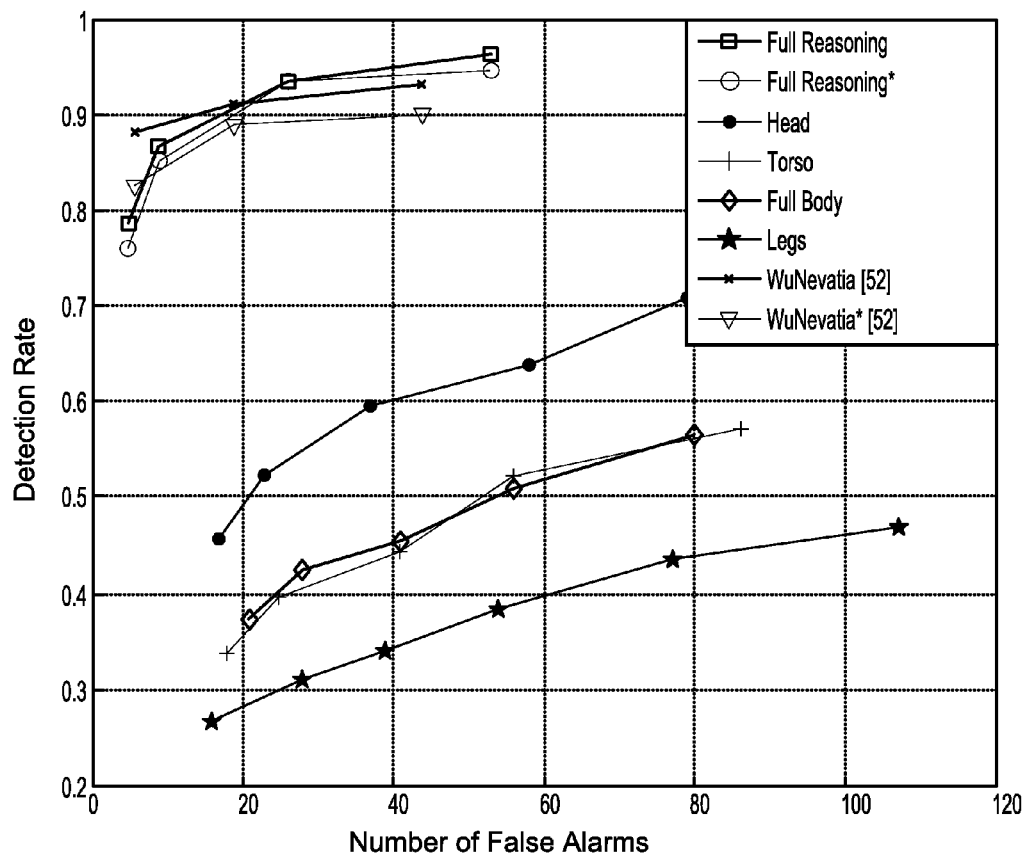
FIG. 8 provides is an ROC curve related to an evaluated dataset.

FIG. 8 shows the Receiver Operating Characteristic curves (ROC curves) for the parts based detectors provided as an aspect of the present invention as well as for the full reasoning system for evaluation on the USC-CAVIAR dataset. Full Reasoning* is ROC curve for 75 humans occluded by other humans. Results of "Wu, B., Nevatia, R.: Detection of multiple, partially occluded humans in a single image by bayesian combination of edgelet part detectors. ICCV (2005). Beijing" on the same dataset are copied from their original paper. WuNevatia* is ROC curve for the 75 humans occluded by other humans. "Full Reasoning*", in FIG. 8, is the ROC curve on the 75 occluded humans. ROC curves for part based detectors represent detections that have no prior knowledge about scene geometry or other anthropometric constraints.

It can be seen that performing high level reasoning over low level part based detections, especially in presence of occlusions, greatly increases overall performance. Also compared is the performance of the system provided as an aspect of the present invention with the results reported by Wu and Nevatia in "Wu, B., Nevatia, R.: Detection of multiple, partially occluded humans in a single image by bayesian combination of edgelet part detectors. ICCV (2005). Beijing" on the same dataset. The results reported in their original paper were taken and plotted in FIG. 8. As can be seen, results from both systems are comparable. The results in FIG. 8 were first reported in "Shet, V., Neumann, J., Ramesh, V., Davis, L.: Bilattice-based logical reasoning for human detection. In: CVPR (2007)." Since then "Lin, Z., Davis, L., Doermann, D., DeMenthon, D.: Hierarchical part-template matching for human detection and segmentation pp. 1-8 (2007)" and "Wu, B., Nevatia, R.: Detection and tracking of multiple, partially occluded humans by bayesian combination of edgelet based part detectors. International Journal of Computer Vision 75(2), 247-266 (2007)" published new results on this datasets that show some improvements in the overall ROC curve. All the reported results however are comparable to each other.

Figure 9:
FIG. 9 is an image of Dataset-A.
Figure 10:
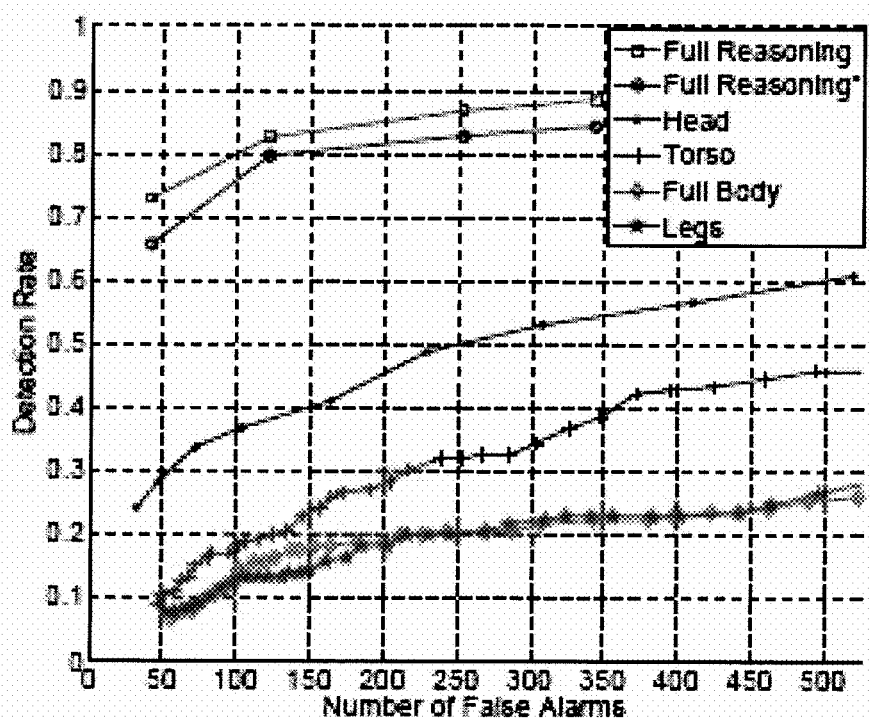
FIG. 10 provides a ROC curve related to Dataset-A.

The system and framework provided as an aspect of the present invention were also applied on another set of images taken from a dataset we collected on our own (in this paper we refer to it as Dataset-A). This dataset contains 58 images with FIG. 9 as an example image of 166 humans, walking along a corridor, 126 of whom are occluded 30% or more, 64 by the image boundary and 62 by each other. Dataset-A is significantly harder than the USC-CAVIAR dataset due to heavier occlusions (44 humans are occluded 70% or more), perspective distortions (causing humans to appear tilted), and due to the fact that many humans appear in profile view. FIG. 10 shows the ROC curves for this dataset. Full Reasoning* is ROC curve for 126 occluded humans. It can be seen that the low level detectors as well as the full body detector perform worse here than on the USC-CAVIAR data, however, even in such a case, the logical reasoning approach provided as an aspect of the present invention gives a big improvement in performance.

Aerial Object Detection

Figure 11:
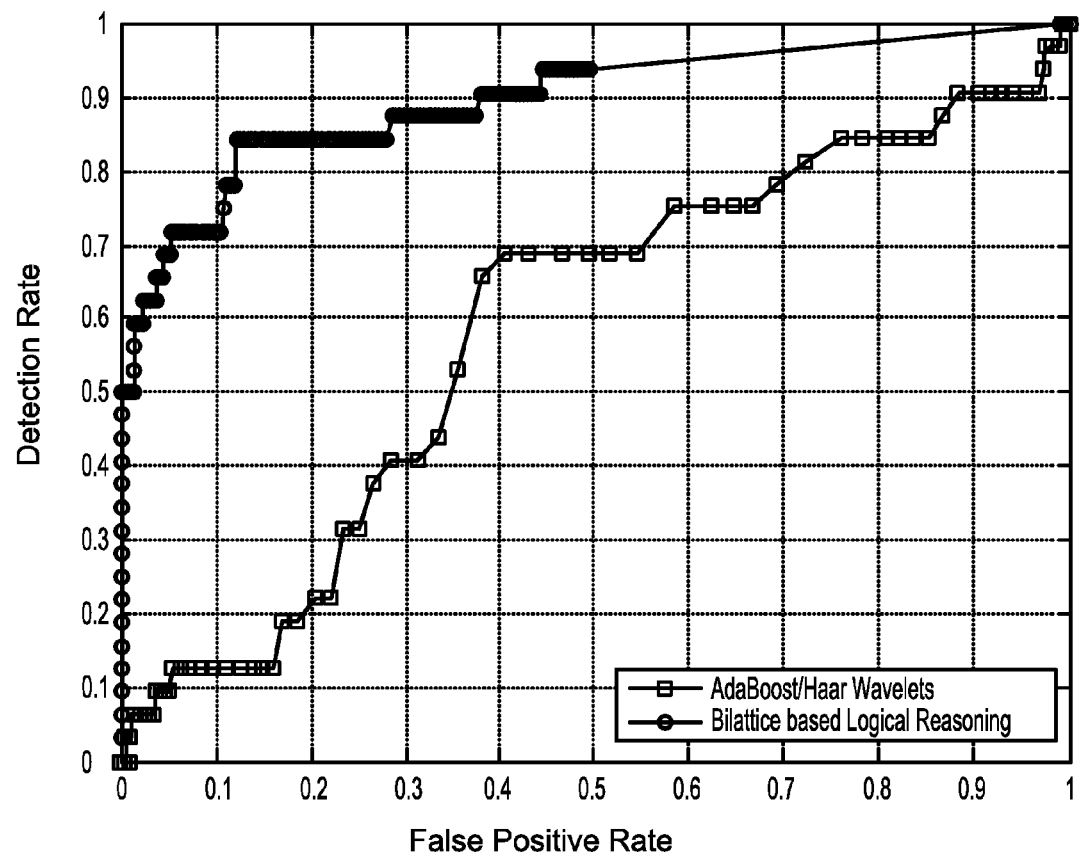
FIG. 11 provides a ROC curve related to SAM site detection.

The bilattice based logical reasoning approach as provided herein as an aspect of the present invention has been evaluated on the problem of detecting SAM sites in aerial imagery. As can be seen from FIG. 2, these objects are highly variable in shape and are hard to detect even for humans. However, the defining characteristic of such an object is the arrangement of its constituent missile launchers which arises from functional requirements. Additionally, there are a number of contextual cues that can be exploited such as geographical and topological makeup of the neighboring regions. A dataset of SAM sites containing 33 positive examples and 869 negative examples sampled from a 400 Km2 physical region surrounding the positive example was created. FIG. 11 shows the ROC curve obtained for this data. FIG. 11 also plots the ROC curve on that data for a AdaBoost with Haar wavelets approach as described in "Viola, P., Jones, M.: Rapid object detection using a boosted cascade of simple features. IEEE Conference on Computer Vision and Pattern Recognition (CVPR'01) (2001)." The AdaBoost based approach was trained on a separate training set of 869 negative images and 32 positive images.

As can be seen from FIG. 11, there is a marked improvement in performance using the pattern grammar based approach over a purely data driven approach. It is important to note however, that even for relatively simple, well constrained objects a purely data driven approach such as AdaBoost would need a lot of data to adequately generalize. In datasets such SAM sites, it is usually hard to acquire the required amounts of annotated data for such an approach to effectively learn. Add to that the high variability in the shape of the object and even more data would be needed to adequately generalize. In the case of the pattern grammar based approach, since knowledge of the object structure and surrounding context is directly specified, we would expect the results to be better than any purely data driven technique.

Figure 34:
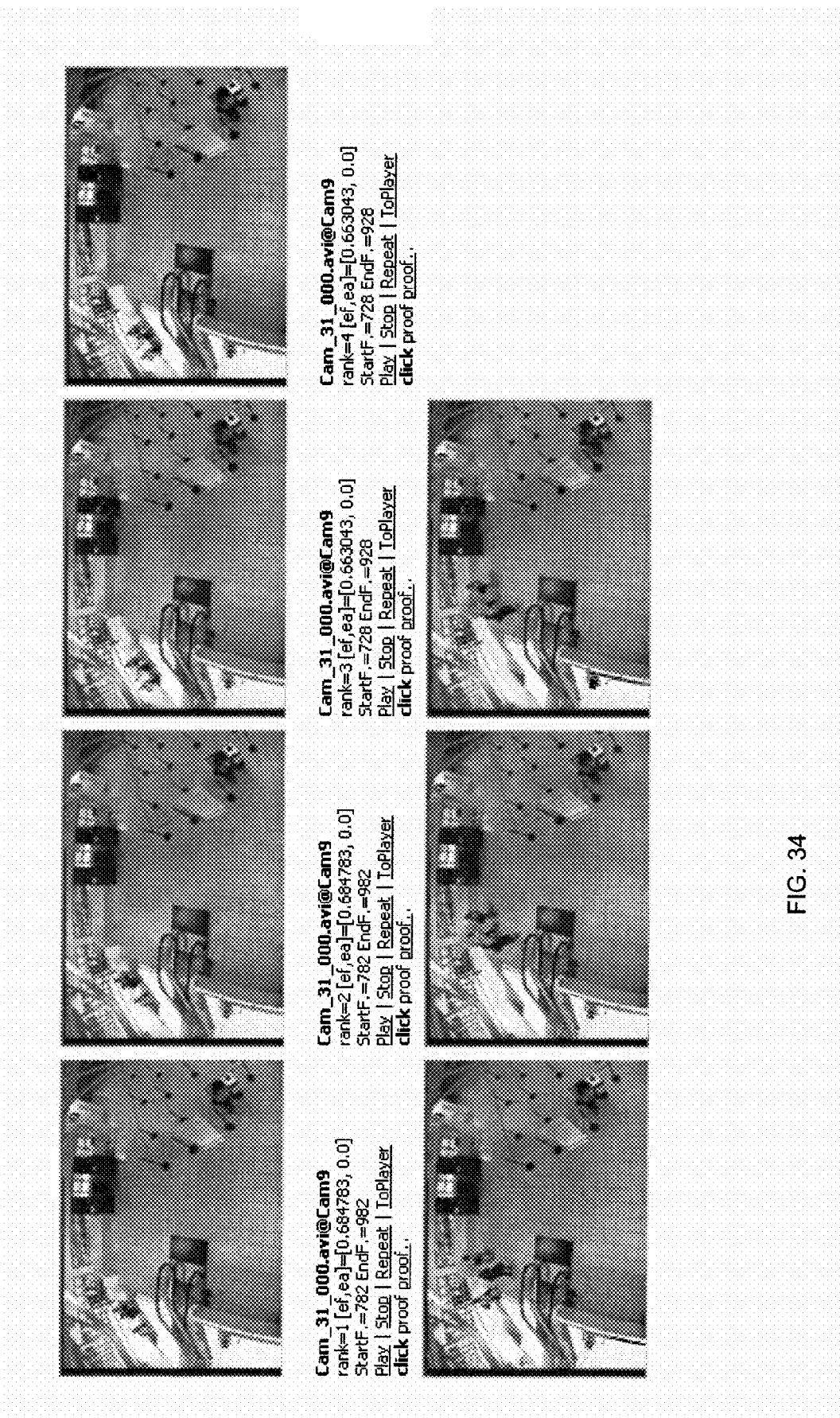
FIG. 34 illustrates the results returned by a system built using the predicate logic based image grammar formulation to detect the spatio-temporal visual pattern of pedestrians using the stairs when the escalator is nonfunctional in accordance with an aspect of the present invention.
Figure 35:
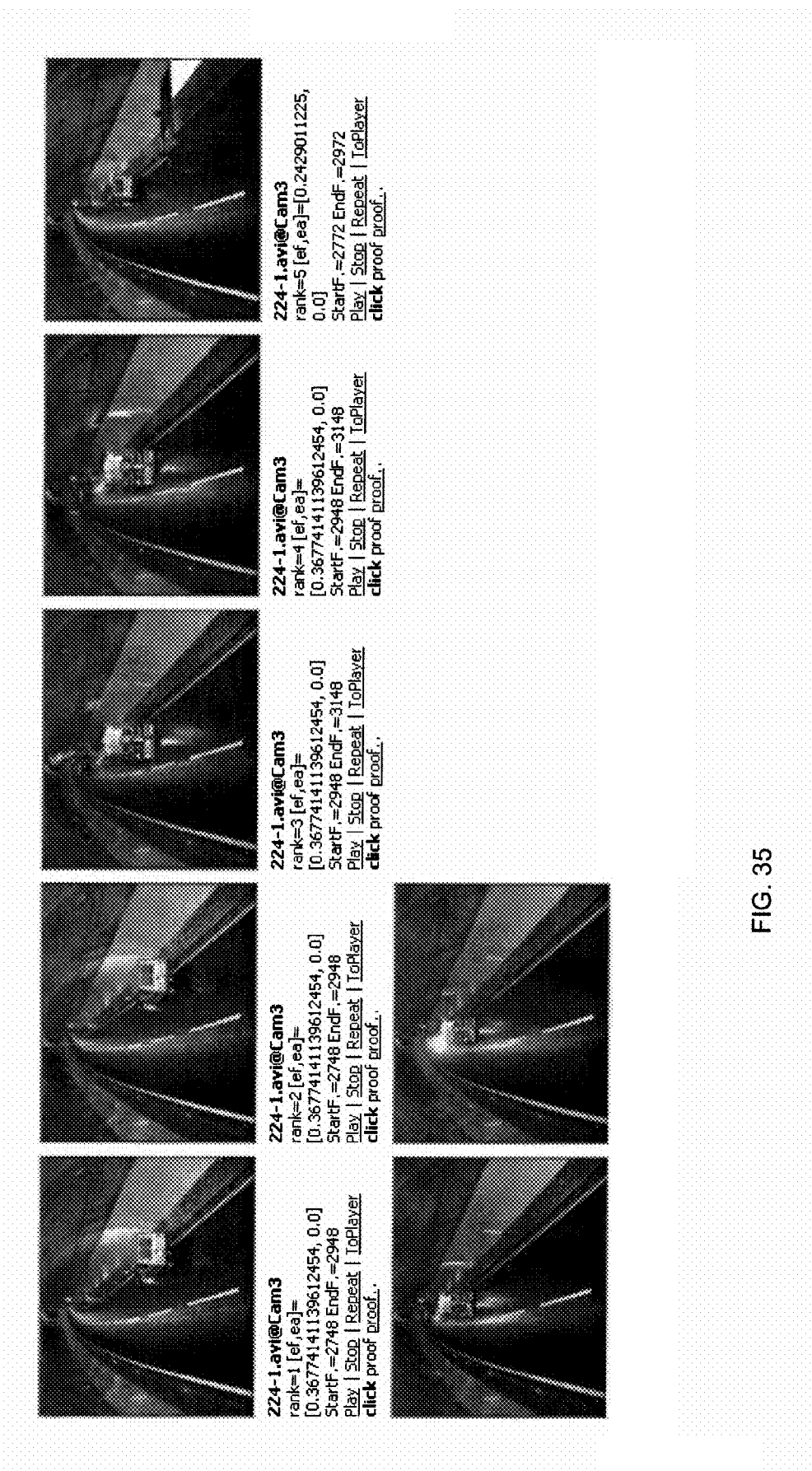
FIG. 35 illustrates the results returned by a system built using the predicate logic based image grammar formulation to detect the spatio-temporal visual pattern of an emergency vehicle following another emergency vehicle in a traffic surveillance video in accordance with an aspect of the present invention.

Human and Vehicular activity recognition from surveillance video We have evaluated the bilattice based logical reasoning approach on the problem of detecting spatio-temporal patterns such as human and vehicular activities in surveillance videos. We first obtained about 15 hours 30 minutes of surveillance video data captured in diverse locations such as airports, train stations, and traffic tunnels. We first processed these videos to extract a number of different atomic pattern elements, such as detecting of a vehicle (of different types—car, truck, emergency vehicle etc.), detecting of a human, detecting a human running and climbing stairs, detection of crowds etc. We then formulated pattern grammar rules to encode knowledge about high level complex events composed of these atomic pattern elements. This allowed the detection of a number of complex spatio-temporal events in video such as "detecting instances of an emergency vehicle following another emergency vehicle", "detecting instance of a truck following an emergency vehicle", "detecting instances when people are forced to take the stairs in situations when the escalator has been switched off", "detecting the activity of a person dropping a bag when there is no one else visible in the scene". Examples of the results returned by some of these searches are depicted in FIG. 34 and FIG. 35.

Rule Weight Learning

Although theoretical aspects of bilattices and the nature of semantics they give rise to in logic programs have been extensively studied in literature such as "Arieli, O., Cornelis, C., Deschrijver, G., Kerre, E.: Bilattice-based squares and triangles. Symbolic and Quantitative Approaches to Reasoning with Uncertainty pp. 563-575 (2005)", "Fitting, M. C.: Bilattices in logic programming. In: 20th International Symposium on Multiple-Valued Logic, Charlotte, pp. 238-247. IEEE CS Press, Los Alamitos (1990)" and "Ginsberg, M. L.: Multivalued logics: Uniform approach to inference in artificial intelligence. Comput. Intelligence (1988)" little work exists on automated learning procedures, which are of grave importance to computer vision applications. Learning in such systems implies: a) Learning the structure of the rules b) Learning rule weights. While there exists literature for learning rule structure from data, such approaches tend to be computationally prohibitive and require large amounts of data. Herein, it is assumed that the rule structure is given and a focus instead is on learning and optimizing rule weights within the bilattice framework.

Positive Predictive Value Based Learning

A common technique for rule weight learning is to use the positive predictive value (PPV) of the rule as its weight. Given training data in the form of observed facts, ground truth annotations, and a rule of the form $A \leftarrow B_1, B_2, \ldots, B_n$, a confidence value of $F(A|B_1, B_2, \ldots, B_n)$, $F(\neg A|B_1, B_2, \ldots, B_n)$ is computed. $F(A|B_1, B_2, \ldots, B_n)$ is the fraction of times A coincides with the ground truth when $B_1, B_2, \ldots, B_n$ is true. As the name suggests, this value computes a measure of the fraction of the time, a rule that has fired, is expected to be correct with respect to ground truth. This measure is learnt individually for each rule. Typically a multiplicative constant is also employed to scale down all rule weights, if needed, to prevent saturation of the final uncertainty value of the inferred proposition, when multiple rules are combined. The results reported earlier herein, have been generated using rule weights learnt using the PPV.

There are a number of issues with using the rule's PPV as its weight.
1) The PPV depends on the ground truth annotations w.r.t. inferred variables for the observed facts. Often, however, ground truth is only known for rules that infer the output node. Deeper nodes (i.e., input or hidden nodes) usually lack this information, and hence, defy PPV based weight adaptation.
2) Joint optimization of rules is not possible. Each rule weight is learnt individually, ignoring possible support or opposition of adjacent rules.
3) Uncertainty values of the final inferred proposition can saturate to the maximal contradictory state of the bilattice, especially when multiple rules are combined, again because each rule weight is learnt individually. To handle this typically an appropriate multiplicative constant needs to be chosen.
4) An inherently frequentist interpretation of the rules weights may not be optimal, due to the fact that the pattern grammar formulation itself may not be complete and may contain contradictions.

Knowledge Based Artificial Neural Networks

In accordance with an aspect of the present invention a rule weight learning method will be presented that attempts to address the above issues. This approach (a) casts the instantiated inference tree from the logic program as a knowledge-based neural network, (b) interprets uncertainties associated with logical rules as link weights in this neural network and (c) applies a constrained, modified back-propagation algorithm to converge upon a set of rule weights that give optimal performance. The back-propagation algorithm has been modified to allow computation of local gradients over the bilattice specific inference operation.

The issues raised above are handled in the following manner:
1) Similar to the error back-propagation algorithm with multi-layer perceptrons, ground truth is only required for rules that infer the output variable. As will be shown, the algorithm then "back-propagates" the computed error (of ground truth versus observed activation) to the deeper nodes of the rule hierarchy.
2) Due to the choice of t-norm and t-conorm for the bilattice and the formulation of the weight optimization as a gradient descent algorithm, optimization of individual rule weights is tempered by the contributions of adjacent rules that have fired for a given hypothesis.
3) Further in the gradient descent formulation, it is straightforward to include a regularization term in the error expression that penalizes extremely large or extremely small rule weights thus obviating the need for an external multiplicative scaling constant.
4) Due to the fact that the KB may be incomplete or inconsistent, a gradient descent based approach might converge upon a set of rule weights that provide a favorable performance as compared to a PPV based measure.

Traditionally, artificial neural networks (ANNs) are modeled as black boxes. Given a set of input and output variables, and training data, a network is created in which the input nodes correspond to the input variables and the output nodes correspond to the output variables. Depending on the nature of the problem to be solved and a priori assumptions, a number of nodes are introduced between the input and output nodes that are termed hidden nodes. Each link connecting two nodes is assigned a link weight. Learning in an ANN implies optimizing link weights to minimize the mean squared error between the network predicted output and ground truth, given input data. In such networks, the intermediate hidden nodes don't necessarily have to be meaningful entities.

In knowledge based ANNs (KBANN) such as described in "Towell, G. G., Shavlik, J. W., Noordewier, M. O.: Refinement of approximate domain theories by knowledge-based neural networks. In: Proceedings of the Eighth National Conference on Artificial Intelligence, pp. 861-866 (1990)" and in "Mahoney, J. J., Mooney, R. J.: Combining neural and symbolic learning to revise probabilistic rule bases. In: S. J. Hanson, J. D. Cowan, C. L. Giles (eds.) Advances in Neural Information Processing Systems, vol. 5, pp. 107-114. Morgan Kaufmann, San Mateo, CA (1993)", unlike traditional ANNs, all nodes, hidden or not, have a semantically relevant interpretation. This semantic interpretability arises out of careful construction of the KBANN. In the present case, the KBANN will be constructed from the rule base of the logic program. Each node of the KBANN therefore directly corresponds to each instantiated atom of the logic program while links weights correspond to rules weights. Given a logic program, optimizing the rule weights thus is a two step process. Step 1 is to use the rules and facts to create a KBANN and step 2 is to use a modified version of the standard back-propagation algorithm as described in "Rumelhart, D. E., Hinton, G. E., Williams, R. J.: Learning internal representations by error propagation pp. 318-362 (1986)" to optimize the link weights of the KBANN, thus in turn optimizing the rule weights in the original logic program.

Building the KBANN

The first step in the learning algorithm is to convert the rule base to a representation of a knowledge-based artificial neural network. Consider a set of rules, such as those depicted in FIG. 5. Given a set of training data, in the form of observed logical facts and associated ground truth, the first step is to generate a grounded, propositional, representation for each of the rules. Below is one such set of propositional rule representation.

$$\phi(j \leftarrow o_{11}, o_{12}, o_{13}) = w_{j1}^+$$

$$\phi(j \leftarrow o_{21}, o_{22}) = w_{j2}^+$$

$$\phi(\neg j \leftarrow o_{31}, o_{32}) = w_{j3}^- \qquad (5)$$

where each term, j, $o_{11}$, $o_{12}$, etc, represent grounded atoms such as human(23, 47, 0.4), head(43, 55, 0.9), etc. The weights associated with these propositional rules corresponds to the evidence_for component of the original rules. (Recall that for a given rule, only the evidence for component of the uncertainty attached to the rule is relevant. The evidence against component of the rule weight gets discarded during inference due to the disjunction with ⟨0,0⟩ (see equation (4)). Given a proposition, j, to be reasoned about, positive rules will contribute evidence supporting j, while negative rules will contribute evidence refuting it. The evidence_for component of the negative rule will contribute to the evidence_against component of the proposition to be reasoned about due to the negation. Please refer to the example in Table 1 for more details.) This grounded, propositional, rules representation can now be directly used to construct the artificial neural network. In such a network, observed features (logical facts) become the input nodes, while propositions corresponding to the rule heads become output nodes and are placed at the top of the network. Rule weights become link weights in the network.

Figure 13:
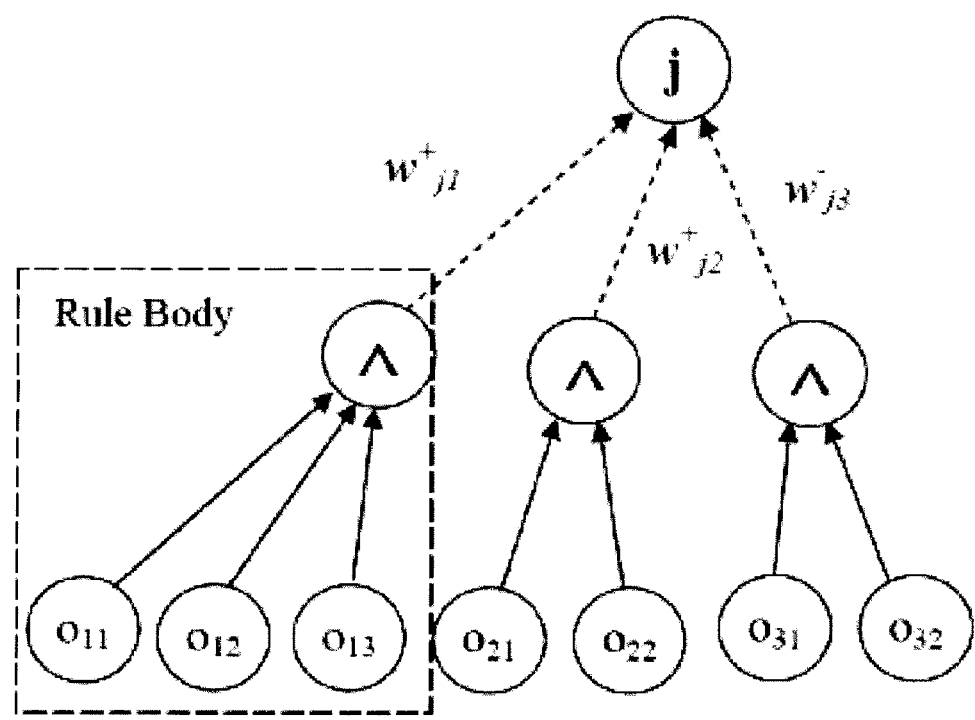
FIG. 13 illustrates a knowledge based artificial neural network.

FIG. 13 shows the KBANN derived from the set of grounded, propositional rules from (5). It is important to note that conjuncts within a single rule need to first pass through a conjunction node before reaching the consequent node where along with the weights they would get combined with contributions from other rules in a disjunction. In FIG. 13, the links connecting the conjuncts to the product node are depicted using solid lines. This indicates that this weight is unadjustable and is always set to unity. Only the weights corresponding to the links depicted in dotted lines are adjustable as they correspond to the rule weights.

Computing Gradients

The approach provided herein as an aspect of the present invention is inspired by the back propagation algorithm from neural networks, specifically, knowledge based artificial neural networks (KBANN) introduced by "Towell, G. G., Shavlik, J. W., Noordewier, M. O.: Refinement of approximate domain theories by knowledge-based neural networks. In: Proceedings of the Eighth National Conference on Artificial Intelligence, pp. 861-866 (1990) and applied in "Mahoney, J. J., Mooney, R. J.: Combining neural and symbolic learning to revise probabilistic rule bases. In: S. J. Hanson, J. D. Cowan, C. L. Giles (eds.) Advances in Neural Information Processing Systems, vol. 5, pp. 107-114. Morgan Kaufmann, San Mateo, Calif. (1993)."

Figure 12:
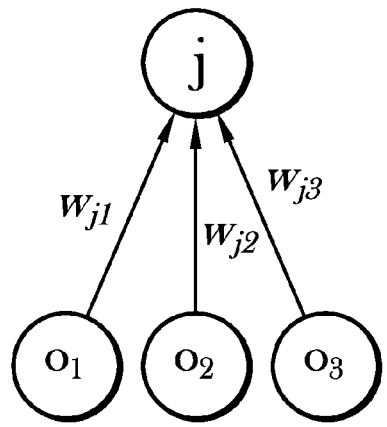
FIG. 12 illustrates a simple artificial neural network.

Consider a simple ANN as shown in FIG. 12. In traditional back propagation, the output of an output node is:

$$d_j = \sigma(z_j) = \frac{2}{1+e^{-\lambda(z_j)}} - 1 \qquad (6)$$

where σ is the sigmoid function and where $$z_j = \phi(j) = \sum_i w_{ji}\sigma(\phi(o_i)) \qquad (7)$$

The error at the output node is $$E = \frac{1}{2}\sum_j (t_j - d_j)^2 \qquad (8)$$

where $t_j$ is the ground truth for node j. Based on this measure of error, the change of a particular link weight is set to be proportional to the rate of change of error with respect to that link weight. Thus $$\Delta w_{ji} \propto -\frac{\partial E}{\partial w_{ji}} \qquad (9)$$

Using standard back-propagation calculus, the change in link weight can be computed to be $$\Delta w_{ji} = \eta \delta_j \sigma(\phi(o_j)) \qquad (10)$$

where $$\delta_j = (t_j - d_j)\frac{\partial \sigma(z_j)}{\partial z_j} \qquad (11)$$

if j is an output node and $$\delta_j = \frac{\partial \sigma(z_j)}{\partial z_j} \sum_{k \in DS(j)} \delta_k w_{kj} \qquad (12)$$

if j is a non-output node, where DS(j) is the set of nodes downstream from j.

These equations need to be extended to the KBANN depicted in FIG. 13. This involves computing gradients over the bilattice specific inference operation. Recall that in the bilattice based logical reasoning approach, inference is performed by computing the closure over a logic program using (4). This equation can be simplified as $$z_j = \phi(j) = \bigoplus_{i}^{+ve} w_{ji}^+ \wedge \left[ \bigwedge_l \phi(o_{il}) \right] \oplus \neg \bigoplus_{i}^{-ve} w_{ji}^- \wedge \left[ \bigwedge_l \phi(o_{il}) \right] \quad (13)$$

Note that this equation represents a general form of the closure operation before a commitment has been made on the underlying lattice structure and its corresponding glb and lub operators. Once the choice of the underlying lattice and corresponding operators has been made, in conjunction with equations (8), (9) and (13), it should be possible to compute the rate of change of each of the rule weights.

Consistent with earlier description, the underlying lattice will be chosen to be $L=([0,1],\leq)$ and the t-norm will be chosen to be $J(a,b) \equiv a \wedge_L b = ab$ and t-conorm as $S(a,b) \equiv a V_L b = a+b-ab$. As defined earlier, the glb and lub operators for each axis of the bilattice B can then be defined as per equation (1). Plugging these operator instantiations in equation (13), it can be further simplified to $$z_j = \biguplus_{i}^{+ve} w_{ji}^+ \prod_l \phi(o_{il}) - \biguplus_{i}^{+ve} w_{ji}^- \prod_l \phi(o_{il}) \quad (14)$$

where $a \uplus b = a+b-ab$.

Note that, unlike the traditional output equation for back propagation equation (7), this formulation is slightly more complex due to the combination of observation nodes via the conjunction (product) node and then further combination of outputs of multiple rules via disjunction (probabilistic sum). The probabilistic sum of weights, can be easily differentiated, with respect to given weight $w_k$, as follows:

$$\biguplus_i w_i,$$

$$\frac{\partial \biguplus_i w_i}{\partial w_k} = 1 - \biguplus_{i \neq k} w_i \quad (15)$$

Using equation (14) and (15), the gradients can be computed to be $$\frac{\partial E}{\partial w_{ji}^+} = -(t_j - d_j) \left[ \prod_l \phi(o_{il}) \right] \left[ 1 - \biguplus_{m \neq i} w_{jm}^+ \prod_l \phi(o_{ml}) \right] \quad (16)$$

$$\frac{\partial E}{\partial w_{ji}^-} = (t_j - d_j) \left[ \prod_l \phi(o_{il}) \right] \left[ 1 - \biguplus_{m \neq i} w_{jm}^- \prod_l \phi(o_{ml}) \right] \quad (17)$$

The rate of change of each rule weight can be computed as follows:

$$\Delta w_{ji}^+ = \eta \delta_j \left[ \prod_l \phi(o_{il}) \right] \left[ 1 - \biguplus_{k \neq m} w_{jm}^+ \prod_l \phi(o_{ml}) \right] \quad (18)$$

$$\Delta w_{ji}^- = -\eta \delta_j \left[ \prod_l \phi(o_{il}) \right] \left[ 1 - \biguplus_{k \neq m} w_{jm}^- \prod_l \phi(o_{ml}) \right]$$

where $$\delta_j = t_j - d_j \quad (19)$$

if is an output node and $$\delta_j = \sum_{m \in DS(j)} \delta_m w_{mj} \prod_{l \neq j} \phi(o_{jl}) \left[ 1 - \biguplus_{k \neq j} w_{mk} \prod_l \phi(o_{kl}) \right] \quad (20)$$

if j is a non-output node, where DS(j) is the set of nodes downstream from j.

Once analytically computed the gradient has been analytically computed there are a number of techniques to perform the actual optimization. In one embodiment it has been elected to perform online weight update, where for each data point the gradient is computed and used to instantaneously modify the rule weight. This is in contrast to a batch approach where the cumulative gradient of a batch of data points is used to update the weights. It is believed that an online approach such as the one adopted is better suited for applications with limited access to annotated data as has been suggested in "Y. LeCun L. Bottou, G. O., Muller, K.: Efficient backprop. Neural Networks: Tricks of the trade, Springer (1998)"

Evaluation II

In this section, the rule weight optimization algorithm for the bilattice based logical reasoning framework provided as an aspect of the present invention will be evaluated. For the purpose of evaluation, the human detection problem and not the SAM site detection problem has been selected. This decision was influenced by the amount of available training data. There are practical difficulties in accessing a large amount of SAM site data due to its sensitive nature. This results in difficulty in setting up training, testing and validation subsets of any meaningful sizes.

Given the fact that the final accuracy of the overall framework is a function of the performance of the low level detectors in addition to how well the optimization algorithm optimizes rule weights, the performance of the optimization algorithm will be isolated in two ways: 1) By fixing the rule set and performing multiple runs. For each run, the weights are randomly initialized and performance is measured both with the random initialization as well as after optimization. 2) By measuring performance improvements on simulated data. Working with simulated data allows to model varying degrees of low level detector noise and evaluate performance of the optimization algorithm as a function of the detector noise.

Experimental Methodology

The experimental methodology as used is the repeated random sub-sampling based two-fold cross validation. The data was randomly split into two sets, training and testing. For the training set, initialize the rule weights were randomly initialized. The optimization provided herein as an aspect of the present invention was performed with the random weights as a starting point. Performance was measured for the optimized weights on the testing dataset. To isolate the performance improvement attained by the optimization algorithm, the performance was also measured on the testing set with the initial random weights. This procedure is repeated multiple times, each time selecting different random training and testing subsets from the full dataset and each time, initializing the rule weights to different random values. Performance for a given set of rule weights is measured as the area under the ROC (AUROC) curve for the problem of human detection.

Pedestrian dataset

Figure 14:
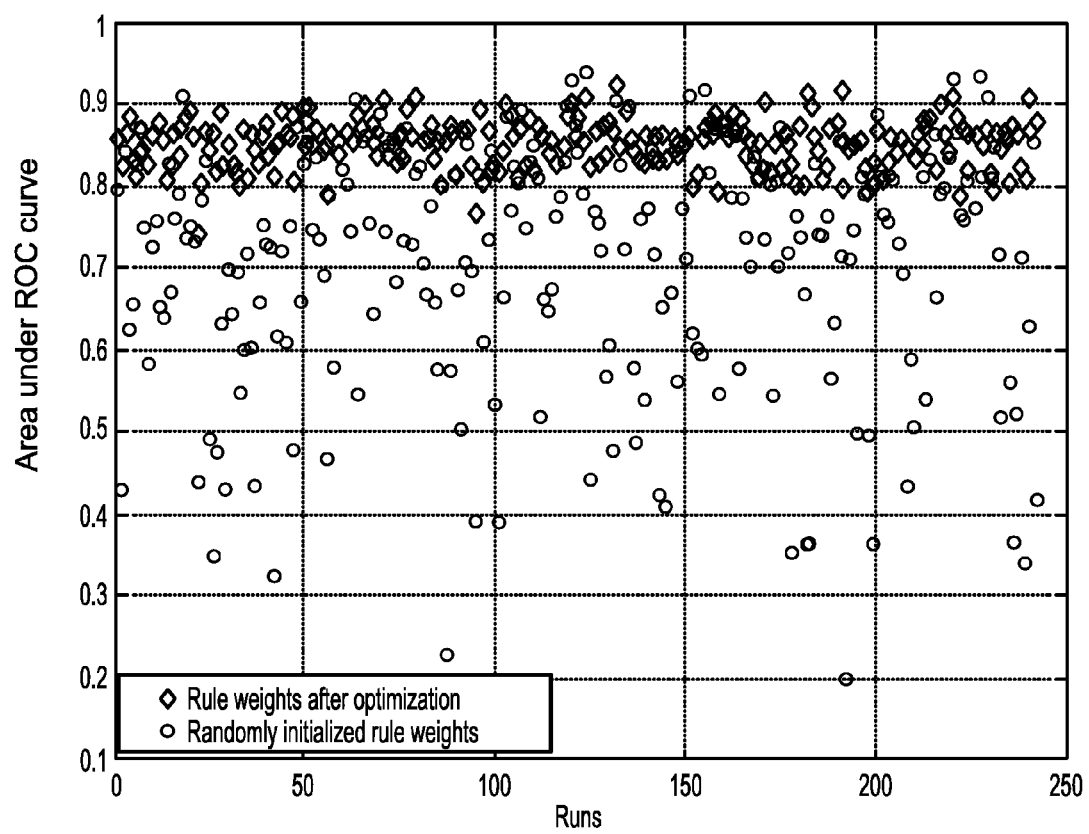
FIG. 14 is a plot showing an area under an ROC curve.

The framework that is provided as an aspect of the present invention has been applied to the set of static images taken from USC-CAVIAR dataset. FIG. 14 displays the results of each of the 242 randomly initialized runs on the USC CAVIAR dataset. The circles represent the AUROC for a random weight initialization, say w0, while the diamonds directly above the circles represents the AUROC for the optimized rule weights w with w0 as the initial starting point.

As can be seen from both the graphs, optimizing the rule weights using the proposed approach significantly improves the overall results as well as significantly reduces the variance of the results over multiple runs as compared to a purely random initialization. This trend is numerically presented in Table 3 below showing average increase in AUROC and reduction in variance after optimization over random initialization on the USC CAVIAR.

TABLE 3

| | |
|---|---|
| Average AUROC for randomly initialized rule weights | 0.7084 |
| Average AUROC for optimized rule weights | 0.8519 |
| % change in AUROC | 20.2659% |
| Variance of AUROC for randomly initialized rule weights | 0.0230 |
| Variance of AUROC for optimized rule weights | 0.000903 |
| % change in variance | −96.0695% |
| AUROC for Positive Predictive value based rule weight initialization | 0.8073 |

It can be seen that the optimization approach provided herein as an aspect of the present invention increases the average AUROC by about 20% while reducing the average variance by 96%. Also compared in 3 are the AUROC results for rule weight obtained in a frequentist manner by computing the positive predictive value. As can be seen, the proposed optimization approach also outperforms in this case.

Simulated Data

Figure 15:
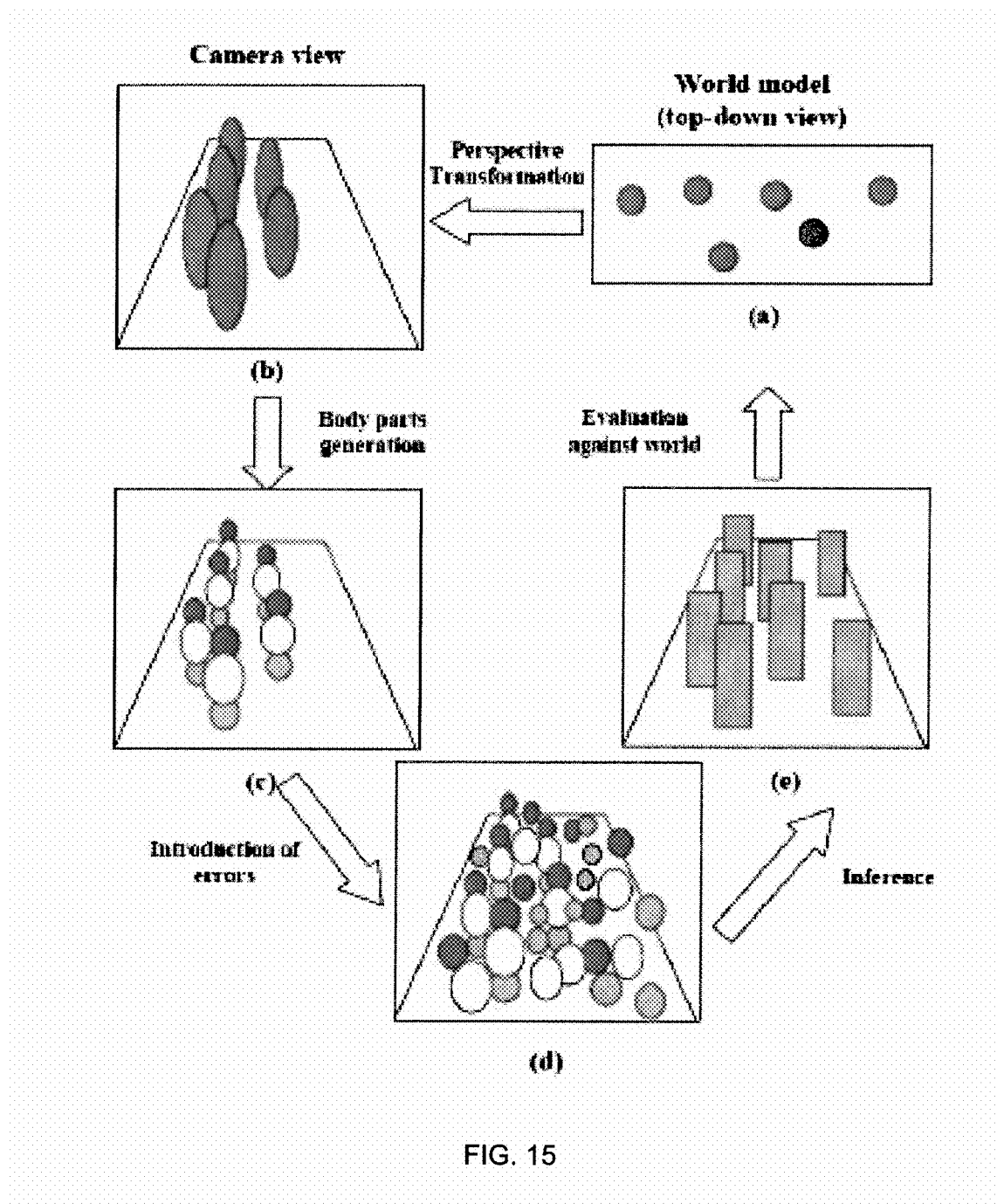
FIG. 15 illustrates an approach adopted to generate simulated data.

The optimization algorithm as provided herein as an aspect of the present invention and implemented on a system having a processor has also been evaluated on simulated data. FIG. 15 depicts the approach adopted to generate the simulated data.

The process is started by building a randomly initialized globally consistent world model of humans standing on the ground plane, see FIG. 15(a). This world model is then transformed into camera coordinates to render the humans from a simulated camera's field of view, illustrated in FIG. 15(b). The body part responses respecting any inter-human/human-scene occlusions are then generated, illustrated in FIG. 15(c). These responses represent the ideal, noise free detector response. Noise has been introduced into these responses that results in the introduction of false positives and missed detections as well as a reduction in separability between the positive and negative class. The detector response is modeled using an exponential distribution conditioned to lie between [0,1] for the negative class. For the positive class the distribution is mirrored around 0.5. This exponential distribution is characterized by parameter $\lambda$. The higher the $\lambda$ the lower the false positives and missed detections and better the separability, while the converse is true for a small $\lambda$.

Figure 16:
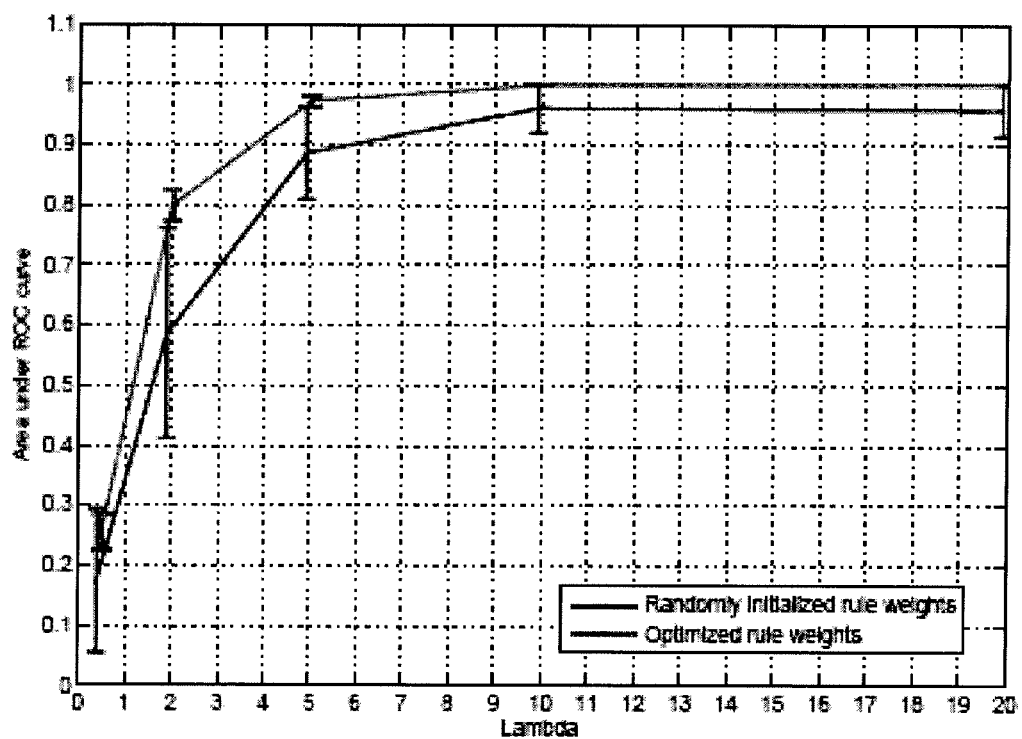
FIG. 16 is a plot showing mean AUROC.

Varying $\lambda$ allows to represent a range of simulated detector performance over which the optimization algorithm can be evaluated as well as the overall bilattice based logical reasoning approach. For each $\lambda$, multiple runs have been executed randomizing both over the training/testing dataset as well as initial starting rule weights. The results of each of these runs are shown in FIG. 16, which is a plot showing mean AUROC and associated variance on simulated data for varying values of $\lambda$. As can be seen from the results, as expected as the amount of detector error increases, it gets harder to separate out the two classes and therefore overall AUROC is low. As the low level detectors are made stronger, AUROC improves significantly. In all these cases, applying the rule weight optimization algorithm which is provided as an aspect of the present invention and which is implemented on a system having at least a processor and a memory and which is clearly advantageous.

Conclusions I

A predicate logic based reasoning approach has been presented herein that provides a means of formally specifying domain knowledge and manipulating symbolic information to explicitly reason about the presence of different patterns of interest. Such logic programs help easily model hierarchical, compositional spatio-temporal patterns to combine contextual information with the detection of low level parts via conjunctions, disjunctions and different kinds of negations. First order predicate logic separates out the name, property or type of a logical construct from its associated parameters and further, via the use of existential and universal quantifiers, allows for enumeration over its parameters. This provides for a powerful language that can be used to specify pattern grammars to parse a set of image features to detect the presence of the pattern of interest. In order to admit stochastic definitions of visual patterns and to reason in the presence of uncertainty in facts (observations), the bilattice formalism as proposed by Ginsberg in "Ginsberg, M.L.: Multivalued logics: Uniform approach to inference in artificial intelligence. Comput. Intelligence (1988)" has been used. This framework is believed to be uniquely suited for high level reasoning in vision applications as it provides a means to (a) formally specify (stochastic) domain knowledge; (b) handle uncertainty in observations; (c) reconcile contradictory evidence (d) perform layered (hierarchical) inference; and, (d) explicitly generate justification for accepting/rejecting a pattern hypothesis.

The following aspect have been provided as an aspect of the present invention: using of first order predicate logics, extended with a bilattice based uncertainty handling formalism, as a means of formally encoding pattern grammars, to parse a set of image features, and detect the presence of different patterns of interest. Also provided has been a rule weight optimization method which casts the instantiated inference tree as a knowledge-based neural network, interprets rule uncertainties as link weights in the network, and applies a constrained, back-propagation algorithm to converge upon a set of rule weights that give optimal performance within the bilattice framework. Aspects of the herein provided predicate logic based pattern grammar formulation have been evaluated via application to the problems of (a) detecting the presence of humans under partial occlusions and (b) detecting large complex man made structures as viewed in satellite imagery (c) detecting complex spatio-temporal patterns of human and vehicular activity in video. Aspects of the optimization approach have been evaluated on real as well as simulated data and have shown favorable results.

A Grammar for Hierarchical Object Descriptions in Logic Programs

Grammatical models for images have recently regained much interest in computer vision community. One such model has been provided and applied above. Several works such as "H. Chen, Z. J. Xu, Z. Q. Liu, and S. C. Zhu. Composite templates for cloth matching and sketching. In CVPR, 2006", "F. Han and S. C. Zhu. Bottom-up/top-down image parsing by attribute graph grammar. In ICCV, 2005" and "Z. W. Tu, X. R. Chen, A. L. Yullie, and S. C. Zhu. Image parsing: unifying segmentation, detection and recognition. 63(2):113_140, 2005" have proposed methods to model objects or scenes using stochastic rules for decision making purposes (e.g., recognition). One important characteristic of these studies is that they describe an object/scene in a hierarchical fashion where each entity is recursively decomposed into smaller constituent parts. Parts at the same level of hierarchy generally have some sort of semantic (geometric) relations among them.

Intuitively, a stochastic hierarchical model for objects seems more appealing than both holistic models and part-based models where parts are independent of each other, e.g., bag of features approach. Unlike holistic models, hierarchical models would not miss an object because some part of it were undetected or because of geometric transformations. At the same time, a hierarchical description could not be baffled by a meaningless organization of parts. Furthermore, with the agglomeration of smaller parts into a composition also reduces the complexity for any search to be conducted on them because of shared modeling.

In their survey on stochastic grammar of images, Zhu and Mumford in "S. Zhu and D. Mumford. A stochastic grammar of images. Foundation and Trends in Computer Graphics and Vision, 2(4):259-362, 2006" describe several studies that represent the knowledge about an object structure in a so called AND-OR graph. These studies introduce a hierarchical description of an entity. Each entity is considered as a combination of several components in a specific geometric (semantic) setting. More formally speaking, if an entity corresponds to a node, the smaller components or parts of the entity correspond to the children of this node. The object is defined as a conjunction of the children nodes. For example, a wall clock is made up of a dial with numbers inscribed on it and the hands to indicate the hour, minute and second. Therefore, a clock is a conjunction of dial and hands and the original entity, the clock, itself is an AND node in this AND-OR graph.

Each component can be of different shapes or sizes, i.e., different configurations. This diversity of configurations is captured by creating several children of a component where each child refers to a specific configuration. These children are thought to be in disjunction with each other, that is, only one of the configurations represent a part. For example, continuing with the example of wall clock, the dial of a clock could be rectangular, circular or even hexagonal. The number of clock hands could be 3 or 2, the latter case refer to the clocks which do not have an indicator for seconds. Thus, the dial or the set of hands correspond to an OR node in the graph.

Each of the alternative configurations are again divided into smaller components and thus become an AND node of the graph. This process is continued recursively until one reaches the elementary features that are extracted from an image. The intuitive top-down disintegration of parts facilitates an easy procedure for anyone to construct a model for an object. The AND-OR structure of the model definition also makes it robust against misclassifications due to missing information, occlusions, etc. Inference in AND-OR structures is presently pre-dominantly employed using Bayesian approaches.

Aspects of the present invention are built upon hierarchical models that root in the declarative, logic world, namely bilattice based logical reasoning (BLR) as described in "V. D. Shet, J. Neumann, V. Ramesh, and L. S. Davis. Bilattice-based logical reasoning for human detection. In CVPR, 2007". BLR uses a mathematical structure called bilattices to incorporate uncertainties into first order logic description of events/objects. Each rule describing an event is associated with a quantitative measure of degree of belief. Given several such rules, each of which would ideally define components of an event/entity, the BLR framework combines them to make a decision (with a certain degree of belief) regarding the whole event/entity itself.

Unlike other logic based frameworks, BLR is able to utilize stochastic rules describing incidents that contribute to the absence of a certain event or entity, rather than only the presence, i.e., they allow for implications, such as, $\neg A \leftarrow B$. In fact, having rules for presence as well as absence adds a discriminative aspect to the framework's capability, which is contrary to generative models, such as Bayesian networks. Further, as the atoms in BLR are generic logical facts, it is natural for BLR to work on any type of data, including, e.g., non-vector or incomplete data.

However, the BLR framework itself does not enforce the user to adopt a modular definition of the object of interest. Therefore, the framework, by itself, does not enjoy the merits of a hierarchical model. Herein, as an aspect of the present invention a principled way, i.e., a grammar is provided, to write rules intended for general extended logic programs. This grammar is implemented as one or more instructions on or in a processor. The instructions in one embodiment are embedded in the processor. For instance the processor is implemented in a Field Programmable Gate Array (FPGA). The instructions in another embodiment are stored in a memory that is accessed by a programmable processor, and the instructions are retrieved by the processor and executed by the processor. Results of the execution of the instructions in a further embodiment are written by the processor to the memory and stored therein. In many ways the grammar orients itself towards above mentioned AND-OR structure, while extending this concept by a few notable aspects (i.e., a formal integration of negation and function definitions, as will be explained).

Compared to the plain BLR formulation, the provided grammar formulation which is implemented on a processor which accesses a memory provides the following benefits:

1. It is a more compact and higher-level object description. While being powerful enough to capture the variability of the object/event as well as their internal relations, it is simple enough for a novice to read or generate a set of object rules.
2. It is not specific to a certain implementation or language. A grammar instance can be generically translated into any logic program and language of choice.
3. It guides (and constraints) users to describe the rules hierarchically.
4. It has a close relation to a graphical object representation. This way, a graphical editing tool can be straightforwardly built on top of the herein provided grammar.

In a rule-based environment, a formal grammar is used to represent an object, which will be referred to as object grammar. In this grammar, the low level image features constitute the set of terminals. Contrary to monolithic models where an object is expressed with these low level features straight away, a hierarchical model defines some intermediate (hypothetical) parts/components of the object and defines the object as a semantically constrained set of these parts. These parts are the non-terminals in the object grammar.

In order to formally specify the object grammar, a specification grammar for object grammars is provided as an aspect of the present invention. The object representation will be constrained to be expressed in a hierarchical manner with the options for accommodating the diversity in the construction.

Each sentence of the specification grammar will be an object grammar with the aforementioned desired properties. In order to ground the object grammar to a particular application case, a compiler in one embodiment is implemented that parses and translates example object grammars into a PRO-LOG implementation of a BLR logic program.

The herein provided aspects are evaluated in the domain of software GUI (Graphical User Interface) testing. Software testing is a crucial part in software development process. During a GUI testing process, the tasks are to (1) generate and (2) execute test cases, and (3) compare test case behavior and responses to an oracle. As will be shown, vision tools can play an important role for the automation of this process.

In the spirit of the herein provided compositional object grammar, the vision based GUI parsing is based on the extraction of low-level features and modeling of mid- and high-level compositions. As will be shown, the compositional hierarchical model is particularly suite to the GUI detection problem, as elements in a GUI are often based on different compositions of a shared and simple feature dictionary. If a hierarchical description of these elements is followed, such that at each level a small part of the object will be recovered, the time required for identifying the element itself will be greatly reduced.

A Grammar Based Object Description

The herein provided syntax encourages the user to describe an object model hierarchically with AND-OR nodes. Any object is considered as a collection of its parts tied up together by semantic relationships. Each of the parts can assume any of the several alternative configurations. The herein provided syntax explicitly suggests how the semantic relationships among the parts should be defined. Also provided is a provision for a set of relations and functions that verify and calculate properties of the parts to be utilized by the reasoning at a higher level of the graph. For this purpose, a dictionary is maintained of relations and functions which are shared among the set of rules that will be written.

Unlike the studies presented by Zhu and Mumford in "S. Zhu and D. Mumford. A stochastic grammar of images. Foundation and Trends in Computer Graphics and Vision, 2(4): 259-362, 2006", the herein provided syntax is devised to be used with a logic program. Once the model description is complete, it is the task of logic program to analyze and combine all the facts with the rules to evaluate a decision.

Grammar Formulation

Figure 17:
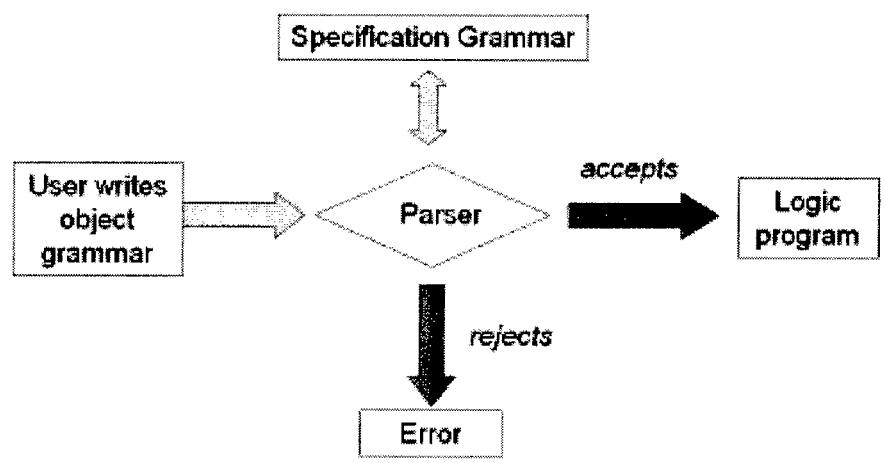
FIG. 17 illustrates a role of object and specification grammar.

In the following, the role of the grammar formulation will be discussed on two different levels. On the lower level, an object class will be represented by an object grammar. The language of object grammars is specified by a meta grammar, called specification grammar. This grammar will guide and constrain the user to compose instances of the object grammar. Since the specification grammar dictates the syntax of the object grammar, it can further be used, in order to parse an object grammar and translate it into any kind of equivalent representation. This property has been used, in order to automatically compile a logic program that implements an object grammar based on BLR. FIG. 17 illustrates this concept. FIG. 17 illustrates the role of object and specification grammar. The domain expert specifies an object or event of interest by a formal object grammar. The language of all object grammars is defined with help of a meta grammar called specification grammar. The specification grammar is used within a parser and compiler unit, which translates the object grammar into a logic program.

For clarity purposes, an example of object grammars is provided first. A description of the specification grammar provided as an aspect of the present invention follows that example.

Object Grammar

The object will be presented in a top-down fashion. Each component is to be described as a conjunction of its parts/entity. Each of the parts/entities can assume one of the several alternative configurations. The fragmentation of the configuration is carried out recursively until we reach the smallest part.

Figure 18:
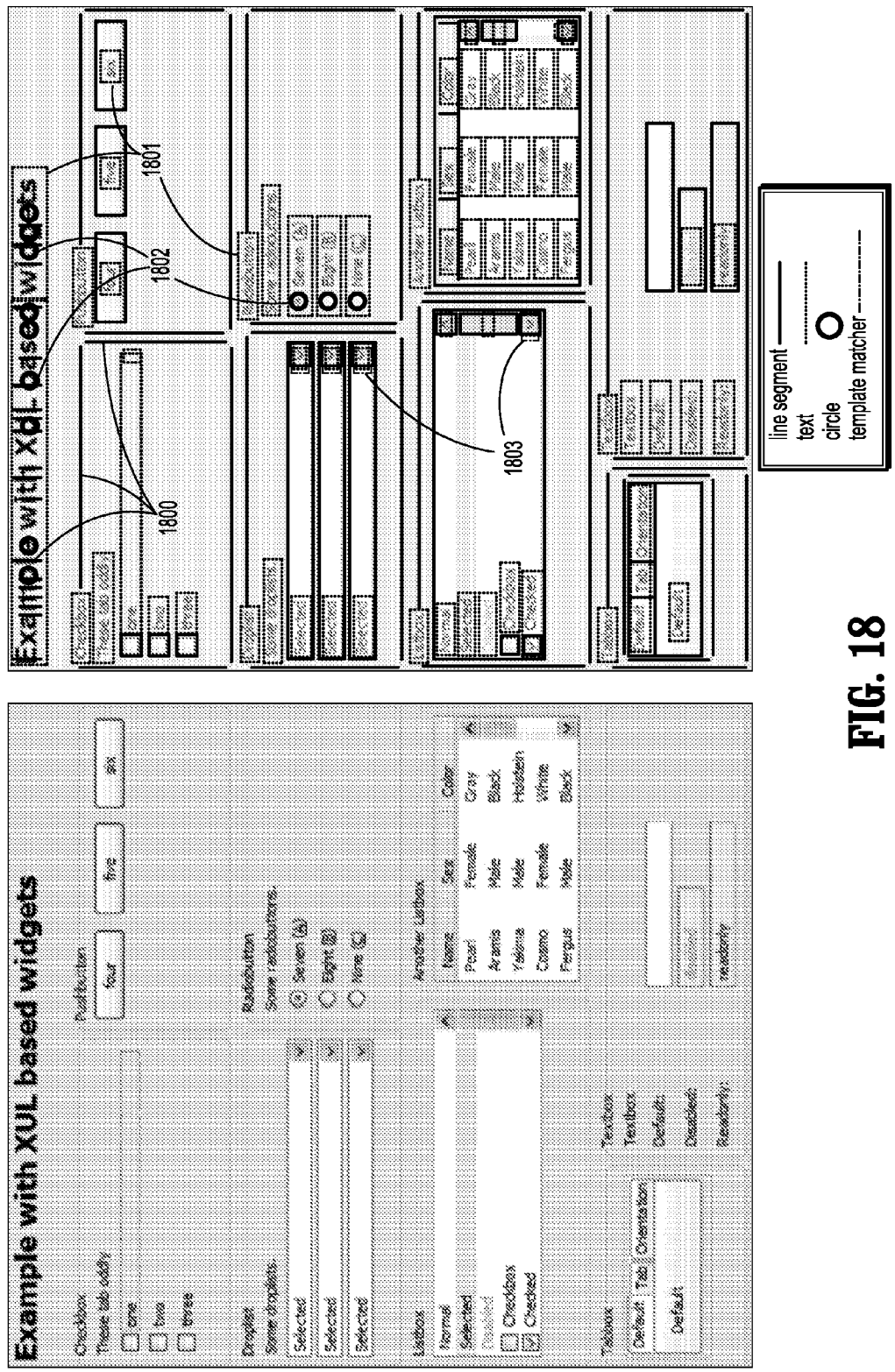
FIG. 18 illustrates a dictionary of features.

The object grammar takes the form of a first order logic. In this syntax, the low level image features become the terminal symbols. For the problem of GUI recognition, we are using rather simple features, such as, line, text, circle, etc. FIG. 18 illustrates these features for a simple example GUI. FIG. 18 illustrates a dictionary of features for an example image (to the left). Features used for the GUI parsing are line segment (1800), text (1801), circle (1802), and a template matcher, here using a down arrow template (1803). Some of the features are specifically identified for illustrative purposes in FIG. 18. One can see that line features and circle features can also be part of text.

These basic features are combined and augmented by a set of geometric relations (i.e., predicates) and functions to form non-terminal symbols, such as, Rectangle, TextCluster etc. These non-terminals are the intermediate parts of the object itself and are referred as entities. The relations, such as, "is_close", "is_inside", etc., define the geometric relations among the features, as illustrated in FIG. 19. FIG. 19 illustrates a dictionary of relations: For each relevant geometric data type (points, line segments, regions), a set of relations is organized within a dictionary. Functions are also used, such as, "compute_center", "compute_intersection", etc., to calculate necessary quantities that are used by the relations, entities and configurations. The semantic of the grammar is defined by the symbols <, ∨, ∧, ¬, and [Ef, Ea], which correspond to implication, disjunction, conjunction, negation, and uncertainty values Ef and Ea for the evidence for and against a proposition of the logic program, respectively (see for instance "V. D. Shet, J. Neumann, V. Ramesh, and L. S. Davis. Bilattice-based logical reasoning for human detection. In CVPR, 2007" for details).

FIG. 20 illustrates an example of an object grammar. In the specific instance of this syntax, the start symbol PushButton-Start infers another symbol PushButton, corresponding to the entity to be modeled (Rule (i)). One example of specifying several configuration is given in Rule (ii) of example, says a PushButton can be a rectangular entity with some text written in it or it can be a circular entity containing texts. Each of the configurations is a collection of parts having some geometric or other relation that binds them together. These parts (e.g., Rectangle and TextCluster in Rule (iii)) are considered as new entities that we need to identify. Geometric constraints like "is_close" in Rule (iii) enforces the relation between centers of two parts, Rectangle and TextCluster. Functions such as "compute_intersection" of Rule (v) computes rectangle corners from two intersecting lines.

Specification Grammar

The specification grammar, which generates instances of an object grammar, is a context sensitive grammar G=(T, N, R, S), with T and N being the set of terminal and non-terminals, R being the set of rules and S is the start symbol. The specification grammar is defined in FIG. 21. In this grammar, all the instantiations of entities and configurations, their relations and functions are considered as terminals. The locations and parameters, which are referred to as identities, are also terminals. The space-holders for these elements, e.g., "entity", "config", "constraint" are all non-terminal symbols.

A nonterminal symbol δ is introduced to imply the description of an entity or a configuration. A string with δ followed by "entity" (or "config") implies the description of that particular "entity" (or "config"). The symbols π and ρ denote a list of (semantic, geometric, etc.) relations and that of functions, respectively. These list of relations and functions are assumed to be stored in a separate relation and function dictionary, such as the one illustrated in FIG. 18. Finally, # corresponds to a "formatting" variable implemented by a newline followed and preceded by white-space characters.

Some notations are specified as used in the grammar in following Table 4 as an easy reference for the specification grammar.

TABLE 4

| Symbol | Interpretation |
|---|---|
| < | implication |
| feature | elementary image features (i.e., logical facts) |
| ∨ | conjunction of entity's |
| entity | part of the component |
| γ | disjunction of config's |
| config | one of an alternate configuration |
| ∨ | OR (disjunction) among alternate config |
| ∧ | AND (conjunction) among components |
| neg | operators for negative rules in BLR |
| π | list of constraint's |
| constraint | constraint among parts |
| ρ | list of f's |
| f | function defined on parts |
| τ | parameter list |
| ι | parameter |
| Ef & Ea | numerical weights/evidence for BLR |
| . :: ( ), | delimiters |

Here, the start symbol of this syntax is S. Rule (i) states the first rule of the object grammar, i.e., a component is an entity. Each entity can assume one of the several different configurations (as specified by Rules (ii) and (iii)), or one of the basic logical facts. The non-terminal δ followed by "entity" (or "config") then provides the definition of the "entity" (or "config"), respectively.

The numerical quantities, Ef and Ea, within square braces in Rules (ii) and (iii) quantify the degree of belief for a rule to be true and false, respectively, according to the semantic of BLR as described in "V. D. Shet, J. Neumann, V. Ramesh, and L. S. Davis. Bilattice-based logical reasoning for human detection. In CVPR, 2007". Similarly, each configuration "config" is a conjunction of parts or "entities", as expressed by Rules (iv) and (v). These parts are supposed to abide by the constraints specified by the list π. Users are also allowed to compute new properties of the "config", through the list of functions in ρ, to be used at different levels of the hierarchy.

The decomposition of "entity" and "config" in Rules (iii) and (v) into "neg" hypothesis may not seem obvious at first sight. As stated before, BLR allows to incorporate rules about absence of evidence. BLR allows for inclusion of different negations, as mentioned in Rule (x). See "V. D. Shet, J. Neumann, V. Ramesh, and L. S. Davis. Bilattice-based logical reasoning for human detection. In CVPR, 2007" for details.

Rules (xii)-(xviii) state the possible instantiations of the elements depending on the specific problem at hand. Note that in the present grammar formulation, the concrete entities, concepts, etc. are not constrained to be identical on both sides of an object grammar, e.g., in Rules (ii) and (iv). This can be formally achieved with help of an attribute grammar formulation.

Having now formally defined the language of object grammars, it is straight-forward to parse object grammars and translate them into an equivalent, low-level program, such as set of BLR rules. Advantage for the user is that an object representation can be formulated on a high level.

Practical Considerations for Object Grammar Design

Detection time of an object often reduces when we use a hierarchical model for the object as opposed to a monolithic model of it. That is, it would take less time when the search is applied on intermediate parts of an object rather than basic image features. It is analyzed hypothetically why this happens. Consider an object is composed of p basic features. It is hypothesized that an intermediate part of an object that consists of q<p features. If there are n basic features detected in the image, detecting this intermediate part has a time complexity bounded by $$\binom{n}{q} = O(n^q)$$

and detecting the object it:self from these n/q intermediate parts has a time complexity $$\binom{n/q}{p/q} = O((n/q)^{p/q}).$$

Whereas, detecting the object from the basic features themselves requires $$\binom{n}{p} = O(n^p)$$

time which is larger than $O((n/q)^{p/q}) + O(n^q)$.

Breaking down larger objects into a deeper object hierarchy also allows us to maintain a more generic dictionary of generic relations and functions. This substantially reduces the size of object model description and increases modularity and readability. This also simplifies sharing of the relations and functions among different objects.

Application and Experiments

A computer vision system based on the proposed grammar will be applied and evaluated on the problem of automated GUI testing. In the next section, the use of a vision tool for GUI testing will be motivated. The following sections exhibit advantages of using the proposed grammar for object description and provide qualitative results.

Vision Tools for Automated GUI Testing

In automated GUI testing, a set of software test cases will be generated, executed, and compared their response to an oracle, i.e., a ground truth response, all of which preferably automated. Vision tools can play a major role in various aspects of this domain.

Test case generation: Vision tools can explore a given GUI for elements the user can interact with. By doing so, they can assist the testing engineer during generation of test cases, either in a fully automatic and semi-automatic scenario.

While it is true that in certain situations parameters of the GUI elements are available by other means, e.g., a GUI resource file, situations exist where a visual interface has advantages. First, in some cases the GUI rendering is available only visually, e.g., when testing embedded devices, proprietary formats (such as, flash, etc.), complex visual objects or pixel-based renderings (such as, images, certain graphs, etc.). Second, non-visual representations may not be consistent among different scenarios (e.g., when testing on different operating systems). Third, the herein provided vision tools come equipped with a stochastic grammar framework. Such framework is not limited to modeling invariance in low-level, visual GUI appearances, but also generalizes to higher level invariance that could, for instance, originate from different GUI layouts of the same business-level logic.

Test case execution: Vision tools can automatically identify the location of GUI elements and position the mouse cursor to the GUI of interest. This is particularly important for agile software development, where the design of a GUI changes frequently, with test cases being preferred to be invariant to such changes. Again, non-vision tools can perform the same task for certain situations, however, the same comments made above apply here.

Oracle comparison: Vision tools can verify that GUI responses correspond to the oracle. This includes the verification of all types of textual, graphical, or pictorial output.

In order to show the feasibility of vision tools for aforementioned scenarios, the problem of identifying fundamental GUI elements is considered, i.e., push-buttons, droplists, checkboxes, radiobuttons, groupboxes, etc., for a few test images, and present detected objects in a structured way.

Detection of GUI Widgets

In order to solve for parsing of a GUI image, object grammars were created for groupboxes, pushbuttons, radiobuttons, droplists, and checkboxes, similar to the one illustrated in FIG. 20. A dependency graph of the main concepts in this grammar is sketched in FIG. 21. The leaves in this graph correspond to the features illustrated in FIG. 18.

Using the grammar parser of FIG. 17, the grammar is translated into a BLR program, and inference is performed.

Qualitative Results

The result of the GUI parser on the example image of FIG. 18 is shown in FIG. 23. It can be seen that all of the groupboxes, pushbuttons, radiobuttons, and droplist are correctly detected. In this example, a single checkbox has been missed, and false alarms for checkboxes and a pushbutton can be identified. Note that employed grammar description for checkboxes is rather simple. A more accurate recognition is foreseen with a more detailed grammar.

Quantitative Results

A quantitative experimental analysis has been performed on a set of 6 images of resolution 1280×960, comprising a total of 20-40 objects per category. Table 5 shows the detection rate (true positive rate; TP rate) and the number of false alarms (FP) per image. Good results were obtained for pushbuttons, droplists, and radiobuttons, checkboxes provoked misses and false alarms. Again, a grammar containing more details is expected to improve the result.

TABLE 5

| Component | TP rate | FP/Image |
|---|---|---|
| Pushbutton | 90% | 0.17 |
| Droplist | 100% | 0 |
| Radiobutton | 90% | 0.33 |
| Checkbox | 67% | 2.67 |

Sharing Subgraphs

Figure 22:
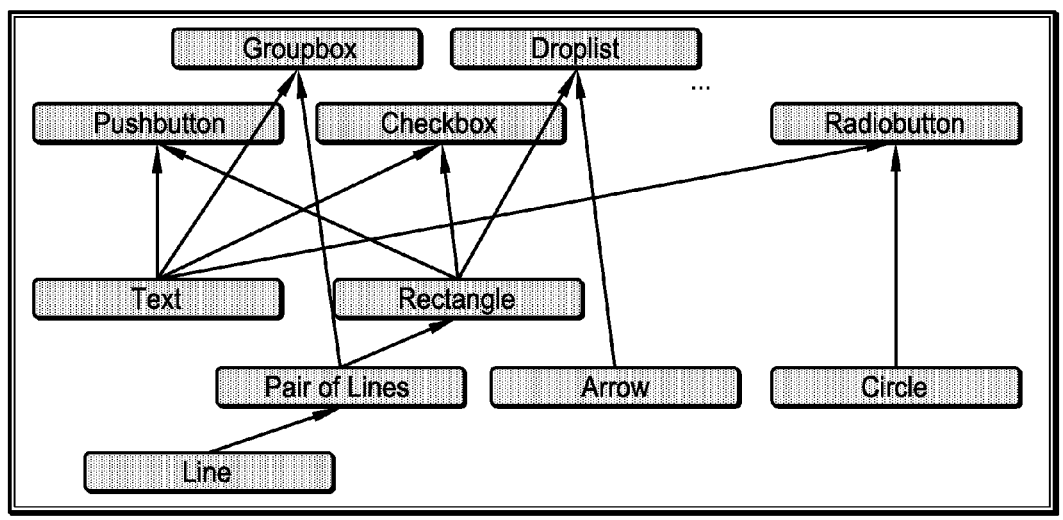
FIG. 22 illustrates a grammar for a number of different GUI elements.

As can be seen from FIG. 22, different GUI elements share certain subgraphs in the grammar. For instance, all of "pushbutton", "checkbox", and "droplist" are implicated by the "rectangle" node. This property is specific to the modular and deep representation chosen, compared to a monolithic one, and specifically beneficial for robustness (in the context of parameter learning) and computational complexity.

For the logical inference, it is beneficial to perform inference bottom-up, corresponding to a logical inference strategy called forward chaining, such that nodes are computed only once.

In order to support the comments made earlier by a concrete example, a small experiment is created, with an inference about the rectangle by two different strategies. In a monolithic approach, a rectangle is directly implicated by a set of four lines, two of which are parallel to each other but perpendicular to the other two lines. In a finer grained approach, a rectangle is implicated by two (L-shaped) orthogonal pairs of lines, which in turn are implicated from the set of all detected lines. In both cases, neighborhood information is utilized to speed up the search. Both approaches produce the identical output, however, the monolithic one is 4 times slower. This interesting result is an indication for a practice to prefer deep hierarchies over shallow ones.

Parse Tree of a GUI

In addition to the detection of elementary GUI widgets, we create a hierarchical parse tree of the entire GUI image. As each widget detection is identified with a region-of-interest (ROI), a notion of "containment" can be defined on widgets. In such tree, a widget becomes a child node if it is directly contained in its parent node.

In fact, such parse tree can be used to group semantically related widgets, and to re-generate the GUI using user interface description language, such as, XUL. FIG. 24 shows the parse tree for the upper part of discussed example. The (flat) widget detections are parsed into a tree representation, corresponding to their "containment" relation. In this example, the arguments of the widgets correspond to their ROIs, represented by top-left and bottom-right coordinate.

Conclusion II

A generic grammar has been provided as an aspect of the present invention for producing hierarchical object description rules to be used with a logic program, focusing on bilattice based logical reasoning (BLR). Results have been provided for parsing a GUI for the purpose of robust GUI testing. In the computer vision context, this approach is not limited to GUI parsing, but can advantageously be applied to many kinds of object detection and recognition. This particularly applies to situations where domain knowledge is available and can be formulated by domain experts. The formulation of grammars for additional elementary GUI components as well as more complex structures, such as graphs, images (2D/3D), etc. is contemplated.

In addition, usability aspects of the grammar can be further addressed by a graphical tool, where domain experts can visually create a grammar for objects of interest.

Automating GUI testing is technologically practicable, but not usually economically practical. The reason is that most GUIs are subject to frequent changes that often require a major rewrite of test scripts. The following provides as an aspect of the present invention methods and apparatus for GUI test automation that is robust to these changes. This is done by mapping the low-level artifacts of the GUI, such as images or HTML, to a higher-level, more-slowly-changing business object model of the system under test. The effort to create and maintain this mapping must be considerably less than the effort of creating the test scripts.

Problem Statement

Graphical user interfaces (GUIs) are used in most modern applications that require interactions with human users. Automated test tools for GUIs, such as Hewlett-Packard's Quick-Test Pro as described in "Hewlett-Packard. "HP QuickTest Professional" have historically relied on capturing low-level representations of the GUI, such as screen shots or sequences of windowing system API calls. These low-level representations are compared to oracles of some sort. These oracles are either defined by machine-executable scripts (in "scripted testing") or created by capturing screen shots from previous runs of the GUI (in "capture-replay" testing.)

It is often necessary for business reasons to test GUIs in a "black box" mode, without knowledge of the way the GUI is implemented or access to the business logic behind the GUI. In poor system designs, the business logic is often not cleanly separated from the GUI. Regrettably, one cannot always avoid the necessity of testing poorly-designed systems.

Black-box testing of GUIs has historically resisted efficient automation. The reason for this is that, in the absence of specialized support from the system under test (SUT), the test tool must present low-level representations of the GUI, such as screen images or HTML, to its test oracle for validation. Additionally, the test tool must control the GUI at a fairly low level, such as by moving the cursor to a given screen position and clicking a simulated mouse button.

Any change to the GUI, or to the underlying windowing system or browser that displays the GUI, disrupt these low-level representations. These changes, therefore, disrupt the oracle's ability to validate the GUI, even though they might be slight from a user's perspective.

Changes to the GUI and the underlying presentation software typically happen often enough that it is uneconomical to automate GUI testing using current technology. This is especially true in agile software development. The result is that GUI testing must be done manually, with the usual attendant problems of high expense and slow progress.

The problem of robustly automating GUI testing can be considered to be one of the "grand challenges" of software testing.

Typical Scenarios for Robust Automated GUI Testing

Some typical scenarios where robust automated GUI testing would be valuable include:
1. Agile development, where the GUI is changing rapidly in response to customer feedback;
2. System update scenarios, where the system is being ported to a new platform or a change to the windowing system has been installed;
3. Cross-platform development scenarios, in which tests for one GUI platform can be reused on another GUI platform;
4. Test improvement for legacy systems, where documentation may be incomplete and there is no opportunity to design in a GUI test layer. This is a common problem where the legacy system needs to be gotten under test for refactoring as described in "Fowler, M., Beck, K., Brant, J., Opdyke, W. and Roberts, D. *Refactoring: Improving the Design of Existing Code*. Addison-Wesley, 1999. ISBN-13: 978-0201485677;"
5. Embedded system testing, in which it is impractical to modify the software of the SUT, but where control can be gained through custom hardware interfaces.

Some Common Changes to the GUI

Tests should remain robust under the most common changes to the GUI. Some types of changes include the following (ordered roughly from least to most difficult for robustness):
Minor changes, such as changing a font, moving a GUI element on the screen, changing its aspect ratio, or changing the theme (style) of the GUI. Many existing GUI-level interception schemes can handle such changes robustly;
Changing screen labels, including localization. Such changes would disrupt any scripting scheme based on intercepting screen labels in the GUI;
Changing from one type of GUI element to another (e.g., checkbox to radio button.) This would disrupt most GUI-level interception schemes;
Moving a GUI element to a different context or page on the GUI. This is a fairly common occurrence, which changes the representation of the GUI state without necessarily changing the state of the underlying business logic of the application;
Porting the system from one OS to another (e.g., Microsoft Windows to Linux, or standalone application to the Web.) Some technologies, such as [10], support this, but with limitations on the underlying GUI technology;
Changing the presentation technology (e.g., from fixed HTML to AJAX.) Supporting test script robustness under such porting is vital in regression testing to support refactoring the SUT;
Situations in which no direct interface to the GUI software is possible. A surprising number of testing applications, particularly in acceptance testing of embedded systems, fall under this category. Each of us has been personally involved in testing several such applications.

Previous Work

In the commercial arena, some tools, such as Rational Functional Tester as described in "IBM Corporation. "Rational Functional Tester." Website of IBM's Rational Functional Tester which is an automated functional testing and regression testing tool" and in AutomationAnywhere's "GUI automation. AutomationAnywhere Website with information about GUI testing software", have tried to ameliorate the problem of rapid GUI changes by allowing testers to mask screen images or apply weights to components. These techniques are helpful for robustness in the face of minor changes, but will still break on major changes such as page reordering.

Memon, Nagarajan, and Xie in "Memon, A., Nagarajan, A. and Xie, Q. "Automating Regression Testing for Evolving GUI Software." *J. Softw. Maint. Evol.: Res. Pract.* 2005, 17:27-64" represent GUIs at a level higher than raw images, but not as high as the business logic. Their tool chain includes a useful "GUI ripping" component for automatically exploring a GUI. It is believed herein, however, that the tool chain of "Memon, A., Nagarajan, A. and Xie, Q. "Automating Regression Testing for Evolving GUI Software." *J. Softw. Maint. Evol.: Res. Pract.* 2005, 17:27-64" would not be sufficiently robust in the face of presentational changes to the GUI to be practical. Moreover, the models formed in "Memon, A., Nagarajan, A. and Xie, Q. "Automating Regression Testing for Evolving GUI Software." *J. Softw. Maint. Evol.: Res. Pract.* 2005, 17:27-64" are ad-hoc and do not represent the test developer's understanding of the application and business.

Froglogic's "Squish" tool as described in "Froglogic Corporation. "Squish manual." Web site with manual for GUI testing software" operates by instrumenting the GUI calls and capturing and replaying editable scripts at this level. While portable across operating systems and robust to minor changes, scripts thus created are not portable across GUI platforms and are not robust to reorganization of the GUI. Lowell and Stell-Smith in "Lowell, C. and Stell-Smith, J. "Successful automation of GUI driven acceptance testing." *Extreme Programming and Agile Processes in Software Engineering 4th International Conference, XP* 2003 Genova, Italy, May 25-29, 2003. In LNCS Volume 2675, 1011-1012" and Triou, Abbas, and Kothapalle in "Triou, E., Abbas, Z. and Kothapalle, S. "Declarative UI testing at Microsoft." 19th *International Symposium on Software Reliability Engineering (ISSRE* 2008), Seattle, 2008" also instrument the windowing API under the application; the limitations of this approach are roughly the same as those of "Froglogic Corporation. "Squish manual." Web site with manual for GUI testing software."

Herein Provided Approach

One way to achieve this robustness in the oracle is to map between the low-level GUI elements and objects at a high level of abstraction. The level of abstraction that the development and test teams would find most natural is that of the business process model of the business that the system supports. Emerging technology in image recognition would make the testing solution robust to changes in GUI or platform technology.

Business Process Modeling

A business process model (BPM) of a system is a representation of the entities that the system presents and manipulates, and the activities that a user can invoke, from the point of view of the business the system supports. Business process modeling is closely related to object-oriented modeling in software, and shares some of the same notations. For example, in a word processor, the elements of the document being edited (paragraphs, pages, tables, etc.) and the operations to edit it (insertion, deletion, markup, etc.) are represented, but the elements of the GUI representation (screen positions, toolbars, controls, etc.) are omitted.

The requirements of an application specify the BPM of the application separately from details of the GUI view of the business (if they are well written.) Even if the requirements document does not specify the BPM of the application, one can often be reverse-engineered without too much trouble.

The BPM is not unique. It is possible to represent the same business well using different BPMs.

Example

Figure 25:
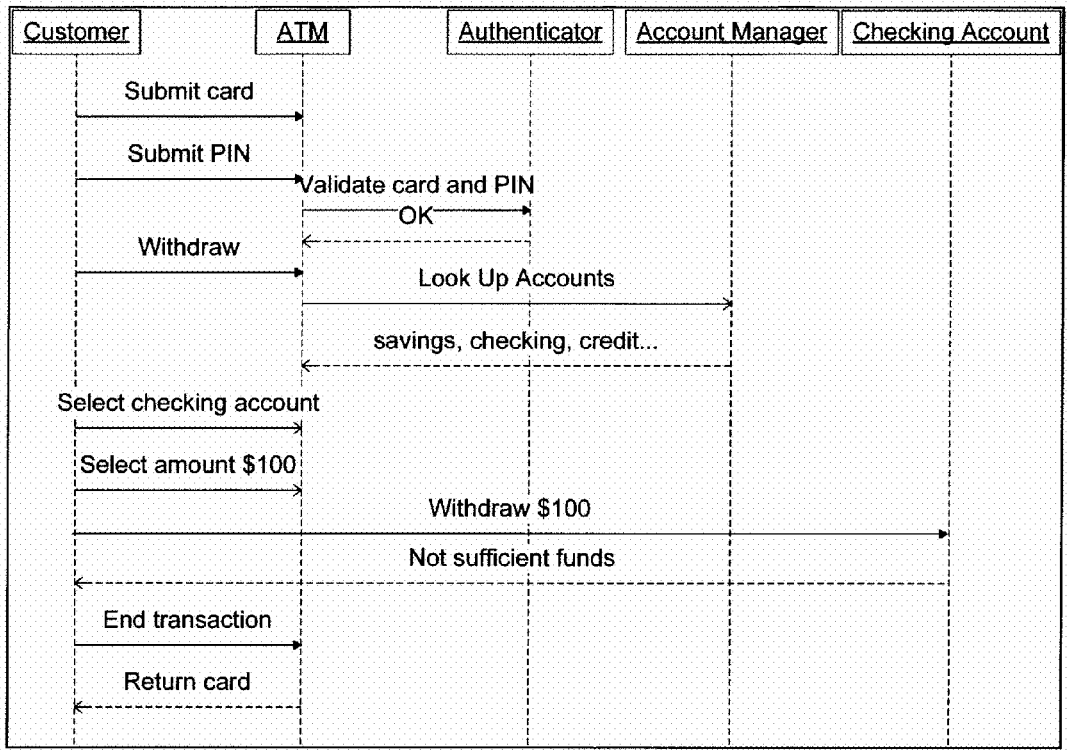
FIG. 25 illustrates a business model of an ATM transaction scenario.

FIG. 25 shows a sequence diagram which is part of the BPM for a (simplified) automated teller machine. Such sequence diagrams typically form the lowest level of abstraction of the BPM, but are the places where the business objects of the process are captured.

Each of the business objects (except for the customer) has some customer-visible representation in the customer's interaction with the SUT. Specifically:

The ATM has attributes that identify its place in the transaction (card accepted, withdrawal requested, etc.) as well as other attributes not directly related to transaction state (e.g., the amount of cash it has in each denomination it can dispense.) Each of these can become known to the customer through the ATM's user interface. For example, if the customer asks for $5 bills and the ATM has none, it will indicate this via an error screen;

The Authenticator can either validate the customer's credentials or refuse to do so. This will be indicated to the customer through the ATM's user interface as screen transitions.

The Account Manager determines what accounts each customer can access. These will be different for different customers, and are visible via the account choices that each customer has;

The Checking Account has a balance that the customer can view. The balance also is visible through the UI in that it affects whether the withdrawal succeeds or fails. Test Scripting at the Business Process Level In effect, the example of FIG. 25 also provides a black-box acceptance test case at the business process level:
1. Submit card for a customer;
2. Verify that the PIN is requested;
3. Submit PIN for the same customer;
4. Verify that the "Withdraw" option becomes available;
5. Select withdrawal;
6. Verify that the correct list of accounts for this customer is displayed;
7. Select checking account;
8. Verify that the withdrawal amount is requested;
9. Enter an amount larger than is currently in the account;
10. Verify that the ATM indicates that there are not sufficient funds;
11. End the transaction;
12. Verify that the ATM returns the card.

Note that all of these steps are in terms of the business process model, rather than the GUI of the ATM. It will be shown how the GUI display can be mapped back to the business object attributes that the above script uses.

Some of the steps in the business-process-level test may map to more than one test step at the GUI level. For example, it is not inconceivable that a customer could have twenty or thirty savings accounts. The list of accounts might not fit on one ATM screen, in which case the "Verify the correct list of accounts" test step would then take multiple steps at the GUI level to view all the available accounts.

As a side note, the method model of FIG. 25 should be even more abstract than it is. For example, the customer would authenticate in ways other than the card-and-PIN sequence if a Web interface rather than the ATM was used, and the withdrawal-account-amount sub-scenario could likewise be reorganized. Such changes to the model would help make the script robust to changes between platforms that affect event sequence, and to minor changes in the business process itself.

Mapping Between the GUI and the Business Process Model

In the herein provided solution as an aspect of the present invention, GUI elements and their screen positions are mapped bidirectionally to the business objects in the BPM. This mapping is not necessarily one-to-one; several GUI elements might collectively represent a single business object, or some business objects might not be represented in the GUI at all.

A corresponding mapping could be created between low-level event streams (mouse moves, key hits, etc.) and activities in the BPM.

Figure 26:
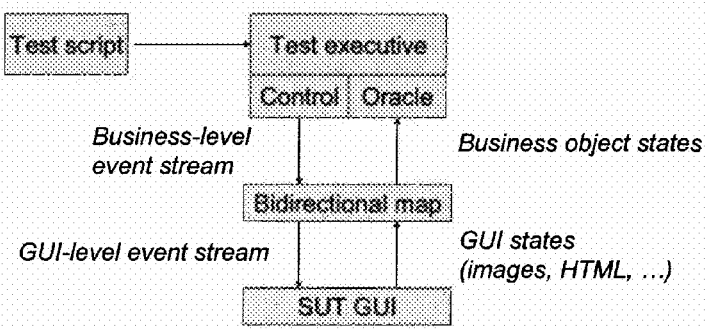
FIG. 26 illustrates a robust automated GUI test framework.

See FIG. 26 for an example high-level component diagram showing how a GUI test system would use the mapping.

Example Mapping

Continuing the example from above, the business object state may be partially reconstructed from the UI of the ATM as follows. (The comments marked by "CMNT—" show how the BPM attribute is inferred from the UI of the ATM.)

ATM:
The ATM's transaction state at any time. CMNT—can be inferred from the UI transitions;
The cash balance is the amount that the ATM started with, minus successful withdrawals. CMNT—Success of a withdrawal is indicated by transitions of the UI;

Authenticator:
The Authenticator either validates the credentials for a particular customer at a certain time, or it does not. Its set of validated customers either includes that customer or it does not, on that basis. CMNT—The UI of the ATM indicates this by state transitions at the start of the transaction;

Account Manager:
The Account Manager provides the set of accounts owned by each customer. CMNT—This is indicated by the account choices available to the customer in the account selection screen of the UI.

Checking Account:
The Checking Account has a balance. CMNT—This is indicated crudely by the failure of the transaction, and can be indicated exactly by requesting the balance.

The above mapping is unidirectional from the GUI transition sequence to the business model. The mapping in the opposite directions (from business process actions to GUI event input) is more straightforward. For example, "Select withdrawal" maps to navigating to the screen where the option is available and selecting the option.

Mapping Efficiently

"Lowell, C. and Stell-Smith, J. "Successful automation of GUI driven acceptance testing." *Extreme Programming and Agile Processes in Software Engineering* 4*th International Conference, XP* 2003 Genova, Italy, May 25-29, 2003. In LNCS Volume 2675, 1011-1012" and "Triou, E., Abbas, Z. and Kothapalle, S. "Declarative UI testing at Microsoft." 19*th International Symposium on Software Reliability Engineering (ISSRE* 2008), Seattle, 2008" also, arguably, map between the GUI and the business process model, by refactoring captured scripts and creating custom mapping code respectively. These approaches have the disadvantages noted above. To overcome these disadvantages, two changes are necessary: capturing the GUI state at a more fundamental state (as images) and reducing the effort of constructing the map.

Capturing the GUI State as Images

To maintain independence from changes to the presentation technology, it is important to capture the GUI state from a point of view that is even closer to that of the end user. The GUI state will be captured and analyzed as raw images or image streams.

Where it is available, other information, such as the HTML used to generate images in a web browser, can be used to improve the accuracy of this analysis. However, it is imperative that the mapping be possible without such auxiliary information, because there are practical circumstances in which it is not available. For example, a port from a thick-client to a thin-client platform, HTML is not available for the thick client.

Supporting Map Construction Through Computer Vision

The map between the GUI and the business objects will need to be specialized for each SUT (and for the BPM of the SUT.) If it is difficult or time-consuming to construct or maintain the map, then the test developers will reject the tool.

A computer vision based approach is provided herein as an aspect of the present invention to analyze the GUI image, in order to assist in constructing the map. The provided approach is based on a combination of low-level feature detectors and a mid- and high-level pattern grammar representation. Such technology has successfully been applied to computer vision pedestrian detection as described in ". V. Shet, J. Neumann, V. Ramesh, and L. S. Davis. Bilattice-based logical reasoning for human detection. In *Proc. IEEE Conf Computer Vision Pattern Recognition (CVPR)*, 2007" and aerial image analysis as described in "C. Bahlmann, M. Singh, V. Shet, and V. Ramesh. Detection Of Complex Objects In Aerial Images. Pending patent, Ref. Nr. 2008E24373 US, December 2008. Siemens Corporate Research, Inc."

In the provided setting, feature detectors can be designed to detect and identify basic (i.e., low-level) visual elements in a GUI, such as, lines, rectangles, circles, or text. The pattern grammar is employed to form mid- and high-level GUI concepts. For instance, on a mid level, the concept of a radio button unit can be represented as a set of circles that are aligned and arranged in a certain way. Similarly, on a higher level, elements from the BPM can be mapped to certain GUI control arrangements. The grammar formulation that is provided as an aspect of the present invention and inference framework is based on bilattice based logical reasoning. In this respect, it is not limited to deterministic descriptions, but can also include rule sets with probabilities as described herein and in "V. D. Shet, J. Neumann, V. Ramesh, and L. S. Davis. Bilattice-based logical reasoning for human detection. In *Proc. IEEE Conf. Computer Vision Pattern Recognition (CVPR)*, 2007" and "C. Bahlmann, M. Singh, V. Shet, and V. Ramesh. Detection Of Complex Objects In Aerial Images. Pending patent, Ref. Nr. 2008E24373 US, December 2008. Siemens Corporate Research, Inc."

Map Editor

One aspect of this concept is that, while low (and mid) level concepts often remain constant between GUIs, high level grammar rules can be set up comparably quick, hence, minimizing the amount of user effort.

The approach is based on pattern grammars of images to construct the map, and rules on these pattern grammars. These pattern grammars represent, at an abstraction level above the screen image but below the BPM, the way that the imaging system can recognize elements of the GUI. The pattern grammars and low-level rules (e.g., to recognize a scrollable table) might remain relatively constant between GUIs and thus be reusable; the rules to assign the values of a GUI element to a BPM object would be application-specific.

Replay Support

If the map can be made bidirectional, robust capture-replay should also be possible. Replay is identical to FIG. 26.

Figure 27:
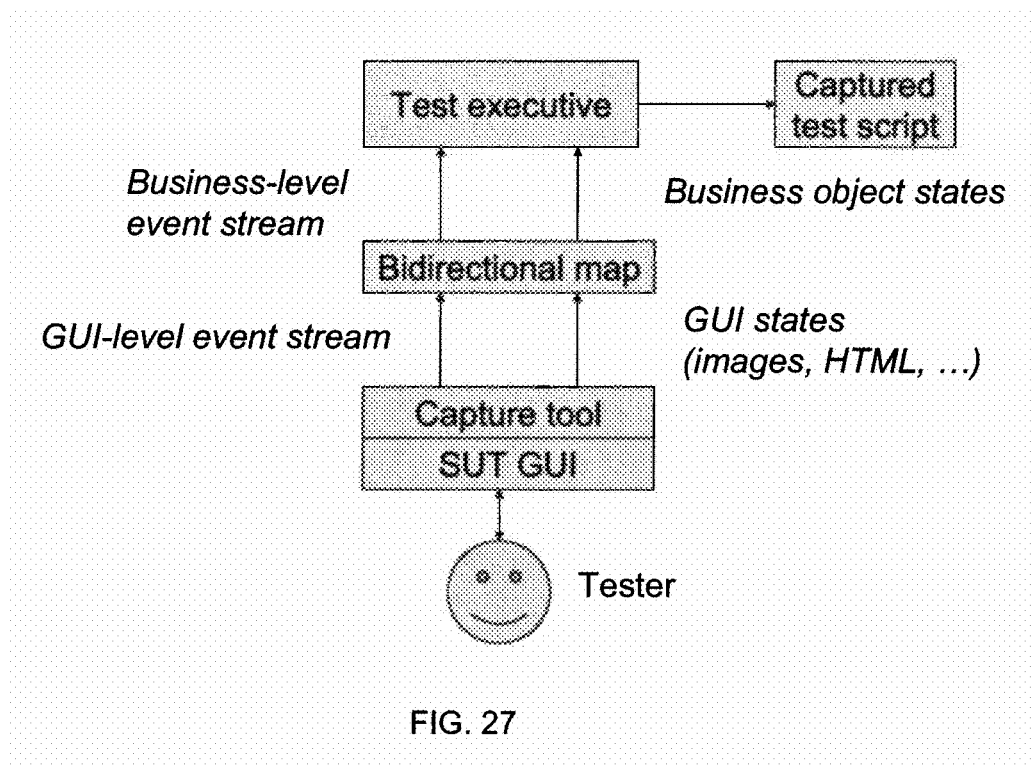
FIG. 27 illustrates a robust capture replay.

FIG. 27 depicts capture. A capture tool captures the GUI-level event stream and low-level GUI states and redirects them for capture.

The following requirements for the robust GUI testing tool are provided:

Tests are insensitive to common major changes to the GUI that does not affect the business logic, as described in Section 1.2 (or tests that can be updated with a small effort.)

The test tool can be used by test automation engineers within a short learning curve. (Specialized training in the underlying technology of the test tool should not be necessary.)

Configuring the system to test a particular SUT must require far less effort than building the SUT.

The tool exhibits normal standards of good software engineering practice (robustness, performance, etc.) and can be demonstrated to potential customers.

Since many good test executives are already available, the robust GUI testing is added to an existing commercial or open-source test executive, rather than develop a new one.

Detection of Complex Objects in Aerial Images

The present invention in one embodiment can also be used as a component within a larger system for visual object recognition. In such a system, the invention is used as an interest operator that eliminates as many false object hypotheses as possible under the constraint of keeping (preferably) all true ones. All remaining hypotheses will then be transferred to further processing components. The advantage of such strategy is that the remaining (possibly costly) processing components will need to investigate only a fraction of initial hypotheses. In the following, we describe how the present invention contributes to such a system, the so-called C3Vision system [Paul Sajda, Lucas C. Parra, Christoforos Christoforou, Barbara Hanna, Claus Bahlmann, Maneesh Singh, Jun Wang, Eric Pohlmeyer, Jacek Dmochowski, and Shih-Fu Chang. "In a blink of an eye and a switch of a transistor: Cortically-coupled computer vision." Proc. IEEE, March 2010]. C3Vision comprises a component based on the present invention, a component based on EEG-RSVP, and a component based on post-processing by humans.

The design of an effective computer vision system is also governed by the typical application context in which C3vision is used. Most frequently, C3vision is applied in a context that requires to search for new, unexpected object classes, with only a short time of system preparation allowed. This demands from a computer vision module that it can quickly adapt to a new detection task, and does not rely on large amounts of labeled training data, since ground-truthing is typically a time consuming task.

In summary, the requirements for the computer vision system in C3vision are:

High sensitivity with moderate specificity
Fast adaptability to new object classes
Independence of large training corpora It will be explained herein, how these aspects are addressed.

a) Methodology: Computer vision object detection and classification methods can generally be characterized by the amount of model knowledge involved: On the one end of this axis, literature identifies model-free approaches as described in for instance "Y. LeCun, L. Bottou, Y. Bengio, and P. Haffner. Gradient based learning applied to document recognition. Proc. IEEE, 86(11):2278-2325, November 1998", "Paul Viola and Michael J. Jones. Robust real-time object detection. Technical Report CRL 2001/01, Cambridge Research Laboratory, 2001" and in "Gabriella Csurka, Christopher R. Dance, Lixin Fan, Jutta Willamowski, and Cédric Bray. Visual categorization with bags of keypoints. In Workshop on Statistical Learning in Computer Vision, ECCV, pages 1-22, 2004." Those typically utilize a statistical classifier, the parameters of which are adapted by an appropriate learning method (e.g., support vector machines, AdaBoost, multi-layer perceptrons). In some cases they perform classification directly on image pixels as described in "Y. LeCun, L. Bottou, Y. Bengio, and P. Haffner. Gradient based learning applied to document recognition. Proc. IEEE, 86(11):2278-2325, November 1998", sometimes they employ extraction of simple features such as described in "Paul Viola and Michael J. Jones. Robust real-time object detection. Technical Report CRL 2001/01, Cambridge Research Laboratory, 2001" and in "Gabriella Csurka, Christopher R. Dance, Lixin Fan, Jutta Willamowski, and Cédric Bray. Visual categorization with bags of keypoints. In Workshop on Statistical Learning in Computer Vision, ECCV, pages 1-22, 2004." They typically rely on large training corpora that ideally cover all possible object variations. On the other hand, model-based approaches make use of some sort of object class description in order to model variations such as described in "Thomas O. Binford and Tod S. Levitt. Evidential reasoning for object recognition. IEEE Trans. Pattern Anal. and Mach. Intell., 25(7), July 2003", "Wallace Bishop Mann. Three Dimensional Object Interpretation of Monocular Gray-Scale Images. PhD thesis, Department of Electrical Engineering, Stanford University, 1995", J. Ponce, D. Chelberg, and W. B. Mann. Invariant properties of straight homogeneous generalized cylinders and their contours. IEEE Trans. Pattern Anal. and Mach. Intell., 11(9):951-966,1989. ISSN 0162-8828" and in "Visvanathan Ramesh. Performance Characterization of Image Understanding Algorithms. PhD thesis, University of Washington, Seattle, March 1995." In some cases, physical principles or functional dependencies are leveraged to adapt model parameters. This approach enjoys the advantage of a smaller dependence on training data. These two cases mark the extremes on said axis; in practice, many successful recognition algorithms are hybrids.

In the C3vision context, the constraints listed in the above section demand for a system that incorporates a considerable amount of model knowledge. In order to cope with this requirement, a system has been developed as an aspect of the present invention, which is based on at least two main ingredients:

1) Feature dictionary: A set of low-level feature extractors that—when combined—provide a general platform for describing and discriminating numerous different (aerial) object classes.
2) Grammar formulation and inference: A formal grammar for specifying domain knowledge and describing complex objects using mid- and high-level compositions, and an algorithm that performs inference on such grammar.

Feature dictionary: Given the C3vision context, the feature dictionary should particularly cover the domain of aerial images. Typical objects of interest in aerial images are buildings, roads, factories, rivers, harbors, etc. One may be further interested in the detection of ships, surface-to-air missile (SAM) sites, airfields, helipads, or petroleum tanks, among others.

In general, an expressive element for identifying an object in aerial images is its geometric shape, e.g., the shape of its edge contours, boundaries of different textures, etc. This motivates the use of geometric features for use in the feature dictionary. However, in general, shapes can become complex and task specific. Employing task specific shape features would oppose the idea of a generic and quickly adaptable computer vision module, as argued above. Hence, an approach will be employed based on building blocks, in that general shapes are approximated by a composition of shape parts. In turn, those parts can correspond to further compositions or geometric primitives. For instance, airfields in aerial images usually decompose into a set of straight lines (i.e., airstrips) and buildings (i.e., terminals), buildings into a set of (rectangular) lines; highways can be approximated by connected straight lines, helipads decompose into a circle and a letter "H", etc.

In this respect, the feature dictionary will be required to cover basic shape primitives, such as, straight lines, polygons, circles, corner points, etc. Computer vision literature for solving those primitives is vast see for instance "Robert M. Haralick and Linda G. Shapiro. Computer and Robot Vision. Addison-Wesley, 1992" and "David G. Lowe. Distinctive image features from scale invariant keypoints. International Journal of Computer Vision, 60(2):91-110, 2004", and a detailed description would go beyond the scope of the description of aspects of the present invention. Instead, a subset of the geometric features will be shown used along with example object classes and images in FIG. 29.

Figure 28:
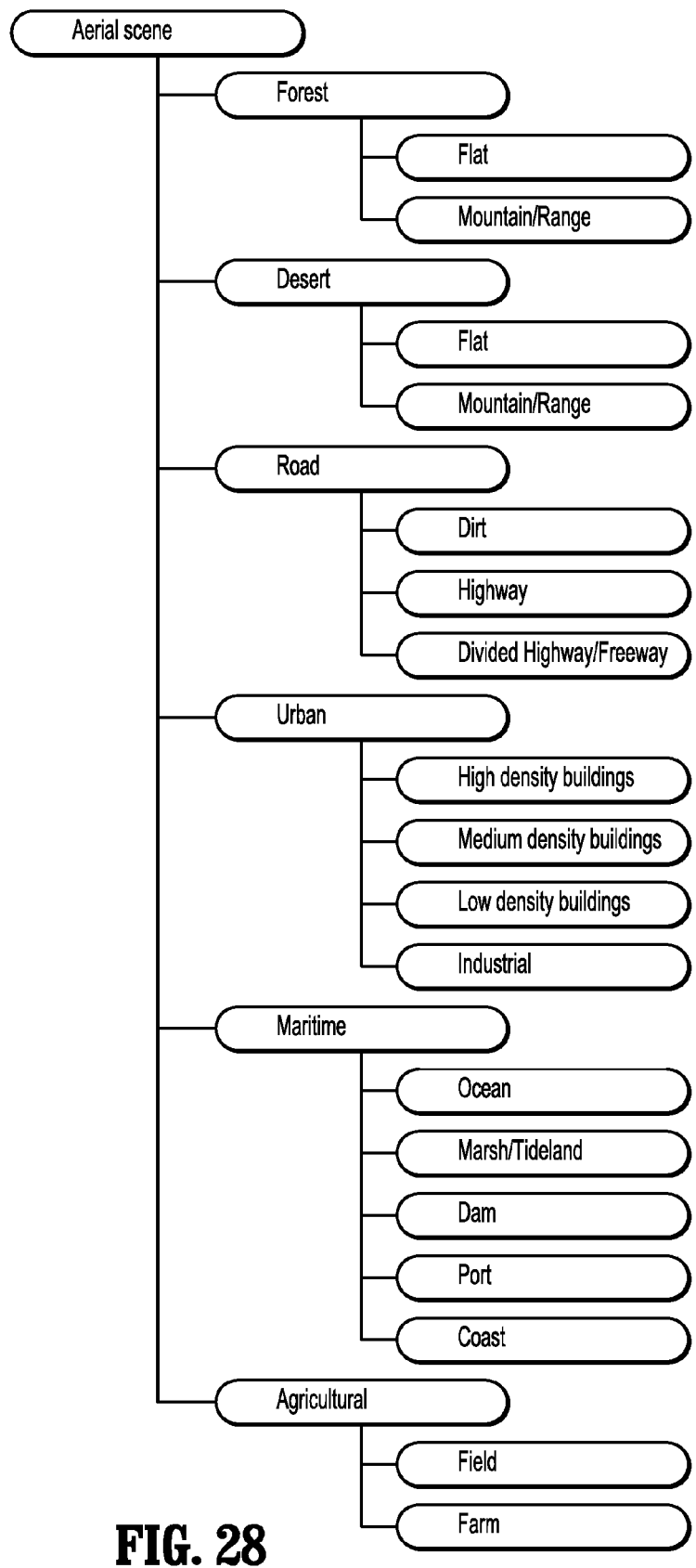
FIG. 28 illustrates a taxonomy of scene contexts in an aerial scene.
Figure 29A:
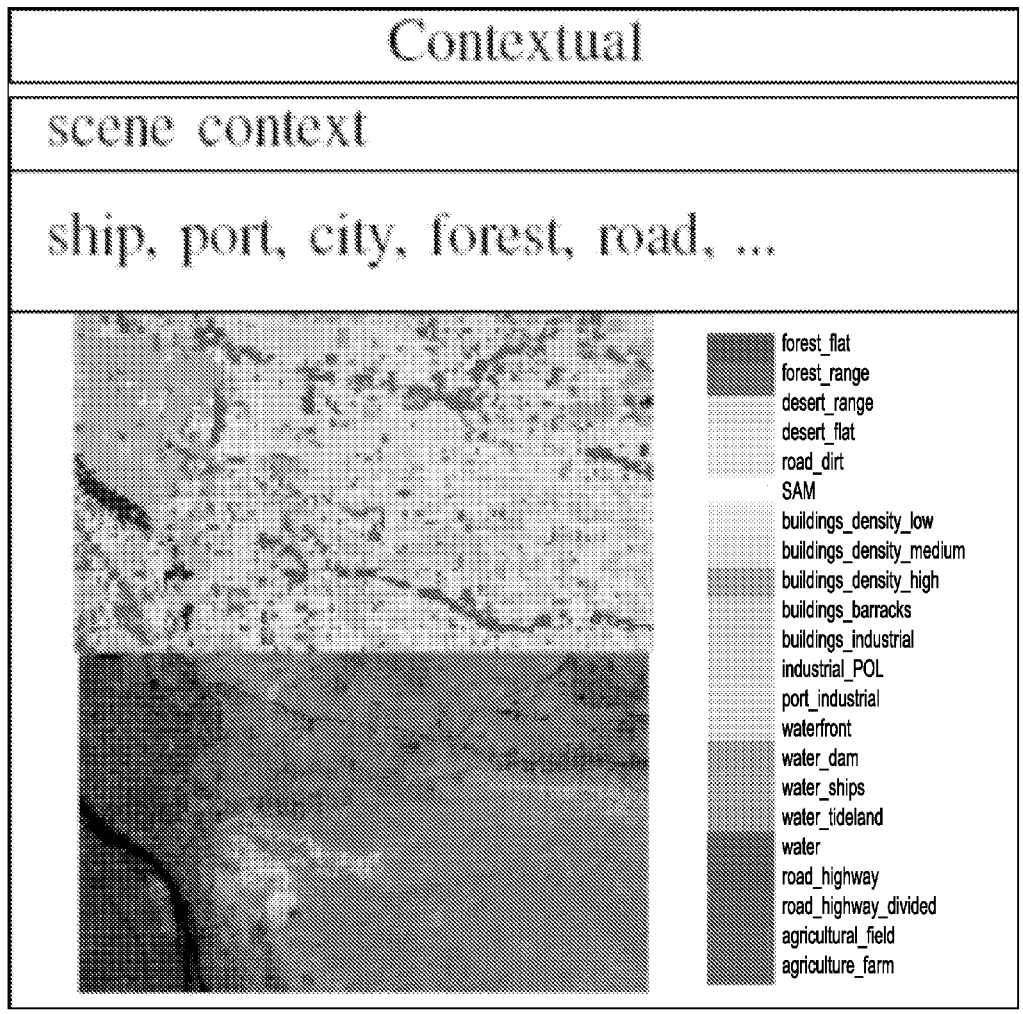
FIG. 29a illustrates a scene context which is part of FIG. 29.

FIG. 29. provides examples of low-level features used in the computer vision module: The table illustrates the use of three geometric primitives (straight line, polygon, circle) and a contextual feature (scene context). An example illustrating the application of each feature is shown in the last row: the straight line feature applies very well to detect airfields (in particular, runways), the polygon feature to detect boundaries in a harbor scene (e.g., those of ships), and the circle feature to detect missile launchers, which are fundamental elements of a SAM (surface-to-air-missile) site. The scene context feature aims at classifying an image region into its main terrain type (see also FIG. 28). The illustration shows a shade-coded map (upper part) of a 15 000 by 8 000 pixel large aerial image (lower part). Each pixel in the map corresponds to a 500 by 500 region of the source image. FIG. 29a provides an enlarged image of the scene context of FIG. 29.

Complementary to geometric object properties, humans often use context information for visual search, e.g., they relate the object of interest to functional roles and search for areas in the image where such roles can be executed. For instance, the functional role of ships is their operation in water, hence they are usually found in a maritime context (e.g., a harbor, coastline, river, lake, ocean, etc.). Similarly, helipads are mostly present in dense urban areas, and freeways in the connection of major cities. Using this kind of information, human image analysts can either deterministically prune away certain areas for further analysis, or weight or prioritize the search.

This strategy will be mimicked for C3vision. On the feature side, this requires (i) the definition of common context categories, as well as (ii) a feature extraction method that assigns image regions into one or more of those categories.

To address (i), a simple taxonomy has been created of scene contexts, which is shown in FIG. 28. FIG. 28 provides a taxonomy of scene contexts in aerial scenes: The shown hierarchy is based on a modeling in that any region of a certain scale can be characterized by a dominant theme from the main categories "Forest", "Desert", "Road", "Urban", "Maritime", or "Agricultural". In the computer vision module, this taxonomy serves as the basis for encoding certain types of high-level domain knowledge by means of the scene context feature.

In this hierarchical representation, there will be discriminated between main scene contexts (i.e., terrain types) that occur in aerial scenes, such as, "Forest", "Desert", "Road", "Urban", "Maritime", and "Agricultural" on a coarse level. A finer discrimination is expressed on a lower level, for instance, when discriminating between different building densities in an urban context.

To address (ii), first the appearance of small patches will be modeled (typically corresponding to ≈200 by 200 meters) in the query image. More specifically, one will rely on a statistical classifier, which categorizes such patches into their most dominant scene category. (In this respect, a single-category classification is employed. Since, in general, image regions can contain multiple scenes, multi-category classification would be a valid extension.) How can such classifier be realized? Many scenes in the taxonomy of FIG. 28 (e.g., ocean, forest, urban, agricultural) contain repetitions of fundamental micro-structures (waves, trees, houses and streets, agricultural produce, resp.). Such configurations have been studied in literature as texture (with a texton being the microstructure) and identified as a significant feature for perception and identification, both in psychophysics such as in "B. Julesz. Textons, the elements of texture perception and their interactions. Nature, 290:91-97, 1981" and for computer vision in "T. Leung and J. Malik. Representing and recognizing the visual appearance of materials using three-dimensional textons. International Journal of Computer Vision, 43, June 2001." In fact, Walker and Malik in "Laura L. Walker and Jitendra Malik. When is scene recognition just texture recognition. Vision Research, 44: 2301-2311, May 2004" report that texture provides a strong cue for the identification of natural scenes in the human visual system.

The statistical classifier provided as an aspect of the present invention is inspired by well developed texture classification techniques; see "T. Leung and J. Malik. Representing and recognizing the visual appearance of materials using three-dimensional textons. International Journal of Computer Vision, 43, June 2001" and "M. Varma and A. Zisserman. A statistical approach to texture classification from single images. International Journal of Computer Vision: Special Issue on Texture Analysis and Synthesis, 2005", for instance. In short, it operates in the space of textons, where it identifies a set of texton clusters from vector quantization of labeled data. Texture descriptors are then constructed from histograms over the representative textons with regard to training images. This histogram representation serves as input for a statistical classifier, e.g., k-nearest-neighbor. Note that the dependency on training data is not problematic in the sense described above, since the scene context is typically not task specific, hence, can be precomputed for a wide problem domain and re-used for unseen objects.

Grammar formulation and inference: In order to allow for a quick and efficient system setup when given a new detection challenge with unseen (complex) object classes, we require a general and extensible formalism, the main task of which is to provide a modeling on a mid and high level. In particular, the formalism should address the following aspects:

1) Knowledge representation: The formalism should provide a means in that informal descriptions of domain and object properties can be cast into a formal grammar representation. For instance, it should allow to formally encode verbal object-centric descriptions, such as: "A helipad is prominently found on skyscraper rooftops, most frequently in densely populated urban scenes; it is characterized by a circle with an enclosed character 'H'.", or, "An SA-2 SAM site consists of a number of missile launchers, typically six, which are arranged in a hexagonal pattern. Launchers are typically protected by circular ridges; for logistics, they are often connected by pathways."
Further, the grammar should be able to express general (aerial) domain knowledge in a descriptive and functional form, such as, "A coastline is adjacent to water and land.", or "Roads typically function as a means to transport objects between two locations.", etc.
2) Uncertainties: The knowledge representation should allow for association with uncertainties. (An important aspect concerns the learning of model parameters, e.g., the uncertainties, from data.)
3) Inference: The formalism should provide a reasoning agent that can probabilistically infer about user queries, e.g., about the presence of an object, given a knowledge representation and a set of (low-level feature) observations.

A number of interesting formalisms, which satisfy these aspects, have been proposed in computer vision literature such as in "David M. McKeown, Stephen J. Gifford, J. Chris Mc-Glone, Steven Douglas Cochran, Wilson A. Harvey, Michael F. Polis, Jefferey A. Shufelt, Stephen J. Ford, Yuan C. Hsieh, and Michel Roux. Research in automated analysis of remotely sensed imagery: 1993-1994. In Image Understanding Workshop, Monterey, Calif., 1994; Morgan Kaufmann Publishers, Inc.", "Image Understanding Workshop, 1998. Morgan Kaufmann Publishers, Inc.", "Song-Chun Zhu and David Mumford. A stochastic grammar of images. Found. Trends. Comput. Graph. Vis., 2(4):259-362, 2006", "Vinay D. Shet, Jan Neumann, Visvanathan Ramesh, and Larry S. Davis. Bilattice-based logical reasoning for human detection. In Proc. IEEE Conf. Computer Vision Pattern Recognition (CVPR), 2007" and in "Abhinav Gupta and Larry S. Davis. Beyond nouns: Exploiting prepositions and comparative adjectives for learning visual classifiers. In Computer Vision—ECCV, Marseille, France, 2008. Springer Verlag", many of them based on Bayesian networks.

The choice for the present approach as an aspect of the present invention is founded on predicate logic, more specifically a variant comprising bilattice theory. Logical reasoning approaches, in general, provide a means of formally specifying domain knowledge and manipulating symbolic information to explicitly reason about propositions of interest. Bilattice-based logical reasoning as described in "Matthew L. Ginsberg. Multivalued logics: A uniform approach to inference in artificial intelligence. Comput. Intelligence, 4(3):256-316, 1988", "V. Shet, D. Harwood, and L. Davis. Multivalued default logic for identity maintenance in visual surveillance. In Computer Vision—ECCV, pages IV: 119-132, Graz, Austria, 2006. Springer Verlag" and in "Vinay D. Shet, Jan Neumann, Visvanathan Ramesh, and Larry S. Davis. Bilattice-based logical reasoning for human detection. In Proc. IEEE Conf. Computer Vision Pattern Recognition (CVPR), 2007" combine first order predicate logic with uncertainty handling formalisms and provide a principled approach for combining and exploiting contextual knowledge to solve high-level reasoning problems. Uncertainties are taken from, and semantically interpreted within, a set structured as a bilattice. For more detail, one is referred to the directly above mentioned articles. Here, the idea is illustrated with help of an example.

Bilattice-based logical reasoning approaches, unlike traditional logic, associate (un-) certainties with both logical facts (denoting degree of confidence in observation) and logical rules (denoting degree of confidence in domain knowledge). FIG. 30 illustrates facts and rules in the context of SAM sites. Facts are given in lines (F1)-(F3). They correspond to observations of a low-level feature, e.g., one of FIG. 29. Detection confidences are encoded in the super-scripted real numbers associated with the arrow.

Exemplary rules are given in lines (R1)-(R4). FIG. 30 shows a subset of the facts and the rule base for detecting SAM sites. Facts correspond to observations of a feature detector. Here, fact (F1) originates from the scene context feature. Fact (F2) and (F3) correspond to observations of certain circular structures, implemented by the circle feature. Rules (R1) and (R2) declare a SAM site based on the "scene context" feature. i.e., Rule (R1) (with confidence 0.3) and Rule (R2) (with confidence 0.2) capture the occurrence of a 'desert-flat' or 'urban-industrial' context (refer to the scene context taxonomy of FIG. 28). Note that Rule (R2) includes a negation. Rule (R3) declares a SAM site as an arrangement of a set of circles (instantiated in the variable PList), which in turn is declared in Rule (R4). Note that only a subset is shown of the rule base; e.g., the rules defining "find_six_circles( )", "compute_centroid( ), and "geometry_constraint_hexagon( ) and others are omitted for brevity.

A rule "A$\leftarrow^p$B" reads like "With a confidence p, B implies A".

The rule structure follows from the verbal description of a domain expert.

An important question concerns the optimization of the rule confidences (or, "weights"), p. Depending on the availability of training data, different strategies are pursued. If no data at all is available, p may only be set based on the experience of a domain expert. As unfavorable this may seem, it is not fully impractical, since rules correspond to high-level, rather "tangible" concepts. This is contrary to weights in other popular classifiers, such as, multi-layer perceptrons, AdaBoost, or support vector machines. On the other hand, if labeled training data is available, a valid question concerns the learnability of the rule weights. How to formally solve for weight optimization in bilattice-based logical reasoning is an active research field. In "Vinay D. Shet, Jan Neumann, Visvanathan Ramesh, and Larry S. Davis. Bilattice-based logical reasoning for human detection. In Proc. IEEE Conf. Computer Vision Pattern Recognition (CVPR), 2007" p is estimated from frequencies in rule firings, e.g., by means of the positive predictive value, similarly to learning in Bayesian networks. Due to differences of bilattice-based logical reasoning and Bayesian networks, however, this may not be the optimal choice. In another line of research as described in "Vinay Shet, Maneesh Singh, and Visvanathan Ramesh. Rule weight optimization for bilattice-based logical reasoning. pending patent, Ref. Nr. 2008P20196US, September 2008" Siemens Corporate Research, Inc." weight optimization is modeled as an error back-propagation, similar to the weight learning of multilayer perceptrons.

Figure 31A:
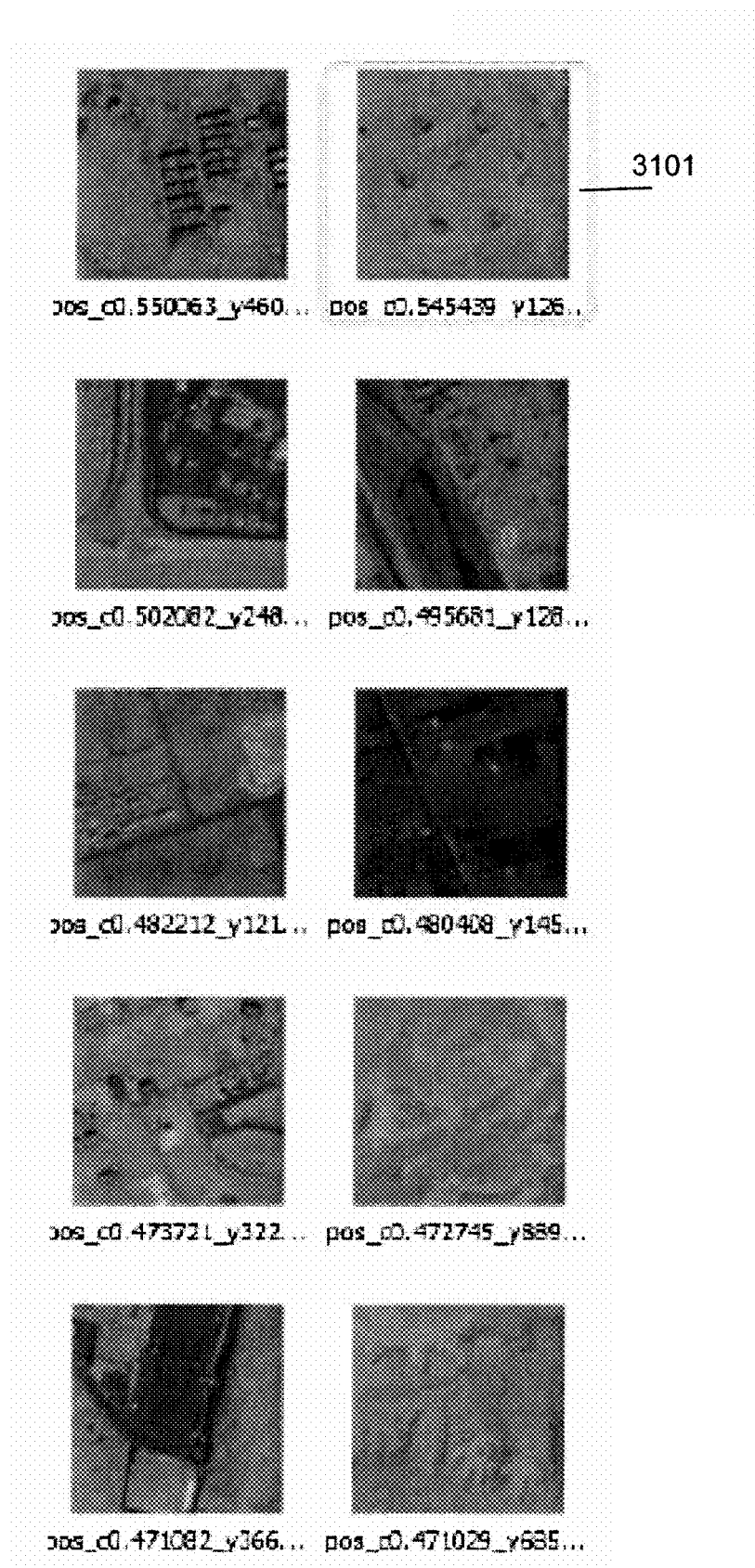
Figure 31B:
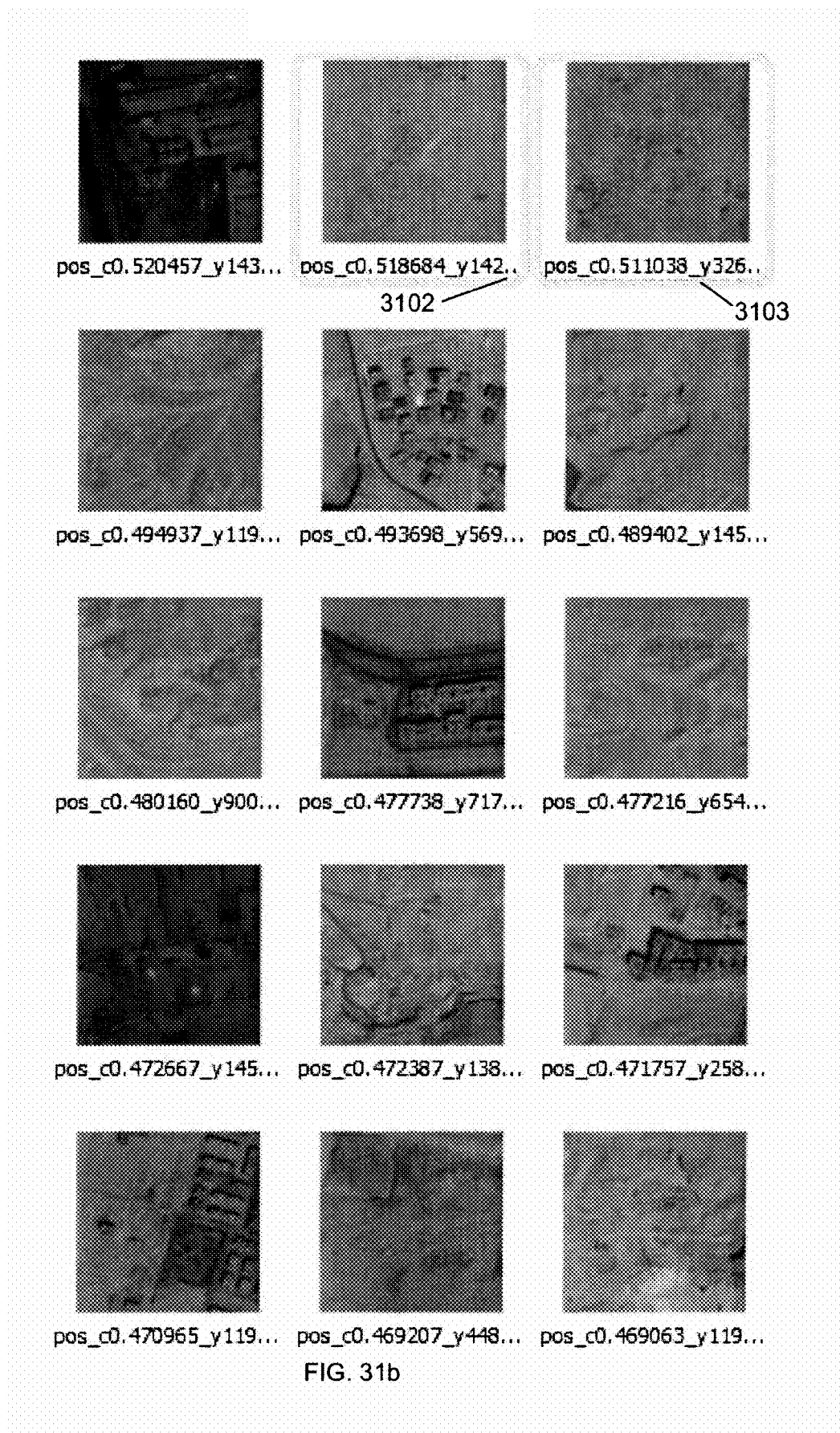

During detection, inference is performed in response to a formal user query. Suppose the user wants to search for the existence of a SAM site at an unknown location P, then he poses the query "sam_site(P)". Based on the facts and the rule base, as well as the bilattice logic, the reasoning agent searches the inference tree, instantiates free variables, and propagates confidences. If successful, it finally outputs a location P (or many of them) and a respective inference confidence c.

b) Experiments: the computer vision system has been evaluated on a number of different object categories, i.e., helipads, airfields, ships, and SAM sites. The availability of a comprehensive feature dictionary and the compact declarative syntax of the grammar formulation enabled a quick system setup for these problems. The resulting system was shown to effectively prune the hypothesis space for the EEG triage. FIGS. 31a, 31b and 31c show results for SAM site detection in a 30 000 by 15 000 pixel image containing four SAM sites 3101, 3102 3103 and 3104. Detections are illustrated by image chips centered around the detection; they are sorted by confidence (row-first). SAM site images are marked in green, i.e., all positive objects appear in the top-39 detections. This result highlights the role of computer vision as an interest operator in the C3vision context in the respect that the huge amount of 450 000 000 (corresponding to each pixel location) initial object hypotheses is reduced to 39, while 100% sensitivity is retained.

A System Implementation

All of the methods, rules, grammar, steps, analyses, searches, processes, and assignments, including processing of image data and displaying of results which are provided as one or more aspects of the present invention are implemented or performed by a processor in an embodiment of the present invention. A processor in one embodiment is a programmable digital processor which retrieves instructions for performing one or more steps from a memory, performs the instructions and provides a result to a memory and/or provides data on an output, for instance for display on a computer display. In another embodiment a processor is a circuit that is configured to execute instructions to perform one or more aspects of the present inventions. Such a configured circuit in a further embodiment is a Field Programmable Gate Array (FPGA).

Figure 32:
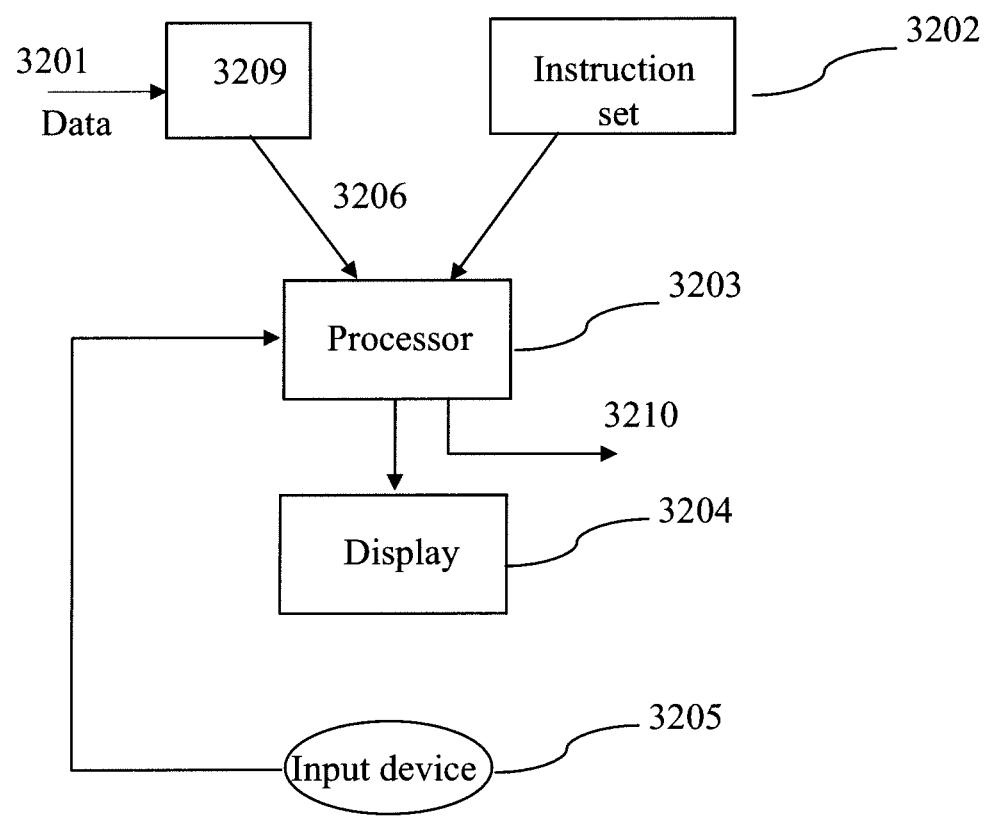
FIG. 32 illustrates a computer system for performing steps described herein in accordance with one or more aspects of the present invention.

The methods that are provided as an aspect of the present invention can be executed by a system as shown in FIG. 32. The system is provided with data 3201 which in one embodiment includes image data. Such image data may be aerial image, image data including images of humans and/or objects, data representing a GUI interface or any other image data. The image data in one embodiment is stored in a memory 3209. Image data in one embodiment is provided by the memory 3209 on an input 3206 to a processor 3203. An instruction set or program executing the methods of the present invention in one embodiment is stored in an instruction memory 3202, where it is available for retrieval by the processor 3203 to be loaded for execution. The instruction set retrieved from 3202 and loaded for execution on processor 3203 in a further embodiment is applied to image data made available for processing by processor 3203 from the memory 3209 and to have the image data processed by the processor in accordance with one or more aspects of the present invention. A result, such as an identification of a human, of a SAM site or of one or more elements of a GUI, or any other result in accordance with an aspect of the present invention is provided on an output to a device 3204. Such a device for instance can be a display such as a computer screen. The processor can be dedicated hardware. However, the processor can also be a CPU, or a GPU or any other computing device that can execute the instructions of 3202. An input device 3205 like a mouse, or track-ball or other input devices may be present to allow a user to initiate a process. Input device 3205 in a further embodiment is a key-board to enter data and/or instructions for processing by the processor. The input device may also be used to start or stop instructions on the processor. The processor 3203 in a further embodiment generates data that is provided on an output 3210. Accordingly, the system as shown in FIG. 32 provides a system for implementing and using methods disclosed herein as instructions that can be executed by the processor.

The following references are generally descriptive of the background of the present invention and are hereby incorporated herein by reference:

CAVIAR: Context Aware Vision using Image-based Active Recognition, Internet Homepages at the WWW;

Arieli, O., Cornelis, C., Deschrijver, G.: Preference modeling by rectangular bilattices. Proc. 3rd International Conference on Modeling Decisions for Artificial Intelligence (MDAI'06) (3885), 22-33 (2006);

Arieli, O., Cornelis, C., Deschrijver, G., Kerre, E.: Bilattice-based squares and triangles. Symbolic and Quantitative Approaches to Reasoning with Uncertainty pp. 563-575 (2005);

Binford, T. O., Levitt, T. S.: Evidential reasoning for object recognition. IEEE Trans. Pattern Anal. and Mach. Intell. 25(7) (2003);

Csurka, G., Dance, C. R., Fan, L., Willamowski, J., Bray, C.: Visual categorization with bags of keypoints. In: Workshop on Statistical Learning in Computer Vision, ECCV, pp. 1-22 (2004);

Cussens, J.: Loglinear models for first-order probabilistic reasoning. Proceedings of the Fifteenth Conference on Uncertainty in Artificial Intelligence (1999);

Dalal, N., Triggs, B.: Histograms of oriented gradients for human detection. In: CVPR05, pp. I: 886-893 (2005);

Felzenszwalb, P.: Learning models for object recognition. In: CVPR01, pp. I: 1056-1062 (2001);

Fern, A.: A simple-transition model for structured sequences. International Joint Conference on Artificial Intelligence (2005);

Fidler, S., Leonardis, A.: Towards scalable representations of object categories: Learning a hierarchy of parts. Proc. IEEE Conf. Computer Vision Pattern Recognition (CVPR) (2007);

Fitting, M. C.: Bilattices in logic programming. In: 20th International Symposium on Multiple-Valued Logic, Charlotte, pp. 238-247. IEEE CS Press, Los Alamitos (1990);

Freund, Y., Schapire, R. E.: A decision-theoretic generalization of on-line learning and an application to boosting. Journ. of Comp. and System Sciences 55, 119-139 (1997);

Friedman, N., Getoor, L., Koller, D., Pfefier, A.: Learning probabilistic relational models. Proceedings of the Sixteenth International Joint Conference on Artificial Intelligence (1999);

Gavrila, D.: Pedestrian detection from a moving vehicle. In: ECCV00, pp. II: 37-49 (2000);

Gavrila, D., Philomin, V.: Real-time object detection for smart vehicles. In: ICCV99, pp. 87-93 (1999);

Geman, S., Johnson, M.: Probability and statistics in computational linguistics, a brief review. In: Mathematical foundations of speech and language processing, pp. 1-26. Springer-Verlag (2003);

Ginsberg, M. L.: Multivalued logics: Uniform approach to inference in artificial intelligence. Comput. Intelligence (1988);

Hinton G. E., O. S., Teh, Y.: A fast learning algorithm for deep belief nets. Neural Computation pp. 1527-1554 (2006);

Jin, Y., Geman, S.: Context and hierarchy in a probabilistic image model. In: CVPR, pp. 2145-2152 (2006);

Julesz, B.: Textons, the elements of texture perception and their interactions. Nature 290, 91-97 (1981);

Kersting, K., De Raedt, L.: Towards combining inductive logic programming with Bayesian networks. Proceedings of the Eleventh International Conference on Inductive Logic Programming (2001);

Kokkinos, I., Yuille, A.: HOP: Hierarchical object parsing. Proc. IEEE Conf. Computer Vision Pattern Recognition (CVPR) (2009);

LeCun, Y., Bottou, L., Bengio, Y., Haffner, P.: Gradient-based learning applied to document recognition. Proc. IEEE 86(11), 2278-2325 (1998);

Leibe, B., Seemann, E., Schiele, B.: Pedestrian detection in crowded scenes. In: CVPR05, pp. I: 878-885 (2005);

Leung, T., Malik, J.: Representing and recognizing the visual appearance of materials using three-dimensional textons. Intl. Journal of Computer Vision 43 (2001);

Lin, L., Peng, S., Porway, J., Zhu, S., Wang, Y.: An empirical study of object category recognition: Sequential testing with generalized samples. In: ICCV07, pp. 1-8 (2007);

Lin, Z., Davis, L., Doermann, D., DeMenthon, D.: Hierarchical part-template matching for human detection and segmentation pp. 1-8 (2007);

Mahoney, J. J., Mooney, R. J.: Combining neural and symbolic learning to revise probabilistic rule bases. In: S. J. Hanson, J. D. Cowan, C. L. Giles (eds.) Advances in Neural Information Processing Systems, vol. 5, pp. 107-114. Morgan Kaufmann, San Mateo, Calif. (1993);

Mann, W. B.: Three dimensional object interpretation of monocular gray-scale images. Ph.D. thesis, Department of Electrical Engineering, Stanford University (1995);

Papageorgiou, C., Evgeniou, T., Poggio, T.: A trainable pedestrian detection system. Intelligent Vehicles pp. 241-246 (1998);

Poggio, T., Girosi, F.: Regularization algorithms that are equivalent to multilayer networks. Science pp. 978-982 (1990);

Ponce, J., Chelberg, D., Mann, W.: Invariant properties of straight homogeneous generalized cylinders and their contours. IEEE Trans. Pattern Anal. and Mach. Intell. 11(9), 951-966 (1989);

Ramesh, V.: Performance characterization of image understanding algorithms. Ph.D. thesis, University of Washington, Seattle (1995);

Rumelhart, D. E., Hinton, G. E., Williams, R. J.: Learning internal representations by error propagation pp. 318-362 (1986);

Sato, T., Kameya, Y.: Prism: A symbolic statistical modeling language. Proceedings of the Fifteenth International Joint Conference on Artificial Intelligence (1997);

Schapire, R. E., Singer, Y.: Improved boosting algorithms using confidence-rated predictions. Machine Learning 37(3), 297-336 (1999);

Schweizer, B., Sklar, A.: Associative functions and abstract semigroups. Publ. Math. Debrecen (1963);

Shet, V., Harwood, D., Davis, L.: Vidmap: video monitoring of activity with prolog. In: IEEE AVSS, pp. 224-229 (2005);

Shet, V., Harwood, D., Davis, L.: Multivalued default logic for identity maintenance in visual surveillance. In: ECCV, pp. IV: 119-132 (2006);

Shet, V., Neumann, J., Ramesh, V., Davis, L.: Bilattice-based logical reasoning for human detection. In: CVPR (2007);

Shet, V., Singh, M., Bahlmann, C., Ramesh, V.: Predicate logics based image grammars for complex pattern recognition. First International Workshop on Stochastic Image Grammars (2009);

Sochman, J., Matas, J.: Waldboost: Learning for time constrained sequential detection. In: CVPR05, pp. II: 150-156 (2005);

Taskar, B., Abbeel, P., Koller, D.: Discriminative probabilistic models for relational data. Proceedings of the Eighteenth Conference on Uncertainty in Artificial Intelligence (2002);

Todorovic, S., Ahuja, N.: Learning subcategory relevances for category recognition. In: CVPR08, pp. 1-8 (2008);

Towell, G. G., Shavlik, J. W., Noordewier, M. O.: Refinement of approximate domain theories by knowledge-based neural networks. In: Proceedings of the Eighth National Conference on Artificial Intelligence, pp. 861-866 (1990);

Tu, Z., Zhu, S.: Image segmentation by data-driven markov chain monte carlo. IEEE Transactions on Pattern Analysis and Machine Intelligence 24, 657-673 (2002);

Vapnik, V.: The Nature of Statistical Learning Theory. Springer Verlag, New York (1995);

Varma, M., Zisserman, A.: A statistical approach to texture classification from single images. International Journal of Computer Vision: Special Issue on Texture Analysis and Synthesis (2005);

Viola, P., Jones, M.: Rapid object detection using a boosted cascade of simple features. IEEE Conference on Computer Vision and Pattern Recognition (CVPR'01) (2001);

Viola, P., Jones, M.J.: Robust real-time object detection. Tech. Rep. CRL 2001/01, Cambridge Research Laboratory (2001);

Walker, L. L., Malik, J.: When is scene recognition just texture recognition. Vision Research 44, 2301-2311 (2004);

Wang, W., Pollak, I., Wong, T., Bouman, C., Harper, M. P., Member, S., Member, S., Siskind, J. M.: Hierarchical stochastic image grammars for classification and segmentation. IEEE Trans. Image Processing 15, 3033-3052 (2006);

Wu, B., Nevatia, R.: Detection of multiple, partially occluded humans in a single image by bayesian combination of edgelet part detectors. ICCV (2005). Beijing;

Wu, B., Nevatia, R.: Detection and tracking of multiple, partially occluded humans by bayesian combination of edgelet based part detectors. International Journal of Computer Vision 75(2), 247-266 (2007);

Y. LeCun L. Bottou, G. O., Muller, K.: Efficient backprop. Neural Networks: Tricks of the trade, Springer (1998);

Zhu, L., Lin, C., Huang, H., Chen, Y., Yuille, A.: Unsupervised structure learning: Hierarchical recursive composition, suspicious coincidence and competitive exclusion. Computer Vision—ECCV (2008);

Zhu, Q., Yeh, M., Cheng, K., Avidan, S.: Fast human detection using a cascade of histograms of oriented gradients. In: CVPR06, pp. II: 1491-1498 (2006);

Zhu, S. C., Mumford, D.: A stochastic grammar of images. Found. Trends. Comput. Graph. Vis. 2(4), 259-362 (2006);

H. Chen, Z. J. Xu, Z. Q. Liu, and S. C. Zhu. Composite templates for cloth matching and sketching. In CVPR, 2006;

F. Han and S. C. Zhu. Bottom-up/top-down image parsing by attribute graph grammar. In ICCV, 2005;

Z. W. Tu, X. R. Chen, A. L. Yullie, and S. C. Zhu. Image parsing: unifying segmentation, detection and recognition. 63(2):113-140, 2005;

Hewlett-Packard. "HP QuickTest Professional";

IBM Corporation. "Rational Functional Tester." Website of IBM's Rational Functional Tester which is an automated functional testing and regression testing tool;

AutomationAnywhere. "GUI automation." AutomationAnywhere Website with information about GUI testing software;

Memon, A., Nagarajan, A. and Xie, Q. "Automating Regression Testing for Evolving GUI Software." *J. Softw. Maint. Evol.: Res. Pract.* 2005, 17:27-64;

Lowell, C. and Stell-Smith, J. "Successful automation of GUI driven acceptance testing." *Extreme Programming and Agile Processes in Software Engineering* 4th *International Conference, XP* 2003 Genova, Italy, May 25-29, 2003. In LNCS Volume 2675, 1011-1012;

Triou, E., Abbas, Z. and Kothapalle, S. "Declarative UI testing at Microsoft." 19th *International Symposium on Software Reliability Engineering (ISSRE* 2008), Seattle, 2008;

Fowler, M., Beck, K., Brant, J., Opdyke, W. and Roberts, D. *Refactoring: Improving the Design of Existing Code.* Addison-Wesley, 1999. ISBN-13: 978-0201485677;

V. D. Shet, J. Neumann, V. Ramesh, and L. S. Davis. Bilattice-based logical reasoning for human detection. In *Proc. IEEE Conf Computer Vision Pattern Recognition (CVPR),* 2007;

C. Bahlmann, M. Singh, V. Shet, and V. Ramesh. Detection Of Complex Objects In Aerial Images. Pending patent, Ref. Nr. 2008E24373 US, December 2008. Siemens Corporate Research, Inc;

Froglogic Corporation. "Squish manual." Web site with manual for GUI testing software;

Penker, M. and Eriksson, H-E. *Business Modeling With UML: Business Patterns at Work*. Wiley, 2000. ISBN-13: 978-0471295518;

Robert M. Haralick and Linda G. Shapiro. Computer and Robot Vision. Addison-Wesley, 1992;

David G. Lowe. Distinctive image features from scale invariant keypoints. International Journal of Computer Vision, 60(2):91-110, 2004;

David M. McKeown, Stephen J. Gifford, J. Chris McGlone, Steven Douglas Cochran, Wilson A. Harvey, Michael F. Polis, Jefferey A. Shufelt, Stephen J. Ford, Yuan C. Hsieh, and Michel Roux. Research in automated analysis of remotely sensed imagery: 1993-1994. In Image Understanding Workshop, Monterey, Calif., 1994; Morgan Kaufmann Publishers, Inc.;

Image Understanding Workshop, 1998. Morgan Kaufmann Publishers, Inc.;

Abhinav Gupta and Larry S. Davis. Beyond nouns: Exploiting prepositions and comparative adjectives for learning visual classifiers. In Computer Vision—ECCV, Marseille, France, 2008. Springer Verlag;

Matthew L. Ginsberg. Multivalued logics: A uniform approach to inference in artificial intelligence. Comput. Intelligence, 4(3):256-316, 1988;

Vinay Shet, Maneesh Singh, and Visvanathan Ramesh. Rule weight optimization for bilattice-based logical reasoning. Ref. Nr. 2008P20196US, Siemens Corporate Research, Inc. U.S. Provisional Patent Application Ser. No. 61/105,468 filed on Oct. 15, 2008;

Paul Sajda, Lucas C. Parra, Christoforos Christoforou, Barbara Hanna, Claus Bahlmann, Maneesh Singh, Jun Wang, Eric Pohlmeyer, Jacek Dmochowski, and Shih-Fu Chang. "In a blink of an eye and a switch of a transistor: Cortically-coupled computer vision". Proc. IEEE, March 2010.

While there have been shown, described and pointed out fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the scope of the claims appended hereto.

The invention claimed is:

1. A method for a detection of a pattern having one or more features from image data of a scene, comprising:
    defining a set of rules to detect the pattern based on the one or more features using a plurality of first order logic bilattice predicates;
    obtaining the image data related to the scene;
    a processor processing the image data with one or more detectors to detect the one or more features;
    the processor executing the set of rules to detect the pattern based on a presence or an absence of each of the one or more features;
    the processor generating data related to:
        a justification that the set of rules detected the pattern;
        a location in the scene where the pattern occurs, and
        a measure of uncertainty related to the detection of the pattern;
    wherein the set of rules is implemented as a knowledge-based artificial neural network;
    wherein the measure of uncertainty related to the rule is expressed as a link weight in the knowledge-based artificial neural network; and wherein the link weight is optimized by applying a change being expressed as:

$$\Delta w_{ji}^{+} = \eta \delta_j \left[ \prod_l \phi(o_{il}) \right] \left[ 1 - \biguplus_{k \neq m} w_{jm}^{+} \prod_l \phi(o_{ml}) \right]$$

and $$\Delta w_{ji}^{-} = -\eta \delta_j \left[ \prod_l \phi(o_{il}) \right] \left[ 1 - \biguplus_{k \neq m} w_{jm}^{-} \prod_l \phi(o_{ml}) \right]$$

with $\Delta w_{ji}^{+}$ is a change in link weight related to a propositional rule j for grounded atoms $o_{ji}$, in a rule body, $\Delta w_{ji}^{-}$ is a change in link weight related to the propositional rule j against grounded atoms $o_{ji}$, in the rule body, $\phi(j)$ is an evidence for component of truth assignment to a propositional rule j corresponding to a node in the knowledge-based artificial neural network, $\biguplus$ is a probabilistic sum operator, $\eta$ is a constant, and $\delta_j$ is a difference between an output of node j and a ground truth of node j.

2. The method as claimed in claim 1, wherein a bilattice is a set of 2-tuples, quantifying a measure of belief for an assertion and a measure of belief against it.

3. The method as claimed in claim 1, wherein the one or more rules include a measure of beliefs related to a rule.

4. The method as claimed in claim 1, further comprising a set of composition rules which encodes the pattern as a hierarchy of parts.

5. The method as claimed in claim 1, further comprising one or more embodiment rules which encode a geometric layout of the pattern.

6. The method as claimed in claim 1, further comprising one or more context rules which encode a context of the pattern.

7. The method as claimed in claim 1, wherein the method is applied to detect an object.

8. The method as claimed in claim 1, wherein the method is applied to detect a human.

* * * * *